United States Patent
Grawunder et al.

(10) Patent No.: US 12,533,420 B2
(45) Date of Patent: Jan. 27, 2026

(54) SORTASE F AND ITS USE IN METHODS FOR CONJUGATION

(71) Applicant: NBE-Therapeutics AG, Basel (CH)

(72) Inventors: Ulf Grawunder, Hersberg (CH); Roger Beerli, Adlikon bei Regensdorf (CH); Remy Gebleux, Olten (CH); Chasper Puorger, Basel (CH); Salvatore Di Girolamo, Basel (CH); Georg Lipps, Riehen (CH)

(73) Assignee: NBE-Therapeutics AG, Basel (CH)

( * ) Notice: Subject to any disclaimer, the term of this patent is extended or adjusted under 35 U.S.C. 154(b) by 1248 days.

(21) Appl. No.: 17/290,209

(22) PCT Filed: Nov. 4, 2019

(86) PCT No.: PCT/EP2019/080116
§ 371 (c)(1),
(2) Date: Apr. 29, 2021

(87) PCT Pub. No.: WO2020/089485
PCT Pub. Date: May 7, 2020

(65) Prior Publication Data
US 2021/0379196 A1 Dec. 9, 2021

(30) Foreign Application Priority Data
Nov. 2, 2018 (EP) .................................... 18204106

(51) Int. Cl.
*A61K 47/68* (2017.01)
*C07K 16/28* (2006.01)

(52) U.S. Cl.
CPC ...... *A61K 47/6849* (2017.08); *A61K 47/6809* (2017.08); *C07K 16/2803* (2013.01); *C12Y 304/2207* (2013.01)

(58) Field of Classification Search
None
See application file for complete search history.

(56) References Cited

FOREIGN PATENT DOCUMENTS

WO 2014140317 A2 9/2014

OTHER PUBLICATIONS

Freund et al., Chembiochem. Apr. 16, 2021;22(8):1347-1356. doi: 10.1002/cbic.202000745. Epub Feb. 3, 2021. PMID: 33290621.*
Attwood, T.K., Science. Oct. 20, 2000;290(5491):471-3. doi: 10.1126/science.290.5491.471. PMID: 11183771.*
Skolnick et al., Trends Biotechnol. Jan. 2000;18(1):34-9. doi: 10.1016/s0167-7799(99)01398-0. PMID: 10631780.*
Office Action dated Jun. 11, 2024, issued in counterpart European Patent Application No. 19797282.1 (8 pages).
Falck G et al. "Enzyme-Based Labeling Strategies for Antibody-Drug Conjugates and Antibody Mimetics." Antibodies (Basel). Jan. 4, 2018;7(1):4.
Nikolas Stefan et al., "Highly Potent, Anthracycline-Based Antibody-Drug Conjugates Generated by Enzymatic, Site-Specific Conjugation", Molecular Cancer Therapeutics, vol. 16, No. 5, Mar. 3, 2017, pp. 879-892 (15 pages).
Anu Swaminathan et al., "Housekeeping Sortase Facilitates the Cell Wall Anchoring of Pilus Polymers in Corynebacterium Diphtheriae", Molecular Microbiology, Nov. 1, 2007, pp. 961-974,Oxford, UK (14 pages).
Roger R. Beerli et al., "Sortase Enzyme-Mediated Generation of Site-Specifically Conjugated Antibody Drug Conjugates with High In Vitro and In Vivo Potency", Public Library of Science, vol. 10, No. 7, Jul. 1, 2015 (10 pages).
Thomas Spirig et al., "Sortase Enzymes in Gram-Positive Bacteria: Sortase Enzymes in Gram-Positive Bacteria", Molecular Microbiology, vol. 82, No. 5, Nov. 7, 2011, pp. 1044-1059, Great Britain (16 pages).
International Search Report and Written Opinion for International Application No. PCT/EP2019/080116 (12 pages).

* cited by examiner

*Primary Examiner* — Michael Szperka
(74) *Attorney, Agent, or Firm* — Morgan, Lewis & Bockius LLP

(57) ABSTRACT

The present invention relates to a method for producing a conjugate of two substrates, the method comprising the steps of (a) providing two substrates, each substrate being independently selected from the one or more of the groups consisting of small molecules, and proteins, and (b) enzymatically conjugating the two substrates using a sortase F enzyme, or a catalytic domain thereof. One substrate comprises a sortase F recognition motif, while the other substrate comprises at least one motif selected from a $Gly_n$ motif, an $Ala_n$ motif, or a motif consisting of a mixture of Ala and Gly residues the motif totaling n residues, where n is an integer from $\geq 1$ to $\leq 21$. The reaction takes place in an aqueous reaction medium comprising a salt concentration of from about $\geq 0.01$ to $\leq 3$ M, thereby producing a conjugated product of the two substrates.

13 Claims, 12 Drawing Sheets

Specification includes a Sequence Listing.

```
Propionibacterium acnes            1 mvvialiiaaiavifiqrnndsds                    24
Pseudopropionibacterium propionicum 1 mnlvealknrkvqigiaavavllavaltlvwvlqpkndnp   40
Acidipropionibacterium acidipropionici 19 migllvallviavaatmiwrqtrdvpqa           53
Granulicoccus phenolivorans        1 mskvtksrwlpaaliavgvivlvvlivvgvsa            32
Propionibacterium freudenreichii   1 mtrtgirlvr                                  10
Propionimicrobium lymphophilum     1 msgkigkaaallviflllivagaiya                  25
Actinobacterium LLX17              1 mettpqerhrhdtrrrgsaivavvvaivlvalaawwfwpeaea 43

WP_002530979  25 aggaassttatttsstsgipaasaakkgpvpagcmktpk 64
gi_504659806  41 qagatasssgtadgaavtspeasspaspgacvtpdaa 79
gi_504882929  47 atgspaslapassasatptptpsptpsraavpagcmakqq 87
gi_916607907  33 trtqggtsageplrvngqtsqpeessggestvapasqdpsaastatpgdtctttdqp 90
gi_502926425  11 llalvalvvglglvawrvvlitpsdyekqlptapgapipdaasaglagtgpahgpangtgggavpagcdpqpr 84
gi_655434228  26 lnnrkvdtptpanvqtptqpaipegcpttp 56
gi_560888329  44 dpapaaapsstaapvetpapctstatg 71

WP_002530979  65 PIVPVKYSIDgmKASAKVLSRGvdetg 90
gi_504659806  80 GFVPVRYSIEsiGVEDKVISGGreedg 105
gi_504882929  88 PITPSTMKIDrmKVSSPVLSLGldtdn 113
gi_916607907  91 LTDPSTMYIDsmKEKSEVQSLGeepdg 116
gi_502926425  85 PLVGARMTLEghRRSMPMMSLGvapdq 110
gi_655434228  57 DIVDDPTQLLviGTDTPLKMMSlglds 82
gi_560888329  72 PFTPTSVTVPgaIDAARVVPVPpdgev 97

WP_002530979  91 aag~~appkndpsSMAWFNQGPKIgs~~dkGNAVLTAHTYhk~~~ggALGNRLYDknngI 143
gi_504659806 106 ava~~appkgeprTALWWNEGPKAas~~naGQVVLTIHTYqt~~~gdAVGNMLYS~~~~D 154
gi_504882929 114 aaa~~appkdeptTTAWYNRGPRPgs~~akGKVVLTIHTYhk~~~ggALGNELRQ~~~~P 162
gi_916607907 117 tp~~~~kaptggeQTGWYNRSPDVgs~~kqGNVMMTIHTFspkngsnALGNRMYA~~~~P 166
gi_502926425 111 apa~~sppshlgnTVGWFDRSVPPga~~aqGRAVLTSHTFrw~~~ggALGNELNH~~~~G 159
gi_655434228  83 egaaqapppneghTVAWFTGGPKVgs~~peGMATLSAHTYry~~~ggGLGNDLIN~~~~G 133
gi_560888329  98 sg~~~~tlpesegRAFAWEPSPGAtpgspkGNVLMNVHTFpg~~~dgANGNVLLD~~~~Q 146

WP_002530979 144 Kk~~~~~GDIIRLTDk~~~TGQTVCYRYDHDTKVmvkdynpns~~nilydnngPAQAAIV 193
gi_504659806 155 NggllkeGAVLKLYAe~~~DGRVACYKYTESQKIavseykpes~~dvlerhegDPALAIV 209
gi_504882929 163 Gsgl~tkGDLIRMTDs~~~SGRQACYRYDHNVKVmvkdydpds~~diiyddhgRPMLAIV 216
gi_916607907 167 Gal~~ksGDVFRITDd~~~SGKQVCYKYSGNTKIwvasydens~~dvwhnpngKPQLAIL 219
gi_502926425 160 Lla~~~pGDVIRISDg~~~GGRDVCYRFTGALKVrvsdyrpds~~glvydndgPAQLVIV 211
gi_655434228 134 Awt~~~egKTVIKISNd~~~EGKSACYRYSGSKHLwvadynpevngdliyddegSPRFSLT 188
gi_560888329 147 Lpe~~~gGQIVLAGTapdgSAVELCYVVSERLEMpatellp~~~~~~ryyatdgPPQVAIV 198

WP_002530979 194 ICWdyvk~ktgeFDSRVIFYTypva~~~~~~~ 217
gi_504659806 210 ICWdhnk~stndWDSRAFIKFkpvtdaa~~~~ 236
gi_504882929 217 ICWdyda~srndWDSRIVFYAtpvta~~~~~~ 241
gi_916607907 220 ICWdynq~pkddWDSRIVFYAdympmgtk~~~ 247
gi_502926425 212 VCSdypl~vgdaAASRALYYAdlvtgp~~~~~ 237
gi_655434228 189 VCSdypdngsdvTLGRMIFYGdlitg~~~~~~ 214
gi_560888329 199 VCSgerr~gpgdWTHRTVWFAspvst~~~~~~ 223
```

Fig. 3

SEQUENCE LISTING

<160> NUMBER OF SEQ ID NOS: 93

<210> SEQ ID NO 1
<211> LENGTH: 183
<212> TYPE: PRT
<213> ORGANISM: Propionibacterium acnes

<400> SEQUENCE: 1

Thr Thr Thr Ser Ser Thr Ser Gly Ile Pro Ala Ala Ser Ala Ala Lys
1               5                   10                  15

```
Lys Gly Pro Val Pro Ala Gly Cys Met Lys Thr Pro Lys Pro Ile Val
            20                  25                  30

Pro Val Lys Tyr Ser Ile Asp Gly Met Lys Ala Ser Ala Lys Val Leu
            35                  40                  45

Ser Arg Gly Val Asp Glu Thr Gly Ala Ala Gly Ala Pro Pro Lys Asn
 50                  55                  60

Asp Pro Ser Ser Met Ala Trp Phe Asn Gln Gly Pro Lys Ile Gly Ser
 65                  70                  75                  80

Asp Lys Gly Asn Ala Val Leu Thr Ala His Thr Tyr His Lys Gly Gly
             85                  90                  95

Ala Leu Gly Asn Arg Leu Tyr Asp Lys Asn Asn Gly Ile Lys Lys Gly
            100                 105                 110

Asp Ile Ile Arg Leu Thr Asp Lys Thr Gly Gln Thr Val Cys Tyr Arg
            115                 120                 125

Tyr Asp His Asp Thr Lys Val Met Val Lys Asp Tyr Asn Pro Asn Ser
            130                 135                 140

Asn Ile Leu Tyr Asp Asn Asn Gly Pro Ala Gln Ala Ala Ile Val Ile
145                 150                 155                 160

Cys Trp Asp Tyr Val Lys Lys Thr Gly Glu Phe Asp Ser Arg Val Ile
                165                 170                 175

Phe Tyr Thr Tyr Pro Val Ala
            180

<210> SEQ ID NO 2
<211> LENGTH: 24
<212> TYPE: PRT
<213> ORGANISM: Artificial Sequence
<220> FEATURE:
<223> OTHER INFORMATION: Synthetic Sequence_Propionibacterium acnes

<400> SEQUENCE: 2

Met Val Val Ile Ala Leu Ile Ile Ala Ala Ile Ala Val Ile Phe Ile
1               5                   10                  15

Gln Arg Asn Asn Asp Ser Asp Ser
            20

<210> SEQ ID NO 3
<211> LENGTH: 40
<212> TYPE: PRT
<213> ORGANISM: Artificial Sequence
<220> FEATURE:
<223> OTHER INFORMATION: Synthetic Sequence_Pseudopropionibacterium
      propionicum

<400> SEQUENCE: 3

Met Asn Leu Val Glu Ala Leu Lys Asn Arg Lys Val Gln Ile Gly Ile
1               5                   10                  15

Ala Ala Val Ala Val Leu Leu Ala Val Ala Leu Thr Leu Val Trp Val
            20                  25                  30

Leu Gln Pro Lys Asn Asp Asn Pro
            35                  40

<210> SEQ ID NO 4
<211> LENGTH: 28
<212> TYPE: PRT
<213> ORGANISM: Artificial Sequence
<220> FEATURE:
<223> OTHER INFORMATION: Synthetic Sequence_Acidipropionibacterium
      acidipropionici

<400> SEQUENCE: 4
```

```
Met Ile Gly Leu Leu Val Ala Leu Leu Val Ile Ala Val Ala Ala Thr
1               5                   10                  15

Met Ile Trp Arg Gln Thr Arg Asp Val Pro Gln Ala
            20                  25

<210> SEQ ID NO 5
<211> LENGTH: 32
<212> TYPE: PRT
<213> ORGANISM: Artificial Sequence
<220> FEATURE:
<223> OTHER INFORMATION: Synthetic Sequence_Granulicoccus phenolivorans

<400> SEQUENCE: 5

Met Ser Lys Val Thr Lys Ser Arg Trp Leu Pro Ala Ala Leu Ile Ala
1               5                   10                  15

Val Gly Val Ile Val Leu Val Val Leu Ile Val Val Gly Val Ser Ala
            20                  25                  30

<210> SEQ ID NO 6
<211> LENGTH: 10
<212> TYPE: PRT
<213> ORGANISM: Artificial Sequence
<220> FEATURE:
<223> OTHER INFORMATION: Synthetic Sequence_Propionibacterium
      freudenreichii

<400> SEQUENCE: 6

Met Thr Arg Thr Gly Ile Arg Leu Val Arg
1               5                   10

<210> SEQ ID NO 7
<211> LENGTH: 25
<212> TYPE: PRT
<213> ORGANISM: Artificial Sequence
<220> FEATURE:
<223> OTHER INFORMATION: Synthetic Sequence_Propionimicrobium
      lymphophilum

<400> SEQUENCE: 7

Met Ser Gly Lys Ile Gly Lys Ala Ala Ala Leu Leu Val Ile Phe Leu
1               5                   10                  15

Leu Ile Val Ala Gly Ala Ile Tyr Ala
            20                  25

<210> SEQ ID NO 8
<211> LENGTH: 43
<212> TYPE: PRT
<213> ORGANISM: Artificial Sequence
<220> FEATURE:
<223> OTHER INFORMATION: Synthetic Sequence_Actinobacterium LLX17

<400> SEQUENCE: 8

Met Glu Thr Thr Pro Gln Glu Arg His Arg His Asp Thr Arg Arg
1               5                   10                  15

Gly Ser Ala Ile Val Ala Val Val Ala Ile Val Leu Val Ala Leu
            20                  25                  30

Ala Ala Trp Trp Phe Trp Pro Glu Ala Glu Ala
        35                  40

<210> SEQ ID NO 9
<211> LENGTH: 39
<212> TYPE: PRT
<213> ORGANISM: Artificial Sequence
<220> FEATURE:
```

<223> OTHER INFORMATION: Synthetic Sequence_WP_002530979

<400> SEQUENCE: 9

Ala Gly Gly Ala Ala Ser Ser Thr Thr Ala Thr Thr Thr Ser Ser Thr
1               5                   10                  15

Ser Gly Ile Pro Ala Ala Ser Ala Ala Lys Lys Gly Pro Val Pro Ala
            20                  25                  30

Gly Cys Met Lys Thr Pro Lys
        35

<210> SEQ ID NO 10
<211> LENGTH: 38
<212> TYPE: PRT
<213> ORGANISM: Artificial Sequence
<220> FEATURE:
<223> OTHER INFORMATION: Synthetic Sequence_gi504659806

<400> SEQUENCE: 10

Gln Ala Gly Ala Thr Ala Ser Ser Ser Gly Thr Ala Asp Gly Ala Ala
1               5                   10                  15

Val Thr Ser Pro Glu Ala Ser Ser Pro Pro Ala Ser Pro Gly Ala Cys
            20                  25                  30

Val Thr Pro Asp Ala Ala
        35

<210> SEQ ID NO 11
<211> LENGTH: 40
<212> TYPE: PRT
<213> ORGANISM: Artificial Sequence
<220> FEATURE:
<223> OTHER INFORMATION: Synthetic Sequence_test

<400> SEQUENCE: 11

Ala Thr Gly Ser Pro Ala Ser Leu Ala Pro Ala Ser Ser Ala Ser Ala
1               5                   10                  15

Thr Pro Thr Pro Thr Pro Ser Pro Thr Pro Ser Arg Ala Ala Val Pro
            20                  25                  30

Ala Gly Cys Met Ala Lys Gln Gln
        35                  40

<210> SEQ ID NO 12
<211> LENGTH: 57
<212> TYPE: PRT
<213> ORGANISM: Artificial Sequence
<220> FEATURE:
<223> OTHER INFORMATION: Synthetic Sequence_test

<400> SEQUENCE: 12

Thr Arg Thr Gln Gly Gly Thr Ser Ala Gly Glu Pro Leu Arg Val Asn
1               5                   10                  15

Gly Gln Thr Ser Gln Pro Glu Glu Ser Ser Gly Gly Glu Ser Thr Val
            20                  25                  30

Ala Pro Ala Ser Gln Asp Pro Ser Ala Ala Ser Thr Ala Thr Pro Gly
        35                  40                  45

Asp Thr Cys Thr Thr Thr Asp Gln Pro
    50                  55

<210> SEQ ID NO 13
<211> LENGTH: 73
<212> TYPE: PRT
<213> ORGANISM: Artificial Sequence
<220> FEATURE:

<223> OTHER INFORMATION: Synthetic Sequence_test

<400> SEQUENCE: 13

Leu Leu Ala Leu Val Ala Leu Val Val Gly Leu Gly Leu Val Ala Trp
1               5                   10                  15

Arg Val Val Leu Ile Thr Pro Ser Asp Tyr Glu Lys Gln Leu Pro Thr
            20                  25                  30

Ala Pro Gly Ala Pro Ile Pro Asp Ala Ala Ser Ala Gly Leu Ala Gly
        35                  40                  45

Thr Gly Pro Ala His Gly Pro Ala Asn Gly Thr Gly Gly Ala Val
    50                  55                  60

Pro Ala Gly Cys Asp Pro Gln Pro Arg
65                  70

<210> SEQ ID NO 14
<211> LENGTH: 30
<212> TYPE: PRT
<213> ORGANISM: Artificial Sequence
<220> FEATURE:
<223> OTHER INFORMATION: Synthetic Sequence_test

<400> SEQUENCE: 14

Leu Asn Asn Arg Lys Val Asp Thr Pro Thr Pro Ala Asn Val Gln Thr
1               5                   10                  15

Pro Thr Gln Pro Ala Ile Pro Glu Gly Cys Pro Thr Thr Pro
            20                  25                  30

<210> SEQ ID NO 15
<211> LENGTH: 27
<212> TYPE: PRT
<213> ORGANISM: Artificial Sequence
<220> FEATURE:
<223> OTHER INFORMATION: Synthetic Sequence_test

<400> SEQUENCE: 15

Asp Pro Ala Pro Ala Ala Ala Pro Ser Ser Thr Ala Ala Pro Val Glu
1               5                   10                  15

Thr Pro Ala Pro Cys Thr Ser Thr Ala Thr Gly
            20                  25

<210> SEQ ID NO 16
<211> LENGTH: 27
<212> TYPE: PRT
<213> ORGANISM: Artificial Sequence
<220> FEATURE:
<223> OTHER INFORMATION: Synthetic Sequence_test

<400> SEQUENCE: 16

Pro Ile Val Pro Val Lys Tyr Ser Ile Asp Gly Met Lys Ala Ser Ala
1               5                   10                  15

Lys Val Leu Ser Arg Gly Val Asp Glu Thr Gly
            20                  25

<210> SEQ ID NO 17
<211> LENGTH: 27
<212> TYPE: PRT
<213> ORGANISM: artificial
<220> FEATURE:
<223> OTHER INFORMATION: Synthetic Sequence_test

<400> SEQUENCE: 17

Gly Phe Val Pro Val Arg Tyr Ser Ile Glu Ser Ile Gly Val Glu Asp
1               5                   10                  15

Lys Val Ile Ser Gly Gly Arg Glu Glu Asp Gly
            20                  25

<210> SEQ ID NO 18
<211> LENGTH: 27
<212> TYPE: PRT
<213> ORGANISM: Artificial Sequence
<220> FEATURE:
<223> OTHER INFORMATION: Synthetic Sequence_test

<400> SEQUENCE: 18

Pro Ile Thr Pro Ser Thr Met Lys Ile Asp Arg Met Lys Val Ser Ser
1               5                   10                  15

Pro Val Leu Ser Leu Gly Leu Asp Thr Asp Asn
            20                  25

<210> SEQ ID NO 19
<211> LENGTH: 27
<212> TYPE: PRT
<213> ORGANISM: Artificial Sequence
<220> FEATURE:
<223> OTHER INFORMATION: Synthetic Sequence_test

<400> SEQUENCE: 19

Leu Thr Asp Pro Ser Thr Met Tyr Ile Asp Ser Met Lys Glu Lys Ser
1               5                   10                  15

Glu Val Gln Ser Leu Gly Glu Glu Pro Asp Gly
            20                  25

<210> SEQ ID NO 20
<211> LENGTH: 27
<212> TYPE: PRT
<213> ORGANISM: Artificial Sequence
<220> FEATURE:
<223> OTHER INFORMATION: Synthetic Sequence_test

<400> SEQUENCE: 20

Pro Leu Val Gly Ala Arg Met Thr Leu Glu Gly His Arg Arg Ser Met
1               5                   10                  15

Pro Met Met Ser Leu Gly Val Ala Pro Asp Gln
            20                  25

<210> SEQ ID NO 21
<211> LENGTH: 27
<212> TYPE: PRT
<213> ORGANISM: Artificial Sequence
<220> FEATURE:
<223> OTHER INFORMATION: Synthetic Sequence_test

<400> SEQUENCE: 21

Asp Ile Val Asp Asp Pro Thr Gln Leu Leu Val Ile Gly Thr Asp Thr
1               5                   10                  15

Pro Leu Lys Met Met Ser Leu Gly Leu Asp Ser
            20                  25

<210> SEQ ID NO 22
<211> LENGTH: 27
<212> TYPE: PRT
<213> ORGANISM: Artificial Sequence
<220> FEATURE:
<223> OTHER INFORMATION: Synthetic Sequence_test

<400> SEQUENCE: 22

Pro Phe Thr Pro Thr Ser Val Thr Val Pro Gly Ala Ile Asp Ala Ala

```
1               5                   10                  15
Arg Val Val Pro Val Pro Pro Asp Gly Glu Val
            20                  25
```

<210> SEQ ID NO 23
<211> LENGTH: 53
<212> TYPE: PRT
<213> ORGANISM: Artificial Sequence
<220> FEATURE:
<223> OTHER INFORMATION: Synthetic Sequence_test

<400> SEQUENCE: 23

```
Ala Ala Gly Ala Pro Pro Lys Asn Asp Pro Ser Ser Met Ala Trp Phe
1               5                   10                  15

Asn Gln Gly Pro Lys Ile Gly Ser Asp Lys Gly Asn Ala Val Leu Thr
            20                  25                  30

Ala His Thr Tyr His Lys Gly Gly Ala Leu Gly Asn Arg Leu Tyr Asp
        35                  40                  45

Lys Asn Asn Gly Ile
        50
```

<210> SEQ ID NO 24
<211> LENGTH: 49
<212> TYPE: PRT
<213> ORGANISM: artificial
<220> FEATURE:
<223> OTHER INFORMATION: Synthetic Sequence_test

<400> SEQUENCE: 24

```
Ala Val Ala Ala Pro Pro Lys Gly Glu Pro Arg Thr Ala Leu Trp Trp
1               5                   10                  15

Asn Glu Gly Pro Lys Ala Ala Ser Asn Ala Gly Gln Val Val Leu Thr
            20                  25                  30

Ile His Thr Tyr Gln Thr Gly Asp Ala Val Gly Asn Met Leu Tyr Ser
        35                  40                  45

Asp
```

<210> SEQ ID NO 25
<211> LENGTH: 49
<212> TYPE: PRT
<213> ORGANISM: Artificial Sequence
<220> FEATURE:
<223> OTHER INFORMATION: Synthetic Sequence_test

<400> SEQUENCE: 25

```
Ala Ala Ala Ala Pro Pro Lys Asp Glu Pro Thr Thr Thr Ala Trp Tyr
1               5                   10                  15

Asn Arg Gly Pro Arg Pro Gly Ser Ala Lys Gly Lys Val Val Leu Thr
            20                  25                  30

Ile His Thr Tyr His Lys Gly Gly Ala Leu Gly Asn Glu Leu Arg Gln
        35                  40                  45

Pro
```

<210> SEQ ID NO 26
<211> LENGTH: 50
<212> TYPE: PRT
<213> ORGANISM: Artificial Sequence
<220> FEATURE:
<223> OTHER INFORMATION: Synthetic Sequence_test

<400> SEQUENCE: 26

-continued

```
Thr Pro Lys Ala Pro Thr Gly Gly Glu Gln Thr Gly Trp Tyr Asn Arg
1               5                   10                  15

Ser Pro Asp Val Gly Ser Lys Gln Gly Asn Val Met Met Thr Ile His
                20                  25                  30

Thr Phe Ser Pro Lys Asn Gly Ser Asn Ala Leu Gly Asn Arg Met Tyr
            35                  40                  45

Ala Pro
    50

<210> SEQ ID NO 27
<211> LENGTH: 49
<212> TYPE: PRT
<213> ORGANISM: Artificial Sequence
<220> FEATURE:
<223> OTHER INFORMATION: Synthetic Sequence_test

<400> SEQUENCE: 27

Ala Pro Ala Ser Pro Pro Ser His Leu Gly Asn Thr Val Gly Trp Phe
1               5                   10                  15

Asp Arg Ser Val Pro Pro Gly Ala Ala Gln Gly Arg Ala Val Leu Thr
                20                  25                  30

Ser His Thr Phe Arg Trp Gly Gly Ala Leu Gly Asn Glu Leu Asn His
            35                  40                  45

Gly

<210> SEQ ID NO 28
<211> LENGTH: 51
<212> TYPE: PRT
<213> ORGANISM: Artificial Sequence
<220> FEATURE:
<223> OTHER INFORMATION: Synthetic Sequence_test

<400> SEQUENCE: 28

Glu Gly Ala Ala Gln Ala Pro Pro Asn Glu Gly His Thr Val Ala
1               5                   10                  15

Trp Phe Thr Gly Gly Pro Lys Val Gly Ser Pro Glu Gly Met Ala Thr
                20                  25                  30

Leu Ser Ala His Thr Tyr Arg Tyr Gly Gly Leu Gly Asn Asp Leu
            35                  40                  45

Ile Asn Gly
    50

<210> SEQ ID NO 29
<211> LENGTH: 49
<212> TYPE: PRT
<213> ORGANISM: Artificial Sequence
<220> FEATURE:
<223> OTHER INFORMATION: Synthetic Sequence_test

<400> SEQUENCE: 29

Ser Gly Thr Leu Pro Glu Ser Glu Gly Arg Ala Phe Ala Trp Glu Pro
1               5                   10                  15

Ser Pro Gly Ala Thr Pro Gly Ser Pro Lys Gly Asn Val Leu Met Asn
                20                  25                  30

Val His Thr Phe Pro Gly Asp Gly Ala Asn Gly Asn Val Leu Leu Asp
            35                  40                  45

Gln

<210> SEQ ID NO 30
<211> LENGTH: 50
```

-continued

```
<212> TYPE: PRT
<213> ORGANISM: Artificial Sequence
<220> FEATURE:
<223> OTHER INFORMATION: Synthetic Sequence_test

<400> SEQUENCE: 30

Lys Lys Gly Asp Ile Ile Arg Leu Thr Asp Lys Thr Gly Gln Thr Val
1               5                   10                  15

Cys Tyr Arg Tyr Asp His Asp Thr Lys Val Met Val Lys Asp Tyr Asn
            20                  25                  30

Pro Asn Ser Asn Ile Leu Tyr Asp Asn Asn Gly Pro Ala Gln Ala Ala
        35                  40                  45

Ile Val
    50

<210> SEQ ID NO 31
<211> LENGTH: 55
<212> TYPE: PRT
<213> ORGANISM: Artificial Sequence
<220> FEATURE:
<223> OTHER INFORMATION: Synthetic Sequence_test

<400> SEQUENCE: 31

Asn Gly Gly Leu Leu Lys Glu Gly Ala Val Leu Lys Leu Tyr Ala Glu
1               5                   10                  15

Asp Gly Arg Val Ala Cys Tyr Lys Tyr Thr Glu Ser Gln Lys Ile Ala
            20                  25                  30

Val Ser Glu Tyr Lys Pro Glu Ser Asp Val Leu Glu Arg His Glu Gly
        35                  40                  45

Asp Pro Ala Leu Ala Ile Val
    50              55

<210> SEQ ID NO 32
<211> LENGTH: 54
<212> TYPE: PRT
<213> ORGANISM: Artificial Sequence
<220> FEATURE:
<223> OTHER INFORMATION: Synthetic Sequence_test

<400> SEQUENCE: 32

Gly Ser Gly Leu Thr Lys Gly Asp Leu Ile Arg Met Thr Asp Ser Ser
1               5                   10                  15

Gly Arg Gln Ala Cys Tyr Arg Tyr Asp His Asn Val Lys Val Met Val
            20                  25                  30

Lys Asp Tyr Asp Pro Asp Ser Ile Ile Tyr Asp Asp His Gly Arg
        35                  40                  45

Pro Met Leu Ala Ile Val
    50

<210> SEQ ID NO 33
<211> LENGTH: 53
<212> TYPE: PRT
<213> ORGANISM: Artificial Sequence
<220> FEATURE:
<223> OTHER INFORMATION: Synthetic Sequence_test

<400> SEQUENCE: 33

Gly Ala Leu Lys Ser Gly Asp Val Phe Arg Ile Thr Asp Asp Ser Gly
1               5                   10                  15

Lys Gln Val Cys Tyr Lys Tyr Ser Gly Asn Thr Lys Ile Trp Val Ala
            20                  25                  30
```

```
Ser Tyr Asp Glu Asn Ser Asp Val Trp His Asn Pro Asn Gly Lys Pro
         35                  40                  45

Gln Leu Ala Ile Leu
     50

<210> SEQ ID NO 34
<211> LENGTH: 52
<212> TYPE: PRT
<213> ORGANISM: artificial
<220> FEATURE:
<223> OTHER INFORMATION: Synthetic Sequence_test

<400> SEQUENCE: 34

Leu Leu Ala Pro Gly Asp Val Ile Arg Ile Ser Asp Gly Gly Gly Arg
1               5                   10                  15

Asp Val Cys Tyr Arg Phe Thr Gly Ala Leu Lys Val Arg Val Ser Asp
            20                  25                  30

Tyr Arg Pro Asp Ser Gly Leu Val Tyr Asp Asn Asp Gly Pro Ala Gln
         35                  40                  45

Leu Val Ile Val
     50

<210> SEQ ID NO 35
<211> LENGTH: 55
<212> TYPE: PRT
<213> ORGANISM: Artificial Sequence
<220> FEATURE:
<223> OTHER INFORMATION: Synthetic Sequence_test

<400> SEQUENCE: 35

Ala Trp Thr Glu Gly Lys Thr Val Ile Lys Ile Ser Asn Asp Glu Gly
1               5                   10                  15

Lys Ser Ala Cys Tyr Arg Tyr Ser Gly Ser Lys His Leu Trp Val Ala
            20                  25                  30

Asp Tyr Asn Pro Glu Val Asn Gly Asp Leu Ile Tyr Asp Asp Glu Gly
         35                  40                  45

Ser Pro Arg Phe Ser Leu Thr
     50                  55

<210> SEQ ID NO 36
<211> LENGTH: 52
<212> TYPE: PRT
<213> ORGANISM: artificial
<220> FEATURE:
<223> OTHER INFORMATION: Synthetic Sequence_test

<400> SEQUENCE: 36

Leu Pro Glu Gly Gly Gln Ile Val Leu Ala Gly Thr Ala Pro Asp Gly
1               5                   10                  15

Ser Ala Val Glu Leu Cys Tyr Val Val Ser Glu Arg Leu Glu Met Pro
            20                  25                  30

Ala Thr Glu Leu Leu Pro Arg Tyr Tyr Ala Thr Asp Gly Pro Pro Gln
         35                  40                  45

Val Ala Ile Val
     50

<210> SEQ ID NO 37
<211> LENGTH: 24
<212> TYPE: PRT
<213> ORGANISM: Artificial Sequence
<220> FEATURE:
<223> OTHER INFORMATION: Synthetic Sequence_test
```

```
<400> SEQUENCE: 37

Ile Cys Trp Asp Tyr Val Lys Lys Thr Gly Glu Phe Asp Ser Arg Val
1               5                   10                  15

Ile Phe Tyr Thr Tyr Pro Val Ala
            20

<210> SEQ ID NO 38
<211> LENGTH: 27
<212> TYPE: PRT
<213> ORGANISM: Artificial Sequence
<220> FEATURE:
<223> OTHER INFORMATION: Synthetic Sequence_test

<400> SEQUENCE: 38

Ile Cys Trp Asp His Asn Lys Ser Thr Asn Asp Trp Asp Ser Arg Ala
1               5                   10                  15

Phe Ile Lys Phe Lys Pro Val Thr Asp Ala Ala
            20                  25

<210> SEQ ID NO 39
<211> LENGTH: 25
<212> TYPE: PRT
<213> ORGANISM: Artificial Sequence
<220> FEATURE:
<223> OTHER INFORMATION: Synthetic Sequence_test

<400> SEQUENCE: 39

Ile Cys Trp Asp Tyr Asp Ala Ser Arg Asn Asp Trp Asp Ser Arg Ile
1               5                   10                  15

Val Phe Tyr Ala Thr Pro Val Thr Ala
            20                  25

<210> SEQ ID NO 40
<211> LENGTH: 28
<212> TYPE: PRT
<213> ORGANISM: Artificial Sequence
<220> FEATURE:
<223> OTHER INFORMATION: Synthetic Sequence_test

<400> SEQUENCE: 40

Ile Cys Trp Asp Tyr Asn Gln Pro Lys Asp Asp Trp Asp Ser Arg Ile
1               5                   10                  15

Val Phe Tyr Ala Asp Tyr Met Pro Met Gly Thr Lys
            20                  25

<210> SEQ ID NO 41
<211> LENGTH: 26
<212> TYPE: PRT
<213> ORGANISM: Artificial Sequence
<220> FEATURE:
<223> OTHER INFORMATION: Synthetic Sequence_test

<400> SEQUENCE: 41

Val Cys Ser Asp Tyr Pro Leu Val Gly Asp Ala Ala Ala Ser Arg Ala
1               5                   10                  15

Leu Tyr Tyr Ala Asp Leu Val Thr Gly Pro
            20                  25

<210> SEQ ID NO 42
<211> LENGTH: 26
<212> TYPE: PRT
<213> ORGANISM: Artificial Sequence
<220> FEATURE:
```

```
<223> OTHER INFORMATION: Synthetic Sequence_test

<400> SEQUENCE: 42

Val Cys Ser Asp Tyr Pro Asp Asn Gly Ser Asp Val Thr Leu Gly Arg
1               5                   10                  15

Met Ile Phe Tyr Gly Asp Leu Ile Thr Gly
            20                  25

<210> SEQ ID NO 43
<211> LENGTH: 25
<212> TYPE: PRT
<213> ORGANISM: Artificial Sequence
<220> FEATURE:
<223> OTHER INFORMATION: Synthetic Sequence_test

<400> SEQUENCE: 43

Val Cys Ser Gly Glu Arg Arg Gly Pro Gly Asp Trp Thr His Arg Thr
1               5                   10                  15

Val Trp Phe Ala Ser Pro Val Ser Thr
            20                  25

<210> SEQ ID NO 44
<211> LENGTH: 5
<212> TYPE: PRT
<213> ORGANISM: Artificial Sequence
<220> FEATURE:
<223> OTHER INFORMATION: Synthetic Sequence_test
<220> FEATURE:
<221> NAME/KEY: Xaa
<222> LOCATION: (3)..(3)
<223> OTHER INFORMATION: Xaa can be any amino acid, with the exception
      of Pro

<400> SEQUENCE: 44

Leu Pro Xaa Thr Gly
1               5

<210> SEQ ID NO 45
<211> LENGTH: 5
<212> TYPE: PRT
<213> ORGANISM: Artificial Sequence
<220> FEATURE:
<223> OTHER INFORMATION: Synthetic Sequence_test
<220> FEATURE:
<221> NAME/KEY: Xaa
<222> LOCATION: (3)..(3)
<223> OTHER INFORMATION: Xaa can be any amino acid, with the exception
      of Pro

<400> SEQUENCE: 45

Asn Pro Xaa Thr Gly
1               5

<210> SEQ ID NO 46
<211> LENGTH: 5
<212> TYPE: PRT
<213> ORGANISM: Artificial Sequence
<220> FEATURE:
<223> OTHER INFORMATION: Synthetic Sequence_test
<220> FEATURE:
<221> NAME/KEY: Xaa
<222> LOCATION: (3)..(3)
<223> OTHER INFORMATION: Xaa can be any amino acid, with the exception
      of Pro

<400> SEQUENCE: 46

Leu Pro Xaa Thr Gly
1               5
```

```
<210> SEQ ID NO 47
<211> LENGTH: 5
<212> TYPE: PRT
<213> ORGANISM: Artificial Sequence
<220> FEATURE:
<223> OTHER INFORMATION: Synthetic Sequence_test
<220> FEATURE:
<221> NAME/KEY: Xaa
<222> LOCATION: (3)..(3)
<223> OTHER INFORMATION: Xaa can be any amino acid, with the exception
      of Pro

<400> SEQUENCE: 47

Leu Pro Xaa Thr Ala
1               5

<210> SEQ ID NO 48
<211> LENGTH: 5
<212> TYPE: PRT
<213> ORGANISM: Artificial Sequence
<220> FEATURE:
<223> OTHER INFORMATION: Synthetic Sequence_test
<220> FEATURE:
<221> NAME/KEY: Xaa
<222> LOCATION: (3)..(3)
<223> OTHER INFORMATION: Xaa can be any amino acid, with the exception
      of Pro

<400> SEQUENCE: 48

Leu Ala Xaa Thr Gly
1               5

<210> SEQ ID NO 49
<211> LENGTH: 5
<212> TYPE: PRT
<213> ORGANISM: Artificial Sequence
<220> FEATURE:
<223> OTHER INFORMATION: Synthetic Sequence_test

<400> SEQUENCE: 49

Leu Pro Gln Thr Gly
1               5

<210> SEQ ID NO 50
<211> LENGTH: 6
<212> TYPE: PRT
<213> ORGANISM: Artificial Sequence
<220> FEATURE:
<223> OTHER INFORMATION: Synthetic Sequence_test
<220> FEATURE:
<221> NAME/KEY: Xaa
<222> LOCATION: (3)..(3)
<223> OTHER INFORMATION: Xaa can be any amino acid, with the exception
      of Pro

<400> SEQUENCE: 50

Leu Pro Xaa Thr Gly Glu
1               5

<210> SEQ ID NO 51
<211> LENGTH: 8
<212> TYPE: PRT
<213> ORGANISM: Artificial Sequence
<220> FEATURE:
<223> OTHER INFORMATION: Synthetic Sequence_test

<400> SEQUENCE: 51

Asp Asn Pro Asn Thr Gly Asp Glu
```

```
<210> SEQ ID NO 52
<211> LENGTH: 9
<212> TYPE: PRT
<213> ORGANISM: Artificial Sequence
<220> FEATURE:
<223> OTHER INFORMATION: Synthetic Sequence_test
<220> FEATURE:
<221> NAME/KEY: Xaa
<222> LOCATION: (4)..(4)
<223> OTHER INFORMATION: Xaa can be any amino acid, with the exception
      of Pro

<400> SEQUENCE: 52

Glu Asn Pro Xaa Thr Asn Ala Gly Thr
1               5

<210> SEQ ID NO 53
<211> LENGTH: 8
<212> TYPE: PRT
<213> ORGANISM: Artificial Sequence
<220> FEATURE:
<223> OTHER INFORMATION: Synthetic Sequence_test
<220> FEATURE:
<221> NAME/KEY: Xaa
<222> LOCATION: (4)..(4)
<223> OTHER INFORMATION: Xaa can be any amino acid, with the exception
      of Pro

<400> SEQUENCE: 53

Lys Leu Pro Xaa Thr Ala Ser Asn
1               5

<210> SEQ ID NO 54
<211> LENGTH: 8
<212> TYPE: PRT
<213> ORGANISM: Artificial Sequence
<220> FEATURE:
<223> OTHER INFORMATION: Synthetic Sequence_test
<220> FEATURE:
<221> NAME/KEY: Xaa
<222> LOCATION: (4)..(4)
<223> OTHER INFORMATION: Xaa can be any amino acid, with the exception
      of Pro

<400> SEQUENCE: 54

Ala Leu Ala Xaa Thr Gly Ser Glu
1               5

<210> SEQ ID NO 55
<211> LENGTH: 6
<212> TYPE: PRT
<213> ORGANISM: Artificial Sequence
<220> FEATURE:
<223> OTHER INFORMATION: Synthetic Sequence_test

<400> SEQUENCE: 55

Leu Pro Gln Thr Gly Glu
1               5

<210> SEQ ID NO 56
<211> LENGTH: 9
<212> TYPE: PRT
<213> ORGANISM: Artificial Sequence
<220> FEATURE:
<223> OTHER INFORMATION: Synthetic Sequence_test

<400> SEQUENCE: 56
```

Gln Ala Leu Pro Gln Thr Gly Glu Thr
1               5

<210> SEQ ID NO 57
<211> LENGTH: 6
<212> TYPE: PRT
<213> ORGANISM: Artificial Sequence
<220> FEATURE:
<223> OTHER INFORMATION: Synthetic Sequence_test

<400> SEQUENCE: 57

Leu Pro Gln Thr Gly Gly
1               5

<210> SEQ ID NO 58
<211> LENGTH: 31
<212> TYPE: PRT
<213> ORGANISM: Artificial Sequence
<220> FEATURE:
<223> OTHER INFORMATION: Synthetic Sequence_test

<400> SEQUENCE: 58

Ala Gly Ser Trp Ser His Pro Gln Phe Glu Lys Gly Gly Ser Gly
1               5                   10                  15

Gly Gly Ser Gly Gly Ser Ala Trp Ser His Pro Gln Phe Glu Lys
            20                  25                  30

<210> SEQ ID NO 59
<211> LENGTH: 217
<212> TYPE: PRT
<213> ORGANISM: Artificial Sequence
<220> FEATURE:
<223> OTHER INFORMATION: Synthetic Sequence_Propionibacterium acnes
      sortase F

<400> SEQUENCE: 59

Met Val Val Ile Ala Leu Ile Ile Ala Ala Ile Ala Val Ile Phe Ile
1               5                   10                  15

Gln Arg Asn Asn Asp Ser Asp Ser Ala Gly Gly Ala Ala Ser Ser Thr
            20                  25                  30

Thr Ala Thr Thr Thr Ser Ser Thr Ser Gly Ile Pro Ala Ala Ser Ala
        35                  40                  45

Ala Lys Lys Gly Pro Val Pro Ala Gly Cys Met Lys Thr Pro Lys Pro
    50                  55                  60

Ile Val Pro Val Lys Tyr Ser Ile Asp Gly Met Lys Ala Ser Ala Lys
65                  70                  75                  80

Val Leu Ser Arg Gly Val Asp Glu Thr Gly Ala Ala Gly Ala Pro Pro
                85                  90                  95

Lys Asn Asp Pro Ser Ser Met Ala Trp Phe Asn Gln Gly Pro Lys Ile
            100                 105                 110

Gly Ser Asp Lys Gly Asn Ala Val Leu Thr Ala His Thr Tyr His Lys
        115                 120                 125

Gly Gly Ala Leu Gly Asn Arg Leu Tyr Asp Lys Asn Gly Ile Lys
    130                 135                 140

Lys Gly Asp Ile Ile Arg Leu Thr Asp Lys Thr Gly Gln Thr Val Cys
145                 150                 155                 160

Tyr Arg Tyr Asp His Asp Thr Lys Val Met Val Lys Asp Tyr Asn Pro
                165                 170                 175

Asn Ser Asn Ile Leu Tyr Asp Asn Asn Gly Pro Ala Gln Ala Ala Ile
            180                 185                 190

Val Ile Cys Trp Asp Tyr Val Lys Thr Gly Glu Phe Asp Ser Arg
            195                 200                 205

Val Ile Phe Tyr Thr Tyr Pro Val Ala
            210                 215

<210> SEQ ID NO 60
<211> LENGTH: 236
<212> TYPE: PRT
<213> ORGANISM: Artificial Sequence
<220> FEATURE:
<223> OTHER INFORMATION: Synthetic Sequence_Pseudopropionibacterium
      propionicum sortase F

<400> SEQUENCE: 60

Met Asn Leu Val Glu Ala Leu Lys Asn Arg Lys Val Gln Ile Gly Ile
1               5                   10                  15

Ala Ala Val Ala Val Leu Leu Ala Val Ala Leu Thr Leu Val Trp Val
            20                  25                  30

Leu Gln Pro Lys Asn Asp Asn Pro Gln Ala Gly Ala Thr Ala Ser Ser
        35                  40                  45

Ser Gly Thr Ala Asp Gly Ala Ala Val Thr Ser Pro Glu Ala Ser Ser
    50                  55                  60

Pro Pro Ala Ser Pro Gly Ala Cys Val Thr Pro Asp Ala Ala Gly Phe
65                  70                  75                  80

Val Pro Val Arg Tyr Ser Ile Glu Ser Ile Gly Val Glu Asp Lys Val
                85                  90                  95

Ile Ser Gly Gly Arg Glu Glu Asp Gly Ala Val Ala Ala Pro Pro Lys
            100                 105                 110

Gly Glu Pro Arg Thr Ala Leu Trp Trp Asn Glu Gly Pro Lys Ala Ala
        115                 120                 125

Ser Asn Ala Gly Gln Val Val Leu Thr Ile His Thr Tyr Gln Thr Gly
    130                 135                 140

Asp Ala Val Gly Asn Met Leu Tyr Ser Asp Asn Gly Gly Leu Leu Lys
145                 150                 155                 160

Glu Gly Ala Val Leu Lys Leu Tyr Ala Glu Asp Gly Arg Val Ala Cys
                165                 170                 175

Tyr Lys Tyr Thr Glu Ser Gln Lys Ile Ala Val Ser Glu Tyr Lys Pro
            180                 185                 190

Glu Ser Asp Val Leu Glu Arg His Glu Gly Asp Pro Ala Leu Ala Ile
        195                 200                 205

Val Ile Cys Trp Asp His Asn Lys Ser Thr Asn Asp Trp Asp Ser Arg
    210                 215                 220

Ala Phe Ile Lys Phe Lys Pro Val Thr Asp Ala Ala
225                 230                 235

<210> SEQ ID NO 61
<211> LENGTH: 241
<212> TYPE: PRT
<213> ORGANISM: Artificial Sequence
<220> FEATURE:
<223> OTHER INFORMATION: Synthetic Sequence_Acidipropionibacterium
      acidipropionici sortase F

<400> SEQUENCE: 61

Met Thr Gln Asn Pro Ser Ser Glu Asn Arg Pro Gly His Ser Arg Arg
1               5                   10                  15

Thr Arg Leu Ile Gly Leu Leu Val Ala Leu Leu Val Ile Ala Val Ala
            20                  25                  30

```
Ala Thr Met Ile Trp Arg Gln Thr Arg Asp Val Pro Gln Ala Ala Thr
            35                  40                  45

Gly Ser Pro Ala Ser Leu Ala Pro Ala Ser Ser Ala Ser Ala Thr Pro
 50                  55                  60

Thr Pro Thr Pro Ser Pro Thr Pro Ser Arg Ala Ala Val Pro Ala Gly
65                  70                  75                  80

Cys Met Ala Lys Gln Gln Pro Ile Thr Pro Ser Thr Met Lys Ile Asp
                85                  90                  95

Arg Met Lys Val Ser Ser Pro Val Leu Ser Leu Gly Leu Asp Thr Asp
                100                 105                 110

Asn Ala Ala Ala Pro Pro Lys Asp Glu Pro Thr Thr Thr Ala Trp
            115                 120                 125

Tyr Asn Arg Gly Pro Arg Pro Gly Ser Ala Lys Gly Lys Val Val Leu
            130                 135                 140

Thr Ile His Thr Tyr His Lys Gly Gly Ala Leu Gly Asn Glu Leu Arg
145                 150                 155                 160

Gln Pro Gly Ser Gly Leu Thr Lys Gly Asp Leu Ile Arg Met Thr Asp
                165                 170                 175

Ser Ser Gly Arg Gln Ala Cys Tyr Arg Tyr Asp His Asn Val Lys Val
                180                 185                 190

Met Val Lys Asp Tyr Asp Pro Asp Ser Asp Ile Ile Tyr Asp Asp His
                195                 200                 205

Gly Arg Pro Met Leu Ala Ile Val Ile Cys Trp Asp Tyr Asp Ala Ser
            210                 215                 220

Arg Asn Asp Trp Asp Ser Arg Ile Val Phe Tyr Ala Thr Pro Val Thr
225                 230                 235                 240

Ala

<210> SEQ ID NO 62
<211> LENGTH: 247
<212> TYPE: PRT
<213> ORGANISM: Artificial Sequence
<220> FEATURE:
<223> OTHER INFORMATION: Synthetic Sequence_Granulicoccus phenolivorans
      sortase F

<400> SEQUENCE: 62

Met Ser Lys Val Thr Lys Ser Arg Trp Leu Pro Ala Leu Ile Ala
1               5                   10                  15

Val Gly Val Ile Val Leu Val Val Leu Ile Val Val Gly Val Ser Ala
                20                  25                  30

Thr Arg Thr Gln Gly Gly Thr Ser Ala Gly Glu Pro Leu Arg Val Asn
            35                  40                  45

Gly Gln Thr Ser Gln Pro Glu Glu Ser Ser Gly Gly Glu Ser Thr Val
 50                  55                  60

Ala Pro Ala Ser Gln Asp Pro Ser Ala Ala Ser Thr Ala Thr Pro Gly
65                  70                  75                  80

Asp Thr Cys Thr Thr Asp Gln Pro Leu Thr Asp Pro Ser Thr Met
                85                  90                  95

Tyr Ile Asp Ser Met Lys Glu Lys Ser Glu Val Gln Ser Leu Gly Glu
                100                 105                 110

Glu Pro Asp Gly Thr Pro Lys Ala Pro Thr Gly Gly Glu Gln Thr Gly
            115                 120                 125

Trp Tyr Asn Arg Ser Pro Asp Val Gly Ser Lys Gln Gly Asn Val Met
            130                 135                 140
```

Met Thr Ile His Thr Phe Ser Pro Lys Asn Gly Ser Asn Ala Leu Gly
145                 150                 155                 160

Asn Arg Met Tyr Ala Pro Gly Ala Leu Lys Ser Gly Asp Val Phe Arg
                165                 170                 175

Ile Thr Asp Asp Ser Gly Lys Gln Val Cys Tyr Lys Tyr Ser Gly Asn
            180                 185                 190

Thr Lys Ile Trp Val Ala Ser Tyr Asp Glu Asn Ser Asp Val Trp His
        195                 200                 205

Asn Pro Asn Gly Lys Pro Gln Leu Ala Ile Leu Cys Trp Asp Tyr
    210                 215                 220

Asn Gln Pro Lys Asp Asp Trp Asp Ser Arg Ile Val Phe Tyr Ala Asp
225                 230                 235                 240

Tyr Met Pro Met Gly Thr Lys
                245

<210> SEQ ID NO 63
<211> LENGTH: 237
<212> TYPE: PRT
<213> ORGANISM: Artificial Sequence
<220> FEATURE:
<223> OTHER INFORMATION: Synthetic Sequence_Propionibacterium
      freudenreichii sortase F

<400> SEQUENCE: 63

Met Thr Arg Thr Gly Ile Arg Leu Val Arg Leu Leu Ala Leu Val Ala
1               5                   10                  15

Leu Val Val Gly Leu Gly Leu Val Ala Trp Arg Val Val Leu Ile Thr
            20                  25                  30

Pro Ser Asp Tyr Glu Lys Gln Leu Pro Thr Ala Pro Gly Ala Pro Ile
        35                  40                  45

Pro Asp Ala Ala Ser Ala Gly Leu Ala Gly Thr Gly Pro Ala His Gly
    50                  55                  60

Pro Ala Asn Gly Thr Gly Gly Ala Val Pro Ala Gly Cys Asp Pro
65                  70                  75                  80

Gln Pro Arg Pro Leu Val Gly Ala Arg Met Thr Leu Glu Gly His Arg
                85                  90                  95

Arg Ser Met Pro Met Met Ser Leu Gly Val Ala Pro Asp Gln Ala Pro
            100                 105                 110

Ala Ser Pro Pro Ser His Leu Gly Asn Thr Val Gly Trp Phe Asp Arg
        115                 120                 125

Ser Val Pro Pro Gly Ala Ala Gln Gly Arg Ala Val Leu Thr Ser His
    130                 135                 140

Thr Phe Arg Trp Gly Gly Ala Leu Gly Asn Glu Leu Asn His Gly Leu
145                 150                 155                 160

Leu Ala Pro Gly Asp Val Ile Arg Ile Ser Asp Gly Gly Arg Asp
                165                 170                 175

Val Cys Tyr Arg Phe Thr Gly Ala Leu Lys Val Arg Val Ser Asp Tyr
            180                 185                 190

Arg Pro Asp Ser Gly Leu Val Tyr Asp Asn Asp Gly Pro Ala Gln Leu
        195                 200                 205

Val Ile Val Val Cys Ser Asp Tyr Pro Leu Val Gly Asp Ala Ala Ala
    210                 215                 220

Ser Arg Ala Leu Tyr Tyr Ala Asp Leu Val Thr Gly Pro
225                 230                 235

<210> SEQ ID NO 64

```
<211> LENGTH: 214
<212> TYPE: PRT
<213> ORGANISM: Artificial Sequence
<220> FEATURE:
<223> OTHER INFORMATION: Synthetic Sequence_Propionimicrobium
      lymphophilum sortase F

<400> SEQUENCE: 64
```

Met Ser Gly Lys Ile Gly Lys Ala Ala Ala Leu Leu Val Ile Phe Leu
1               5                   10                  15

Leu Ile Val Ala Gly Ala Ile Tyr Ala Leu Asn Asn Arg Lys Val Asp
            20                  25                  30

Thr Pro Thr Pro Ala Asn Val Gln Thr Pro Thr Gln Pro Ala Ile Pro
        35                  40                  45

Glu Gly Cys Pro Thr Thr Pro Asp Ile Val Asp Pro Thr Gln Leu
50                  55                  60

Leu Val Ile Gly Thr Asp Thr Pro Leu Lys Met Met Ser Leu Gly Leu
65                  70                  75                  80

Asp Ser Glu Gly Ala Ala Gln Ala Pro Pro Asn Glu Gly His Thr
                85                  90                  95

Val Ala Trp Phe Thr Gly Gly Pro Lys Val Gly Ser Pro Glu Gly Met
            100                 105                 110

Ala Thr Leu Ser Ala His Thr Tyr Arg Tyr Gly Gly Leu Gly Asn
        115                 120                 125

Asp Leu Ile Asn Gly Ala Trp Thr Glu Gly Lys Thr Val Ile Lys Ile
130                 135                 140

Ser Asn Asp Glu Gly Lys Ser Ala Cys Tyr Arg Tyr Ser Gly Ser Lys
145                 150                 155                 160

His Leu Trp Val Ala Asp Tyr Asn Pro Glu Val Asn Gly Asp Leu Ile
                165                 170                 175

Tyr Asp Asp Glu Gly Ser Pro Arg Phe Ser Leu Thr Val Cys Ser Asp
            180                 185                 190

Tyr Pro Asp Asn Gly Ser Asp Val Thr Leu Gly Arg Met Ile Phe Tyr
        195                 200                 205

Gly Asp Leu Ile Thr Gly
    210

```
<210> SEQ ID NO 65
<211> LENGTH: 223
<212> TYPE: PRT
<213> ORGANISM: Artificial Sequence
<220> FEATURE:
<223> OTHER INFORMATION: Synthetic Sequence_actinobacterium LLX17
      sortase F

<400> SEQUENCE: 65
```

Met Glu Thr Thr Pro Gln Glu Arg His Arg His Asp Thr Arg Arg Arg
1               5                   10                  15

Gly Ser Ala Ile Val Ala Val Val Ala Ile Val Leu Val Ala Leu
            20                  25                  30

Ala Ala Trp Trp Phe Trp Pro Glu Ala Glu Ala Asp Pro Ala Pro Ala
        35                  40                  45

Ala Ala Pro Ser Ser Thr Ala Pro Val Glu Thr Pro Ala Pro Cys
50                  55                  60

Thr Ser Thr Ala Thr Gly Pro Phe Thr Pro Thr Ser Val Thr Pro
65                  70                  75                  80

Gly Ala Ile Asp Ala Ala Arg Val Val Pro Val Pro Pro Asp Gly Glu
                85                  90                  95

```
Val Ser Gly Thr Leu Pro Glu Ser Glu Gly Arg Ala Phe Ala Trp Glu
                100                 105                 110

Pro Ser Pro Gly Ala Thr Pro Gly Ser Pro Lys Gly Asn Val Leu Met
            115                 120                 125

Asn Val His Thr Phe Pro Gly Asp Gly Ala Asn Gly Asn Val Leu Leu
        130                 135                 140

Asp Gln Leu Pro Glu Gly Gly Gln Ile Val Leu Ala Gly Thr Ala Pro
145                 150                 155                 160

Asp Gly Ser Ala Val Glu Leu Cys Tyr Val Val Ser Glu Arg Leu Glu
                165                 170                 175

Met Pro Ala Thr Glu Leu Leu Pro Arg Tyr Tyr Ala Thr Asp Gly Pro
            180                 185                 190

Pro Gln Val Ala Ile Val Val Cys Ser Gly Glu Arg Arg Gly Pro Gly
        195                 200                 205

Asp Trp Thr His Arg Thr Val Trp Phe Ala Ser Pro Val Ser Thr
210                 215                 220

<210> SEQ ID NO 66
<211> LENGTH: 229
<212> TYPE: PRT
<213> ORGANISM: Artificial Sequence
<220> FEATURE:
<223> OTHER INFORMATION: Synthetic Sequence_Actinomadura atramentaria
      sortase F

<400> SEQUENCE: 66

Met Ala Arg Arg Cys Pro Trp Gly Arg Ala Ala Arg Arg Thr Gly
1               5                   10                  15

Arg Asn Arg Cys Ala Pro Pro Ala Pro Gln Pro Pro Gly Cys Arg
                20                  25                  30

Phe Gly Arg Asp Ala Ala Pro Val Pro Phe Pro His Glu Thr Pro Tyr
            35                  40                  45

Ala Asp His Ala Pro Asp Ala Pro Gly Ala Asp Arg Leu Arg Pro Ile
        50                  55                  60

Pro Leu Thr Gly Asp Leu Gly Asp Ala Leu Pro Cys Thr Ile Ala Ile
65                  70                  75                  80

Pro Ala Ile Gly Val Ser Ala Ala Leu Ala Gly Val Gly Arg Asp Ala
                85                  90                  95

Ala Gly Arg Val Ala Ala Pro Pro Ala Asp Glu Pro Gly Leu Ala Gly
            100                 105                 110

Trp Tyr Ala Ala Gly Pro Thr Pro Gly Arg Pro Gly Ala Ala Val Ile
        115                 120                 125

Val Gly Asn Pro Leu Gly Ser Pro Gly Ala Gly Phe Ala Arg Leu Gly
130                 135                 140

Asp Leu Ala Cys Gly Asp Ile Val Gly Ile Val Arg Ala Asp Asp Thr
145                 150                 155                 160

Val Ala Val Phe Arg Val Thr Gly Thr Glu Arg Val Pro Trp Asp Asp
                165                 170                 175

Phe Pro Glu Ser Arg Val His Gly Pro Val Asp Gly Pro Glu Leu Arg
            180                 185                 190

Leu Ile Ala Gly Ala Gly Arg Tyr Asp Ala Asp Ala Arg Ser His Pro
        195                 200                 205

Ala Arg Val Ile Val Tyr Ala Ala Phe Thr Ala Ala Tyr Arg Leu Thr
210                 215                 220

Asp Leu Ala Ser Leu
```

-continued

```
<210> SEQ ID NO 67
<211> LENGTH: 309
<212> TYPE: PRT
<213> ORGANISM: Artificial Sequence
<220> FEATURE:
<223> OTHER INFORMATION: Synthetic Sequence_Granulicoccus phenolivorans
      sortase F

<400> SEQUENCE: 67

Met Leu Leu Leu Leu Ser Pro Leu Ala Ile Phe Gly Ala Ile Phe Trp
1               5                   10                  15

Pro Ala Arg Ser Ser Glu Gln Val Ser Ala Ala Pro Ala Trp Pro Ala
            20                  25                  30

Asp Pro Ala Ser Pro Ala Ala Pro Ser Thr Asp Gly Asp Gly Ala Pro
        35                  40                  45

Glu Pro Ala Ala Thr Met Pro Thr Leu Gln Val Pro Glu Pro Asp Pro
    50                  55                  60

Val Pro Ala Asn Glu Pro Pro Ala Thr Pro Gln Pro Ala Ala Glu Ala
65                  70                  75                  80

Gly Pro Gly Thr Gly Asp Ser Gly Gln Pro Gly Ala Asp Arg Gln Gly
                85                  90                  95

Ala Gly Gln Gln Gly Ala Gly Gln Gln Gly Ala Gly Gln Gln Gly Ala
            100                 105                 110

Gly Gln Gln Gly Ala Gly Gln Gln Glu Ala Gly Lys Ser Gly Thr Thr
        115                 120                 125

Gly Ser Gly Thr Thr Gly Ser Gly Thr Thr Gly Ser Gly Gln Ser Ala
    130                 135                 140

Asn Glu Gly Gly Arg Cys Val Ser Ser Gly Gly Ser Phe Thr Gly Val
145                 150                 155                 160

Thr Arg Phe Gln Leu Ser Arg Met Gly Val Asp Val Pro Leu Arg Pro
                165                 170                 175

Val Gly Glu Asp Ser Thr Gly Ala Pro Gly Ala Pro Pro Leu Asn Gln
            180                 185                 190

Met Tyr Ser Ala Ala Trp Tyr Asn Lys Ser Pro Arg Pro Gly Ser Gly
        195                 200                 205

Gln Gly Asn Val Ile Ile Asn Ile His Ser Trp Ala Ser Gly Ala Ala
    210                 215                 220

Leu Gly Asn Asp Leu Arg Thr Gly Ile Arg Ser Gly Asp Val Ile Arg
225                 230                 235                 240

Val Val Gly Asp Gly Gln Val Ala Cys Tyr Arg Phe Arg Asp Met
                245                 250                 255

Ile Lys Phe Arg Val Ala Asp Tyr Asp Pro Arg Ser Gly Ile Tyr His
            260                 265                 270

Asn Lys Ser Gly Arg Pro Gln Leu Ala Ile Met Thr Cys Trp Asp Arg
        275                 280                 285

Asn Lys Ser Thr Gly Glu Tyr Glu Ser Arg Val Ile Met Tyr Ala Asp
    290                 295                 300

Tyr Val Ala Arg Ala
305

<210> SEQ ID NO 68
<211> LENGTH: 250
<212> TYPE: PRT
<213> ORGANISM: Artificial Sequence
<220> FEATURE:
```

<223> OTHER INFORMATION: Synthetic Sequence_Propionibacteriaceae
      bacterium P6A17 sortase F

<400> SEQUENCE: 68

```
Met Gln Gln Leu Arg Arg Arg Ile Val Ala Thr Ile Val Ala Leu
1               5                   10                  15

Val Val Leu Val Ala Gly Gly Leu Leu Arg Gln Gly Leu Ser Arg
                20                  25                  30

Thr Ala Leu Leu Glu Gln Pro Glu Thr Ser Val Ala Leu Pro Ser Arg
            35                  40                  45

Glu Thr Pro Pro Pro Thr Ser Ala Pro Pro Thr Thr Ala Pro Pro Ser
        50                  55                  60

Pro Trp Pro Ser Pro Thr Pro Ser Pro Thr Pro Thr Ala Ser Pro Ser
65                  70                  75                  80

Pro Ser Ala Ala Thr Ala Gln Cys Ser His Ser Thr Ser Gly Phe Thr
                85                  90                  95

Pro Thr Ser Phe Thr Leu Ala Arg Val Gly Ala Lys Glu Arg Val Ile
            100                 105                 110

Ala Met Arg Thr Gln Gly Gly Gln Ile Ser Ala Pro Pro Lys Asn Asp
        115                 120                 125

Arg Arg Ser Ala Gly Trp Trp Ser Asp Gly Pro Arg Pro Gly Ala Asp
    130                 135                 140

His Gly Lys Val Val Leu Thr Ile His Thr Tyr Arg Pro Ser Leu Arg
145                 150                 155                 160

Pro Ala Leu Gly Asn Glu Leu Tyr Asp Gly Gly Glu Ser Ala Leu Arg
                165                 170                 175

Pro Gly Asp Val Pro Gln Leu His Ala Lys Asp Gly Cys Thr Val Cys
            180                 185                 190

Tyr Glu Phe Val Glu Ala Gln Arg Ile Met Val Ala Asp Tyr Asp Pro
        195                 200                 205

Ser Ser Arg Val Met Leu Asp Pro Asp Gly Pro Ser Ala Val Ile
    210                 215                 220

Val Ile Cys Trp Asp Phe Ser Ser Ser Thr Lys Asp Trp Asp Ser Arg
225                 230                 235                 240

Val Phe Phe Gln Phe Arg Arg Val Thr Gly
                245                 250
```

<210> SEQ ID NO 69
<211> LENGTH: 236
<212> TYPE: PRT
<213> ORGANISM: Artificial Sequence
<220> FEATURE:
<223> OTHER INFORMATION: Synthetic Sequence_Pseudopropionibacterium
      propionicum sortase F

<400> SEQUENCE: 69

```
Met Asn Leu Val Glu Ala Leu Lys Asn Arg Lys Val Gln Ile Gly Ile
1               5                   10                  15

Ala Ala Val Ala Val Leu Leu Ala Val Ala Leu Thr Leu Val Trp Val
                20                  25                  30

Leu Gln Pro Lys Asn Asp Asn Pro Gln Ala Gly Ala Thr Ala Ser Ser
            35                  40                  45

Ser Gly Thr Ala Asp Gly Ala Ala Val Thr Ser Pro Glu Ala Ser Ser
        50                  55                  60

Pro Pro Ala Ser Pro Gly Ala Cys Val Thr Pro Asp Ala Ala Gly Phe
65                  70                  75                  80
```

```
Val Pro Val Arg Tyr Ser Ile Glu Ser Ile Gly Val Glu Asp Lys Val
                85                  90                  95
Ile Ser Gly Gly Arg Glu Glu Asp Gly Ala Val Ala Ala Pro Pro Lys
            100                 105                 110
Gly Glu Pro Arg Thr Ala Leu Trp Trp Asn Glu Gly Pro Lys Ala Ala
        115                 120                 125
Ser Asn Ala Gly Gln Val Val Leu Thr Ile His Thr Tyr Gln Thr Gly
    130                 135                 140
Asp Ala Val Gly Asn Met Leu Tyr Ser Asp Asn Gly Gly Leu Leu Lys
145                 150                 155                 160
Glu Gly Ala Val Leu Lys Leu Tyr Ala Glu Asp Gly Arg Val Ala Cys
                165                 170                 175
Tyr Lys Tyr Thr Glu Ser Gln Lys Ile Ala Val Ser Glu Tyr Lys Pro
            180                 185                 190
Glu Ser Asp Val Leu Glu Arg His Glu Gly Asp Pro Ala Leu Ala Ile
        195                 200                 205
Val Ile Cys Trp Asp His Asn Lys Ser Thr Asn Asp Trp Asp Ser Arg
    210                 215                 220
Ala Phe Ile Lys Phe Lys Pro Val Thr Asp Ala Ala
225                 230                 235

<210> SEQ ID NO 70
<211> LENGTH: 269
<212> TYPE: PRT
<213> ORGANISM: Artificial Sequence
<220> FEATURE:
<223> OTHER INFORMATION: Synthetic Sequence_Aestuariimicrobium
      kwangyangense sortase F

<400> SEQUENCE: 70

Met Ala Asp Gln Ala Pro Val Pro Ala Ser Pro Gln Pro Asp Gly Val
1               5                   10                  15
Pro Gly Arg Gly Arg Ser Ser Ser Pro Gly Arg Gly Pro Ser Arg Leu
            20                  25                  30
Val Val Leu Leu Val Val Leu Val Ile Leu Val Gly Ala Gly Phe Ala
        35                  40                  45
Ile Trp Arg Ala Thr Asn Arg Gln Pro Gly Val Ala Ala Pro Pro Ala
    50                  55                  60
Ser Pro Glu Thr Ser Thr Ser Ala Thr Ile Val Ala Pro Thr Pro Glu
65              70                  75                  80
Ser Pro Thr Ser Ser Gly Thr Thr Pro Ala Gln Pro Thr Pro Thr Ala
                85                  90                  95
Ser Ser Ser Thr Pro Leu Pro Pro Gly Cys Ser Ser Pro Thr Ala Pro
            100                 105                 110
Met Asp Asp Pro Gln Arg Leu Ser Ile Glu Ser Met Lys Val Asp Ser
        115                 120                 125
Pro Met Leu Ser Leu Gly Leu Asp Glu Ser Gly Ser Ala Ala Ala Pro
    130                 135                 140
Pro Lys Asp Gln Pro Arg Thr Val Gly Trp Phe Asp Gln Gly Pro Lys
145                 150                 155                 160
Leu Gly Ser Gly Gln Gly His Ala Val Leu Thr Ile His Thr Tyr Arg
                165                 170                 175
Asn Gly Asn Ala Leu Gly Asn Glu Leu Ala Asp Pro Asn Ser Gly Leu
            180                 185                 190
Arg Pro Gly Ala Leu Val Arg Val Ser Asp Gly Arg Gly Asn Thr Val
        195                 200                 205
```

```
Cys Tyr Thr Phe Ser Arg Ser Thr Lys Val Trp Val Lys Asp Tyr Asp
            210                 215                 220

Pro Asn Ser Thr Val Leu Tyr Asp Asp Ala Gly Ala Pro Glu Ala Ile
225                 230                 235                 240

Ile Val Ile Cys Trp Asp Phe Asn Arg Ala Thr Ala Ala Trp Asp Ser
            245                 250                 255

Arg Ile Leu Phe His Leu Thr Pro Val Ala Pro Ser Ala
            260                 265
```

<210> SEQ ID NO 71
<211> LENGTH: 241
<212> TYPE: PRT
<213> ORGANISM: Artificial Sequence
<220> FEATURE:
<223> OTHER INFORMATION: Synthetic Sequence_Acidipropionibacterium acidipropionici sortase F

<400> SEQUENCE: 71

```
Met Thr Gln Asn Pro Ser Ser Glu Asn Arg Pro Gly His Ser Arg Arg
1               5                   10                  15

Thr Arg Leu Ile Gly Leu Leu Val Ala Leu Val Ile Ala Val Ala
            20                  25                  30

Ala Thr Met Ile Trp Arg Gln Thr Arg Asp Val Pro Gln Ala Ala Thr
            35                  40                  45

Gly Ser Pro Ala Ser Leu Ala Pro Ala Ser Ser Ser Ala Ser Thr Pro
50                  55                  60

Thr Pro Thr Pro Ser Pro Thr Pro Ser Arg Ala Ala Val Pro Ala Gly
65                  70                  75                  80

Cys Met Ala Lys Gln Gln Pro Ile Thr Pro Ser Thr Met Lys Ile Asp
            85                  90                  95

Arg Met Lys Val Ser Ser Pro Val Leu Ser Leu Gly Leu Asp Thr Asp
            100                 105                 110

Asn Ala Ala Ala Ala Pro Pro Lys Asp Glu Pro Thr Thr Thr Ala Trp
            115                 120                 125

Tyr Asn Arg Gly Pro Arg Pro Gly Ser Ala Lys Gly Lys Val Val Leu
130                 135                 140

Thr Ile His Thr Tyr His Lys Gly Gly Ala Leu Gly Asn Glu Leu Arg
145                 150                 155                 160

Gln Pro Gly Ser Gly Leu Thr Lys Gly Asp Leu Ile Arg Met Thr Asp
            165                 170                 175

Ser Ser Gly Arg Gln Ala Cys Tyr Arg Tyr Asp His Asn Val Lys Val
            180                 185                 190

Met Val Lys Asp Tyr Asp Pro Asp Ser Asp Ile Ile Tyr Asp Asp His
            195                 200                 205

Gly Arg Pro Met Leu Ala Ile Val Ile Cys Trp Asp Tyr Asp Ala Ser
            210                 215                 220

Arg Asn Asp Trp Asp Ser Arg Ile Val Phe Tyr Ala Thr Pro Val Thr
225                 230                 235                 240

Ala
```

<210> SEQ ID NO 72
<211> LENGTH: 258
<212> TYPE: PRT
<213> ORGANISM: Artificial Sequence
<220> FEATURE:
<223> OTHER INFORMATION: Synthetic Sequence_Cutibacterium acnes KPA171202 sortase F

<400> SEQUENCE: 72

```
Met Thr Asp Arg Ser Pro Arg Gln Glu Pro Ser Thr Gly Ser Thr
1               5                   10                  15

Pro Ser Asn Ser Ser Thr Thr His Ala Gly Asp Ser Ala Gln Pro Gly
            20                  25                  30

Gly Pro Lys Trp Arg Ile Val Ala Leu Val Val Ile Ala Leu Ile
        35                  40                  45

Ile Ala Ala Ile Ala Val Ile Phe Ile Gln Arg Asn Asn Asp Ser Asp
    50                  55                  60

Ser Ala Gly Gly Ala Ala Ser Ser Thr Thr Ala Thr Thr Thr Ser Ser
65                  70                  75                  80

Thr Ser Gly Ile Pro Ala Ala Ser Ala Ala Lys Lys Gly Pro Val Pro
                85                  90                  95

Ala Gly Cys Met Lys Thr Pro Lys Pro Ile Val Pro Val Lys Tyr Ser
            100                 105                 110

Ile Asp Gly Met Lys Ala Ser Ala Lys Val Leu Ser Arg Gly Val Asp
        115                 120                 125

Glu Thr Gly Ala Ala Gly Ala Pro Pro Lys Asn Asp Pro Ser Ser Met
130                 135                 140

Ala Trp Phe Asn Gln Gly Pro Lys Ile Gly Ser Asp Lys Gly Asn Ala
145                 150                 155                 160

Val Leu Thr Ala His Thr Tyr His Lys Gly Ala Leu Gly Asn Arg
                165                 170                 175

Leu Tyr Asp Lys Asn Asn Gly Ile Lys Lys Gly Asp Ile Ile Arg Leu
            180                 185                 190

Thr Asp Lys Thr Gly Gln Thr Val Cys Tyr Arg Tyr Asp His Asp Thr
        195                 200                 205

Lys Val Met Val Lys Asp Tyr Asn Pro Asn Ser Asn Ile Leu Tyr Asp
    210                 215                 220

Asn Asn Gly Pro Ala Gln Ala Ala Ile Val Ile Cys Trp Asp Tyr Val
225                 230                 235                 240

Lys Lys Thr Gly Glu Phe Asp Ser Arg Val Ile Phe Tyr Thr Tyr Pro
                245                 250                 255

Val Ala
```

<210> SEQ ID NO 73
<211> LENGTH: 187
<212> TYPE: PRT
<213> ORGANISM: Artificial Sequence
<220> FEATURE:
<223> OTHER INFORMATION: Synthetic Sequence_Rhodococcus sp. AD45 sortase F

<400> SEQUENCE: 73

```
Met Leu Phe Leu Leu Leu Pro Gly Cys Ala Val Ser Gly Gln Ala Arg
1               5                   10                  15

Leu Glu Ala Ala His Thr Ser Val Asp Thr Ile Pro Ala Asp Ser Leu
            20                  25                  30

Gln Ser Gln Ser Val Pro Met Ala Gln Pro Thr Arg Leu Ser Ile Ala
        35                  40                  45

Asp Leu Gly Ile Asp Ala Thr Val Leu Pro Met Pro Ala Gly Ala Cys
    50                  55                  60

Pro Val Leu Asp Pro Pro Thr Leu Ala Asp Ala Tyr Trp Val Gly Cys
65                  70                  75                  80
```

```
Arg Ser Glu Pro Gly Thr Asp Ser Asp Gly Thr Val Phe Val Ile Gly
            85                  90                  95

His Ala Gly Ala Gly Thr Ala Ala Val Phe Asp Thr Leu Pro Asp Ile
            100                 105                 110

Val Ala Gly Ser Arg Val Leu Ile Glu Thr Asp Ser Gly Thr Leu Glu
            115                 120                 125

Tyr Thr Val Arg Ser Thr Ala Leu Tyr Glu Lys Phe Gly Glu Ala Gln
            130                 135                 140

Glu Ser Pro Glu Leu Arg Leu Arg Gln Pro Gly Arg Leu Val Leu Val
145                 150                 155                 160

Thr Cys Tyr Leu Glu Asn Gly Thr Thr Leu Ser Ser Lys Asn Phe Val
                165                 170                 175

Ala Tyr Ala Glu Ile Thr Gly Ala Leu Ala Arg
            180                 185

<210> SEQ ID NO 74
<211> LENGTH: 187
<212> TYPE: PRT
<213> ORGANISM: Artificial Sequence
<220> FEATURE:
<223> OTHER INFORMATION: Synthetic Sequence_Rhodococcus sp. AD45 sortase
      F

<400> SEQUENCE: 74

Met Leu Phe Leu Leu Pro Gly Cys Ala Val Ser Gly Gln Ala Arg
1               5                   10                  15

Leu Glu Ala Ala His Thr Ser Val Asp Thr Ile Pro Ala Asp Ser Leu
            20                  25                  30

Gln Ser Gln Ser Val Pro Met Ala Gln Pro Thr Arg Leu Ser Ile Ala
            35                  40                  45

Asp Leu Gly Ile Asp Ala Thr Val Leu Pro Met Pro Ala Gly Ala Cys
            50                  55                  60

Pro Val Leu Asp Pro Pro Thr Leu Ala Asp Ala Tyr Trp Val Gly Cys
65                  70                  75                  80

Arg Ser Glu Pro Gly Thr Asp Ser Asp Gly Thr Val Phe Val Ile Gly
            85                  90                  95

His Ala Gly Ala Gly Thr Ala Ala Val Phe Asp Thr Leu Pro Asp Ile
            100                 105                 110

Val Ala Gly Ser Arg Val Leu Ile Glu Thr Asp Ser Gly Thr Leu Glu
            115                 120                 125

Tyr Thr Val Arg Ser Thr Ala Leu Tyr Glu Lys Phe Gly Glu Ala Gln
            130                 135                 140

Glu Ser Pro Glu Leu Arg Leu Arg Gln Pro Gly Arg Leu Val Leu Val
145                 150                 155                 160

Thr Cys Tyr Leu Glu Asn Gly Thr Thr Leu Ser Ser Lys Asn Phe Val
                165                 170                 175

Ala Tyr Ala Glu Ile Thr Gly Ala Leu Ala Arg
            180                 185

<210> SEQ ID NO 75
<211> LENGTH: 241
<212> TYPE: PRT
<213> ORGANISM: Artificial Sequence
<220> FEATURE:
<223> OTHER INFORMATION: Synthetic Sequence_Corynebacterium otitidis
      sortase F

<400> SEQUENCE: 75
```

Met Thr His Asp Ala Asp Ala Gln His Ser Gln Pro Asp Gly Gly Asp
1               5                   10                  15

Gln Ala Ala Asp Glu Asp His Lys Arg Arg Ser Pro Val Gly Ile Ile
            20                  25                  30

Ile Ala Val Val Ala Val Val Ala Leu Val Ile Gly Ile Gly Ala Trp
        35                  40                  45

Ala Ile Ser Ser Asn Ser Gly Asp Asp Glu Glu Asn Pro Ile Ala Gly
    50                  55                  60

Gln Glu Ala Ala Pro Glu Asp Ile Pro Pro Val Asp Asp Ser Gly
65                  70                  75                  80

Glu Gln Glu His Glu Leu Glu Pro Ala Pro Gly Glu Arg Glu Gly Val
                85                  90                  95

Glu Gly Met Ala Ile Ser Val Asp Gly Glu Thr Ala Pro Val Asp Phe
            100                 105                 110

Val Gln Val Thr Asp Gln Gly Val Leu Leu Pro Pro Gln Asp Val Ser
            115                 120                 125

Arg Val Gly Trp Tyr Ser Ala Ser Ala Ile Pro Gly Glu Tyr Gly Glu
        130                 135                 140

Gly Ser Ser Val Ile Thr Gly His Val Asn Phe Ala Gly Gln Gly Glu
145                 150                 155                 160

Gly Phe Ala Arg Arg Phe Val Asp Leu Ala Glu Gly Ser Glu Val Ile
                165                 170                 175

Val His Val Asn Gly Glu Asp Arg Ala Phe Arg Val Ser Glu Pro Pro
            180                 185                 190

Glu His Val Thr Lys Gly Asp Ala Leu Pro Glu Val Val Asn Gln Ala
        195                 200                 205

Glu Gly Asp Asn Arg Leu Val Leu Ile Thr Cys Gly Gly Glu Phe Val
    210                 215                 220

Gly Gly Gln Leu Gly Tyr Ala Asp Asn Val Ile Thr Val Ala Asp Pro
225                 230                 235                 240

Val

<210> SEQ ID NO 76
<211> LENGTH: 221
<212> TYPE: PRT
<213> ORGANISM: Artificial Sequence
<220> FEATURE:
<223> OTHER INFORMATION: Synthetic Sequence_Corynebacterium
      camporealensis sortase F

<400> SEQUENCE: 76

Met Glu Ala Lys Glu Ser Ser Ile Asp Glu His Ser His Lys Ala Gly
1               5                   10                  15

Ala Ser Arg Trp Ile Leu Leu Leu Thr Val Val Leu Ile Ala Leu
            20                  25                  30

Leu Ala Gly Val Ala Leu Tyr Ala Gly Leu Arg Ser Ser Glu Thr Ser
        35                  40                  45

Asp Ser Gly Ala Gly Glu Gln Leu Pro Val Ala Gln Thr Asp Leu Pro
    50                  55                  60

Glu Pro Ala Pro Gly Ile Arg Asp Gly Val Asn Glu Met Gln Leu Lys
65                  70                  75                  80

Ile Gly Gly Glu Ser Ala Lys Val Glu Phe Val Gln Leu Thr Asp Gln
                85                  90                  95

Gly Ala Leu Ile Pro Pro Glu Asp Val Ser Lys Val Gly Trp Tyr Ser
            100                 105                 110

```
Ala Ser Ala Val Pro Gly Gln Glu Gly Pro Thr Val Gly Thr Ser Val
            115                 120                 125

Ile Thr Gly His Val Asn Glu Ile Asp Gln Gly Asp Gly Phe Ala Ala
        130                 135                 140

Lys Phe Pro Glu Leu Arg Pro Gly Asp Val Val Ser Val Ile Val Asp
145                 150                 155                 160

Gly Glu Glu Arg Gln Phe Thr Val Ser Lys Asp Pro Ile Arg Val Val
                165                 170                 175

Lys Gly Ala Glu Leu Pro Glu Ser Val Asn Arg Ser Thr Gly Glu Asn
            180                 185                 190

Glu Leu Val Leu Ile Thr Cys Gly Gly Glu Phe Val Gly Gly Thr Leu
            195                 200                 205

Gly Tyr Ala Asp Asn Ile Val Val Glu Ala Thr Pro Leu
        210                 215                 220

<210> SEQ ID NO 77
<211> LENGTH: 249
<212> TYPE: PRT
<213> ORGANISM: Artificial Sequence
<220> FEATURE:
<223> OTHER INFORMATION: Synthetic Sequence_Actinobacteria sortase F

<400> SEQUENCE: 77

Met Ala Ala Glu Gln His Gly Gly Gly Ala Pro Ser Val Pro Ala Asp
1               5                   10                  15

Asp Arg Gly Gly Arg Arg Pro Gly Arg Arg Thr Gly Leu Leu Leu Ala
            20                  25                  30

Ala Gly Ala Ile Thr Val Ala Ala Gly Ile Ala Ile Ala Val Thr Ala
        35                  40                  45

Pro Ser Pro Gly Pro Ala Ala Gly Asp Gly Ala Gly Ser Gly Arg
50                  55                  60

Gln Ala Pro Pro Val Thr Val Ala Pro Ala Pro Val Pro Gly Pro
65                  70                  75                  80

Gly Glu Pro Glu Pro Val Ala Pro Ala Pro Val Ala Arg Ala Asp
            85                  90                  95

Thr Gly Asp Ala Pro Asn Arg Leu Ile Leu Pro Asp Gly Ser Ala Ala
        100                 105                 110

Ser Val Asp Thr Ile Ala Pro Thr Gly Arg Gly Ala Leu His Pro Pro
    115                 120                 125

Thr Asp Pro Gly Arg Val Gly Trp Trp Val Asp Ser Ala Leu Pro Gly
    130                 135                 140

Ser Gly Thr Gly Ala Val Val Val Thr Gly His Ile Asn Trp Ala Gly
145                 150                 155                 160

His Ala Gly Phe Ala Arg Arg Trp Leu Pro Pro Ser Ala Gly Gly Arg
                165                 170                 175

Val Glu Pro Gly Gln Asp Ile Thr Leu Ser Thr Thr Gly Ser Gly Pro
            180                 185                 190

Arg Arg Tyr Arg Val Thr Gly Thr Arg Ala Tyr Asp Lys Arg Ser Gly
        195                 200                 205

Leu Pro Ser Glu Val Asn Arg Arg Thr Gly Pro Glu Thr Leu Leu Leu
    210                 215                 220

Ile Thr Cys Gly Gly Arg Trp Ala Gly Gly Asp Leu Gly Tyr Ala Asp
225                 230                 235                 240

Asn Leu Ile Thr Thr Ala Gln Pro Ala
                245
```

<210> SEQ ID NO 78
<211> LENGTH: 206
<212> TYPE: PRT
<213> ORGANISM: Artificial Sequence
<220> FEATURE:
<223> OTHER INFORMATION: Synthetic Sequence_Rhodococcus sp. AD45 sortase
      F

<400> SEQUENCE: 78

Met Thr Gln Ser Ser Arg Gln Thr Leu Arg Arg Leu Cys Gly Ala Ala
1               5                   10                  15

Ala Leu Thr Val Leu Leu Cys Val Ser Gly Cys Ser Asp Asp Ser Asp
            20                  25                  30

Gln Pro Val Arg Val Leu Ala Thr Gly Gln Glu Asp Leu Pro Ser Ala
        35                  40                  45

Leu Glu Ala Val Val Asp Asn Pro Ala Thr Pro Thr Gln Leu Arg Ile
    50                  55                  60

Gly Ser Glu Ala Ala Val Val Leu Ala Ile Lys Thr Thr Ser Gly Gly
65                  70                  75                  80

Ser Leu Ile Pro Pro Glu Asp Val Ser Lys Val Gly Trp Trp Ala Asp
                85                  90                  95

Ser Ala Phe Pro Gly Ser Gly Thr Gly Thr Val Val Ile Thr Gly His
            100                 105                 110

Ile Asn Asp Val Tyr Ala Gly Asp Gly Phe Gly Lys Lys Phe Ser Ala
        115                 120                 125

Leu Thr Pro Gly Ser Val Val Thr Leu Thr Gly Glu Asp Gly His Glu
    130                 135                 140

Trp Thr Tyr Arg Ile Asp Ala Val Asp Glu Tyr Arg Lys Asp Gly Glu
145                 150                 155                 160

Leu Pro Val Glu Arg Leu Asn Arg Met Asp Gly Pro Glu Thr Leu Ala
                165                 170                 175

Leu Ile Thr Cys Gly Gly Glu Phe Val Gly Pro Pro Leu Gly Tyr Glu
            180                 185                 190

Asp Asn Asp Ile Ala Trp Ala Thr Arg Ile Pro Asp Leu Ser
        195                 200                 205

<210> SEQ ID NO 79
<211> LENGTH: 202
<212> TYPE: PRT
<213> ORGANISM: Artificial Sequence
<220> FEATURE:
<223> OTHER INFORMATION: Synthetic Sequence_Gordonia phthalatica sortase
      F

<400> SEQUENCE: 79

Met Arg Arg Leu Ile Arg Ile Leu Cys Thr Leu Ala Ala Val Ala Ala
1               5                   10                  15

Leu Val Ala Thr Ala Ala Cys Gly Thr Glu Glu Ala Thr Pro Ser Thr
            20                  25                  30

Ser Ser Thr Gln Ala Gln Glu Asn Leu Arg Pro Pro Val Ser Ala Val
        35                  40                  45

Ser His Asp Pro Ser Thr Pro Lys Ser Val Val Ile Asp Gly Ala Ser
    50                  55                  60

Ala Pro Thr Val Ser Val Ala Thr Asp Ala Ala Gly Thr Leu Leu Pro
65                  70                  75                  80

Pro Thr Asp Ile Ala Lys Leu Gly Trp Trp Val Asp Ser Ala Leu Pro
                85                  90                  95

Gly Ser Gly Ala Gly Thr Ile Val Val Ala Gly His Val Asp Asp Leu
            100                 105                 110

Lys Gln Gly Thr Gly Tyr Ala Ala Arg Phe Ala Lys Leu Thr Ala Gly
            115                 120                 125

Asp Thr Val Thr Val Asp Thr Ala Asp Gly Ala Lys His Thr Tyr Arg
130                 135                 140

Val Thr Arg Val Val Asp Ala Gln Lys Glu Gly Lys Gly Ala Asp Ala
145                 150                 155                 160

Val Pro Phe Asp Glu Leu Asn Arg Leu Asp Gly Pro Glu Thr Leu Ala
                165                 170                 175

Leu Val Thr Cys Gly Gly Pro Phe Ile Gly Pro Pro Leu Gly Tyr Arg
            180                 185                 190

Asp Asn Ile Val Val Phe Ala Thr Pro Ala
            195                 200

<210> SEQ ID NO 80
<211> LENGTH: 182
<212> TYPE: PRT
<213> ORGANISM: Artificial Sequence
<220> FEATURE:
<223> OTHER INFORMATION: Synthetic Sequence_Gordonia jacobaea sortase F

<400> SEQUENCE: 80

Met Thr Leu Leu Val Gly Cys Ser Thr Arg Thr Ser Glu Ser Ser Val
1               5                   10                  15

Ala Thr Pro Ser Ala Gln Thr Gln Leu Pro Ala Pro Val Ala Ala Arg
            20                  25                  30

Thr Asp Glu Pro Ala Ala Pro Lys Ser Ile Glu Val Gly Gly Asp Ser
            35                  40                  45

Ala Val Thr Asp Ala Val Ala Thr Asp Thr Thr Gly Ala Leu Leu Pro
50                  55                  60

Pro Gln Asp Val His Arg Leu Gly Trp Trp Val Asp Ser Ala Leu Pro
65                  70                  75                  80

Gly Ser Gly Lys Gly Thr Ile Val Val Thr Gly His Val Asp Glu Ala
            85                  90                  95

Ser Gln Gly Arg Gly Phe Ala Ala Arg Phe Ser Ser Leu Ala Pro Gly
            100                 105                 110

Thr Glu Val Ala Val Thr Thr Ala Lys Gly Glu Thr Val His Tyr Arg
            115                 120                 125

Val Arg Asn Val Gln Lys Ala Asp Lys Glu Lys Gly Phe Pro Ala Ala
130                 135                 140

Glu Leu Asn Arg Leu Asp Gly Pro Glu Thr Leu Ala Leu Val Thr Cys
145                 150                 155                 160

Gly Gly Ala Phe Val Gly Pro Pro Leu Gly Tyr Ala Asp Asn Ile Ile
                165                 170                 175

Ala Trp Ala Thr Arg Ala
            180

<210> SEQ ID NO 81
<211> LENGTH: 194
<212> TYPE: PRT
<213> ORGANISM: Artificial Sequence
<220> FEATURE:
<223> OTHER INFORMATION: Synthetic Sequence_Tsukamurella paurometabola
      sortase F

<400> SEQUENCE: 81

Met Arg Arg Leu Ser Gly Leu Val Leu Ala Val Ala Val Leu Ala Ala

-continued

```
1               5                   10                  15
Gly Cys Gly Thr Val Glu Gly Thr Ala Glu Pro Val Pro Ser Asn Pro
                20                  25                  30

Ala Ala Gln Ser Asp Leu Arg Ala Pro Val Val Ala Thr Ala Asn Glu
                35                  40                  45

Ser Ala Ala Pro Val Arg Val Ser Ala Ser Gly Ser Asp Ala Pro Val
 50                     55                  60

Asp Gly Val Ala Thr Asp Ala Gln Gly Ala Leu Tyr Pro Pro Gln Asp
 65                 70                  75                  80

Val Gly Arg Val Gly Trp Trp Ile Asp Ser Ala Leu Pro Gly Ser Gly
                85                  90                  95

Arg Gly Ser Val Val Val Thr Gly His Ile Asp Asp Ala Arg Gln Gly
                100                 105                 110

Asp Gly Phe Ala Lys Arg Phe Gly Ala Leu Arg Ala Gly Asp Thr Val
                115                 120                 125

Ser Leu Thr Gly Lys Asp Gly Arg Thr Ile Ala Tyr Arg Val Thr Arg
 130                    135                 140

Thr Met Ser Val Gly Lys Gly Ala Leu Pro Val Gly Asp Leu Asn Arg
145                     150                 155                 160

Gln Asp Gly Pro Glu Thr Leu Ile Leu Val Thr Cys Gly Gly Arg Phe
                165                 170                 175

Val Gly Pro Pro Met Gly Tyr Glu Asn Asn Asp Leu Val Tyr Ala Glu
                180                 185                 190

Arg Ala
```

<210> SEQ ID NO 82
<211> LENGTH: 199
<212> TYPE: PRT
<213> ORGANISM: Artificial Sequence
<220> FEATURE:
<223> OTHER INFORMATION: Synthetic Sequence_Gordonia otitidis sortase F

<400> SEQUENCE: 82

```
Met Asn Gly Pro Arg Met Arg Ala Leu Phe Cys Leu Val Ala Leu Gly
1               5                   10                  15

Phe Ala Leu Val Ile Gly Gly Cys Ser Thr Ser Asp Arg Glu Ser Ala
                20                  25                  30

Ala Thr Ala Pro Ser Ala Gln Ala Glu Leu Pro Ala Pro Val Ala Ala
                35                  40                  45

Arg Thr Asp Glu Lys Ser Ala Pro Lys Ser Ile Ala Val Gly Gly Asp
 50                     55                  60

Ser Ala Ile Thr Glu Ala Val Ala Thr Asp Thr Thr Gly Ala Leu Leu
 65                 70                  75                  80

Pro Pro Gln Asp Val Arg Arg Leu Gly Trp Trp Val Asp Ser Ser Leu
                85                  90                  95

Pro Gly Ser Gly Lys Gly Thr Ile Val Val Thr Gly His Val Asn Glu
                100                 105                 110

Ala Asp Gln Gly Thr Gly Phe Ala Ala Arg Phe Ala Thr Met Lys Pro
                115                 120                 125

Gly Glu Thr Val Ala Val Thr Thr Ala Ser Gly Gln Gln Ile Asn Tyr
 130                    135                 140

Arg Val Thr Arg Ile Gln Asn Ala Asp Lys Glu Thr Gly Phe Pro Ser
145                     150                 155                 160

Asp Glu Leu Asn Arg Val Asp Gly Pro Glu Thr Leu Ala Leu Val Thr
                165                 170                 175
```

```
Cys Gly Gly Gln Phe Val Gly Pro Pro Leu Gly Tyr Lys Asp Asn Val
            180                 185                 190

Ile Ala Trp Ala Thr Arg Ala
        195

<210> SEQ ID NO 83
<211> LENGTH: 251
<212> TYPE: PRT
<213> ORGANISM: Artificial Sequence
<220> FEATURE:
<223> OTHER INFORMATION: Synthetic Sequence_Corynebacterium sortase F

<400> SEQUENCE: 83

Met Thr Asp Gln Phe Gly Ser Asp Glu Thr Gly Lys Glu Pro Gly Asn
1               5                   10                  15

Thr Pro Gly Ile Glu Pro Glu Thr Glu Thr Gly Ala Leu Asp His Val
            20                  25                  30

Asp Pro Phe Asp Gln Ala Glu Asp Pro Ala Asp Ser Gln Val Glu Asp
        35                  40                  45

Leu Gln Asp Val Pro Trp Trp Lys Gln Pro Arg Val Tyr Ile Ala Ala
    50                  55                  60

Ile Ala Leu Ile Gly Val Ile Ala Leu Leu Val Ile Ala Gln Leu His
65                  70                  75                  80

Arg Asn Asp Ser Ala Leu Glu Gly Ala Gln Glu Asn Leu Pro Thr Pro
                85                  90                  95

Ala Gln Gly Ser Arg Gly Ala Val His Glu Met Glu Met Leu Ile Asp
            100                 105                 110

Gly Lys Ser Ala Pro Ile Asp Phe Val Gln Leu Thr Asp Gln Gly Ser
        115                 120                 125

Leu Ile Pro Pro Thr Asp Val Ser Arg Leu Gly Trp Tyr Ser Ala Ser
    130                 135                 140

Ala Ile Pro Gly Glu Lys Gly Ala Ala Gly Ser Ser Val Ile Thr Gly
145                 150                 155                 160

His Val Asn Glu Val Asp Gln Gly Asp Gly Tyr Ala Ala Arg Phe Ala
                165                 170                 175

Asp Leu Lys Ala Gly Asp Thr Val Thr Val Lys Val Asp Gly Glu Ser
            180                 185                 190

Arg Asp Phe Thr Val Ser Lys Asp Pro Ile Gln Val Val Lys Gly Ala
        195                 200                 205

Gln Met Pro Glu Ala Val Asn Asp Ala Val Gly Glu Asn Arg Leu Val
    210                 215                 220

Leu Ile Thr Cys Gly Gly Glu Phe Val Gly Thr Leu Gly Tyr Ala
225                 230                 235                 240

Asp Asn Ile Ile Val Glu Ala Thr Pro Val Arg
                245                 250

<210> SEQ ID NO 84
<211> LENGTH: 289
<212> TYPE: PRT
<213> ORGANISM: Artificial Sequence
<220> FEATURE:
<223> OTHER INFORMATION: Synthetic Sequence_Streptococcus suis sortase F

<400> SEQUENCE: 84

Met Ile Lys Trp Leu Lys Lys Lys Gly Pro Ser Phe Ile Met Pro Leu
1               5                   10                  15

Ile Phe Ile Leu Gly Ile Gly Leu Leu Ala Tyr Pro Ser Val Ser Asp
```

```
            20                  25                  30
Tyr Trp Asn Ser Phe His Gln Ser Glu Ala Ile Met Ser Tyr Ser Asp
        35                  40                  45

Thr Val Ser Asp Met Thr Ala Asp Gln Tyr Lys Glu Ile Ile Asp Ser
    50                  55                  60

Ala Arg Gln Tyr Asn Gln Glu Lys Pro Leu Asn Trp Asn Val Thr Ala
65                  70                  75                  80

Ser Asp Ile Glu Ala Tyr Asn Gln Glu Leu Asn Phe Asn Lys Asp Gly
                85                  90                  95

Ile Met Gly Tyr Ile Glu Ile Pro Lys Ile Asp Val Lys Leu Ser Ile
            100                 105                 110

Phe His Gly Thr Asp Glu Thr Val Leu Glu Thr Ser Ile Gly His Leu
        115                 120                 125

Glu Gly Thr Ser Leu Pro Val Gly Gly Leu Gly Thr His Ser Val Leu
    130                 135                 140

Ser Gly His Arg Gly Leu Pro Ser Ala Arg Leu Phe Ser Asp Leu Asp
145                 150                 155                 160

Lys Leu Arg Glu Gly Asp Ile Phe Thr Ile His Val Leu Asn Glu Thr
                165                 170                 175

Leu Thr Tyr Lys Val Asp Gln Ile Arg Val Val Glu Pro Ser Asp Leu
            180                 185                 190

Ser Ala Leu Thr Met Glu Pro Gln Lys Asp Leu Leu Thr Leu Val Thr
        195                 200                 205

Cys Thr Pro Tyr Gly Ile Asn Thr His Arg Leu Leu Val Arg Gly Tyr
    210                 215                 220

Arg Ile Glu Asn Val Asn Gly Ser Ala Leu Val Thr Ser Asp Ala Ile
225                 230                 235                 240

Gln Ile Lys Ala Ile Phe Ile Ala Pro Phe Ile Ala Thr Pro Ile Leu
                245                 250                 255

Phe Val Ile Leu Ile Tyr Ile Phe Ile Thr Thr Ser Lys Thr Phe Arg
            260                 265                 270

Ser Arg Asn Arg Asn Gln Val Leu Asp Asp Phe Leu Val Pro Lys Lys
        275                 280                 285

Phe

<210> SEQ ID NO 85
<211> LENGTH: 200
<212> TYPE: PRT
<213> ORGANISM: Artificial Sequence
<220> FEATURE:
<223> OTHER INFORMATION: Synthetic Sequence_Gordonia neofelifaecis
      sortase F

<400> SEQUENCE: 85

Met Lys Ile Tyr Gln Ala Ala Val Thr Ser Val Ala Ala Ala Ala Leu
1               5                   10                  15

Val Phe Thr Ala Ala Cys Ala Ala Asp Gly Gly Asp Ser Pro Pro Pro
            20                  25                  30

Gly Thr Ala Gln Ala Asn Leu Pro Ala Pro Val Arg Ala Ala Ser Asp
        35                  40                  45

Ala Pro Ser Thr Pro Val Asp Leu Thr Ile Asp Gly Ala Ala Ala Ala
    50                  55                  60

Ile Asp Ala Val Ala Thr Asp Thr Ala Gly Ala Leu Leu Pro Pro Arg
65                  70                  75                  80

Asp Val His Arg Leu Gly Trp Trp Val Asp Ser Ser Leu Pro Gly Ser
```

```
                85                  90                  95
Gly Ser Gly Ala Ile Val Val Thr Gly His Val Asp Val Gln Gln
            100                 105                 110

Gly Ser Gly Phe Ala Ser Arg Phe Thr Thr Leu Arg Thr Gly Asp Thr
            115                 120                 125

Val Asp Leu Thr Thr Thr Asp Gly His Arg His Asp Tyr Arg Ile Thr
            130                 135                 140

Arg Thr Val Leu Ala Asp Lys Glu Ala Thr Gly Ser Gly Gly Leu Pro
145                 150                 155                 160

Val Ala Glu Leu Asn Arg Arg Asp Gly Pro Glu Thr Leu Ala Leu Ile
                165                 170                 175

Thr Cys Gly Gly Pro Phe Ile Gly Pro Pro Leu Gly Tyr Arg Asp Asn
                180                 185                 190

Val Val Val Phe Ala Val Pro Val
                195                 200

<210> SEQ ID NO 86
<211> LENGTH: 117
<212> TYPE: PRT
<213> ORGANISM: Artificial Sequence
<220> FEATURE:
<223> OTHER INFORMATION: Antibody sequence

<400> SEQUENCE: 86

Gln Ile Gln Leu Gln Gln Ser Gly Pro Glu Val Val Lys Pro Gly Ala
1               5                   10                  15

Ser Val Lys Ile Ser Cys Lys Ala Ser Gly Tyr Thr Phe Thr Asp Tyr
                20                  25                  30

Tyr Ile Thr Trp Val Lys Gln Lys Pro Gly Gln Gly Leu Glu Trp Ile
            35                  40                  45

Gly Trp Ile Tyr Pro Gly Ser Gly Asn Thr Lys Tyr Asn Glu Lys Phe
        50                  55                  60

Lys Gly Lys Ala Thr Leu Thr Val Asp Thr Ser Ser Thr Ala Phe
65                  70                  75                  80

Met Gln Leu Ser Ser Leu Thr Ser Glu Asp Thr Ala Val Tyr Phe Cys
                85                  90                  95

Ala Asn Tyr Gly Asn Tyr Trp Phe Ala Tyr Trp Gly Gln Gly Thr Gln
            100                 105                 110

Val Thr Val Ser Ala
        115

<210> SEQ ID NO 87
<211> LENGTH: 111
<212> TYPE: PRT
<213> ORGANISM: Artificial Sequence
<220> FEATURE:
<223> OTHER INFORMATION: Antibody sequence

<400> SEQUENCE: 87

Asp Ile Val Leu Thr Gln Ser Pro Ala Ser Leu Ala Val Ser Leu Gly
1               5                   10                  15

Gln Arg Ala Thr Ile Ser Cys Lys Ala Ser Gln Ser Val Asp Phe Asp
                20                  25                  30

Gly Asp Ser Tyr Met Asn Trp Tyr Gln Gln Lys Pro Gly Gln Pro Pro
            35                  40                  45

Lys Val Leu Ile Tyr Ala Ala Ser Asn Leu Glu Ser Gly Ile Pro Ala
        50                  55                  60
```

```
Arg Phe Ser Gly Ser Gly Ser Gly Thr Asp Phe Thr Leu Asn Ile His
 65                  70                  75                  80

Pro Val Glu Glu Glu Asp Ala Ala Thr Tyr Tyr Cys Gln Gln Ser Asn
                 85                  90                  95

Glu Asp Pro Trp Thr Phe Gly Gly Gly Thr Lys Leu Glu Ile Lys
            100                 105                 110

<210> SEQ ID NO 88
<211> LENGTH: 5
<212> TYPE: PRT
<213> ORGANISM: Artificial Sequence
<220> FEATURE:
<223> OTHER INFORMATION: Antibody sequence

<400> SEQUENCE: 88

Asp Tyr Tyr Ile Thr
1               5

<210> SEQ ID NO 89
<211> LENGTH: 17
<212> TYPE: PRT
<213> ORGANISM: Artificial Sequence
<220> FEATURE:
<223> OTHER INFORMATION: Antibody sequence

<400> SEQUENCE: 89

Trp Ile Tyr Pro Gly Ser Gly Asn Thr Lys Tyr Asn Glu Lys Phe Lys
1               5                   10                  15

Gly

<210> SEQ ID NO 90
<211> LENGTH: 8
<212> TYPE: PRT
<213> ORGANISM: Artificial Sequence
<220> FEATURE:
<223> OTHER INFORMATION: Antibody sequence

<400> SEQUENCE: 90

Tyr Gly Asn Tyr Trp Phe Ala Tyr
1               5

<210> SEQ ID NO 91
<211> LENGTH: 15
<212> TYPE: PRT
<213> ORGANISM: Artificial Sequence
<220> FEATURE:
<223> OTHER INFORMATION: Antibody sequence

<400> SEQUENCE: 91

Lys Ala Ser Gln Ser Val Asp Phe Asp Gly Asp Ser Tyr Met Asn
1               5                   10                  15

<210> SEQ ID NO 92
<211> LENGTH: 7
<212> TYPE: PRT
<213> ORGANISM: Artificial Sequence
<220> FEATURE:
<223> OTHER INFORMATION: Antibody sequence

<400> SEQUENCE: 92

Ala Ala Ser Asn Leu Glu Ser
1               5

<210> SEQ ID NO 93
<211> LENGTH: 9
```

```
<212> TYPE: PRT
<213> ORGANISM: Artificial Sequence
<220> FEATURE:
<223> OTHER INFORMATION: Antibody sequence

<400> SEQUENCE: 93

Gln Gln Ser Asn Glu Asp Pro Trp Thr
1               5
```

SORTASE F AND ITS USE IN METHODS FOR CONJUGATION

CROSS-REFERENCE TO RELATED APPLICATIONS

This application is a 35 U.S.C. § 371 filing of International Patent Application No. PCT/EP2019/080116, filed Nov. 4, 2019, which claims the benefit of and priority to European Patent Application Serial No. EP 18204106.1, filed Nov. 2, 2018. The entire contents of these applications are incorporated herein by reference for all purposes.

SEQUENCE LISTING

The instant application contains a Sequence Listing which has been submitted electronically in ASCII format and is hereby incorporated by reference in its entirety. Said ASCII copy, created on Apr. 29, 2021, 1s named "127755-5017 ND41178_STCV Sequence_Listing_ST25.TXT" and is 83 kilobytes in size.

FIELD OF THE INVENTION

The present invention relates to sortase F and its use in methods for conjugation.

BACKGROUND OF THE INVENTION

Sortases are bacterial transpeptidase enzymes that anchor proteins to the cell wall of gram-positive bacteria or participate in pilus subunit polymerization. sortases sequence-specifically cleave a peptide bond within a cell wall sorting sequence (Ton-That H. et al., *J. Biol. Chem.*, 275 (2000) 9876-9881), forming a thioester bond between the thiol group of an active site cysteine side chain and the carboxylic acid of the cleaved peptide bond (Frankel B. A. et al., *Biochemistry*, 44 (2005) 11188-11200). Subsequent nucleophilic attack by the amino group of a second peptide leads to formation of a new peptide bond.

Due to the high sequence specificity of this transpeptidation reaction, sortases are used to ligate or label proteins site-specifically with peptides or peptide-modified small molecules ("sortagging") (Popp M. W. et al., *Nat. Chem. Biol.*, 3 (2007) 707-708). WO 2014/140317, the contents of which are incorporated herein by reference, refers to the use of a sortase enzyme to conjugate antibodies with low molecular weight toxins, and exemplifies the use of sortase A in this context.

sortases can be divided into classes based on their amino acid sequence and their structure. Spirig et al., describes sortase classes A-F (Table 1) (Spirig T. et al., *Mol. Microbiol.*, 82 (2011) 1044-1059), a system reflected in the conserved domain database of the NCBI, which however splits the sortase D class into two separate classes: sortase D_1 and sortase D_2.

TABLE 1

Overview of sortase enzyme family as disclosed in Spirig: Sortases are grouped according to sequence homology. The CD and PDB codes of representative structures are indicated, along with the most common recognition motifs and function.

| Class | Conserved domain (CD) | Representative structure (PDB) | sortase motif | Main function |
|---|---|---|---|---|
| A | cd06165 | 3FN6 | LPxTG | general |
| B | cd05826 | 1QWZ | NPxTG | pilus polymerization, heme uptake |
| C | cd05827 | 2WIJ | LPxTG | pilus polymerization |
| D | cd05828, cd06166 | 2LN7, 4D70 | LPxTA | spore formation |
| E | cd05830 | 5GO5 | LAxTG | pilus attachment, general |
| F | Cd05829 | None available | Unknown | Unknown |

As can be seen, little is known about sortase F and its characteristics.

Many sortases have low reaction rates, limiting their widespread biotechnological use. Indeed, most applications rely on the well-studied sortase A from *S. aureus*, which has a relatively high reaction rate. Further, sortase A variants with improved catalytic efficiency and modified sequence specificity have been reported (Chen I. et al., *PNAS USA*, 108 (2011) 11399-11404; Dorr B. M. et al., *PNAS USA*, 111 (2014) 13343-13348).

Sortases of class B are also well characterized and considerable knowledge has been gathered on sortases of classes C and D (reviewed in Bradshaw W. J. et al., *FEBS J.*, 282 (2015) 2097-2114). In contrast, much less is known on sortases of class F. This applies, inter alia, to the respective recognition motifs, and to conditions that allow successful conjugation.

There is considerable interest in developing sortases and their methods of use for efficient sortase-mediated conjugation/sortagging.

In this context, the present invention refers to a method for producing a conjugate of two substrates, the method comprising the steps of:

a. providing two substrates, each substrate being independently selected from the one or more of the groups consisting of:
   i. small molecules, and
   ii. proteins,
and
b. enzymatically conjugating the two substrates using a sortase F enzyme, or a catalytic domain thereof, wherein
one substrate comprises a sortase F recognition motif, while
the other substrate comprises at least one motif selected from
   a $Gly_n$ motif,
   an $Ala_n$ motif, or
   a motif consisting of a mixture of Ala and Gly residues
the motif totaling n residues, where n is an integer from $\geq 1$ to $\leq 21$,
wherein further the reaction takes place in an aqueous reaction medium comprising a salt concentration of from about $\geq 0.01$ to $\leq 3$ M, thereby producing a conjugated product of the two substrates.

The inventors have surprisingly found that a particular, relatively high salt concentration is necessary in order to achieve an efficient conjugation reaction in the context of the inventive method.

As used herein, the terms "Gly$_n$ motif" and "Ala$_n$ motif" refer to peptides comprising Ala or Gly, with a length of N residues Preferably, the lower limit of the salt concentration is ≥0.05 M; more preferably ≥0.1 M; ≥0.15 M; ≥0.2 M; ≥0.25 M; ≥0.3 M; ≥0.35 M; ≥0.4 M; ≥0.45 M; ≥0.5 M; ≥0.55 M; ≥0.6 M; ≥0.65 M; ≥0.7 M; ≥0.75 M; ≥0.8 M; ≥0.85 M; ≥0.9 M; ≥0.95 M; ≥1 M; ≥1.05 M; ≥1.1 M; ≥1.15 M; ≥1.2 M; ≥1.25 M; ≥1.3 M; ≥1.35 M; ≥1.4 M; ≥1.45 M; ≥1.5 M; ≥1.55 M; ≥1.6 M; ≥1.65 M; ≥1.7 M; ≥1.75 M; ≥1.8 M; ≥1.85 M; ≥1.9 M; ≥1.95 M; most preferably ≥2 M.

Preferably, the upper limit of the salt concentration is ≤3 M; more preferably ≤2.95 M; ≤2.9 M; ≤2.85 M; ≤2.8 M; ≤2.75 M; ≤2.7 M; ≤2.65 M; ≤2.6 M; ≤2.55 M; ≤2.5 M; ≤2.45 M; ≤2.4 M; ≤2.35 M; ≤2.3 M; ≤2.25 M; ≤2.2 M; ≤2.15 M; ≤2.1 M; ≤2.05 M; ≤2 M; ≤1.95 M; ≤1.9 M; ≤1.85 M; ≤1.8 M; ≤1.75 M; ≤1.7 M; ≤1.65 M; ≤1.6 M; ≤1.55 M; ≤1.5 M; ≤1.45 M; ≤1.4 M; ≤1.35 M; ≤1.3 M; ≤1.25 M; ≤1.2 M; ≤1.15 M; ≤1.1 M; ≤1.05 M; and most preferably ≤1 M.

All possible combinations of the above upper and lower limits shall be deemed as disclosed herewith.

The concept of the sortase F recognition motif is shown in FIG. 1. In a preferred embodiment, the sortase F recognition motif is a motif as shown in FIG. 1.

In another preferred embodiment, the sortase F recognition motif is a motif as shown in Table 2.

DESCRIPTION OF THE FIGURES

FIG. 3. Multiple sequence alignment of sortase F representatives having Conserved Domain cd05829 in the NCBI Conserved Domain Database. The species name is given in the first column of the first block (e.g., *Propionibacterium acnes*), and the database accession number in the first column of the subsequent blocks. The catalytic triad formed of histidine (H), cysteine (C) and arginine (R) residues are in bold. Signal peptides are underlined in the first block. Variable length spacer residues are given in lower case.

Note that WP_002530979 corresponds to SEQ ID NO 59,
gi 504659806 corresponds to SEQ ID NO 60,
gi 504882929 corresponds to SEQ ID NO 61,
gi 916607907 corresponds to SEQ ID NO 62,
gi 502926425 corresponds to SEQ ID NO 63,
gi 655434228 corresponds to SEQ ID NO 64, and
gi 560888329 corresponds to SEQ ID NO 65.

Figure 4:
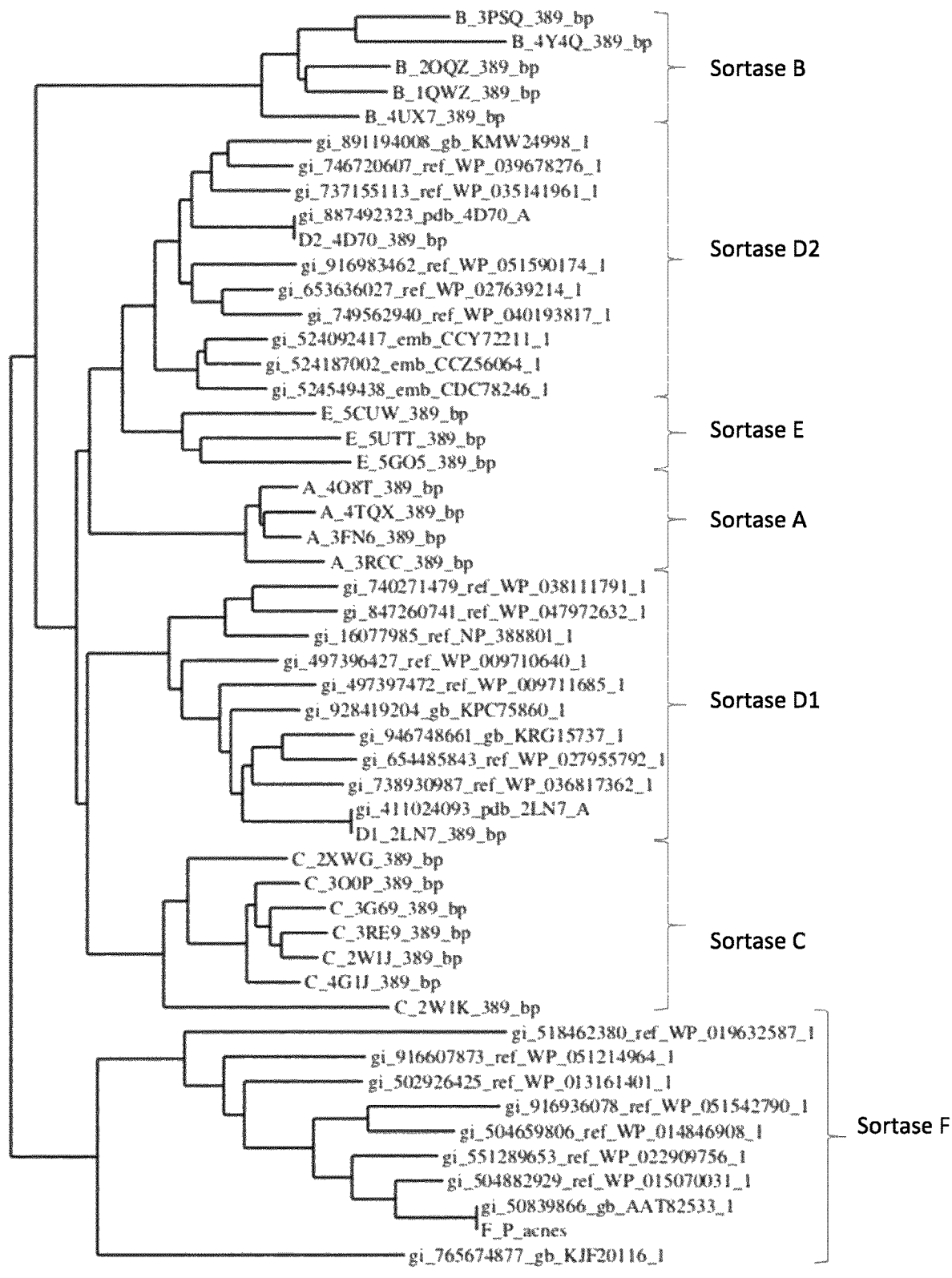

FIG. 4. Phylogenetic tree representing distances between example sortases, with sortase classes indicated, built with a Neighborhood Joining algorithm using the programs VAST (Gilbrat, J. F., *Current Opinion in Structural Biology*, 6 (1996), 377-385) and MAFFT (Kuraku, Zmasek, Nishimura, Katoh 2013 (*Nucleic Acids Research* 41: W22-W28).

Figure 5:
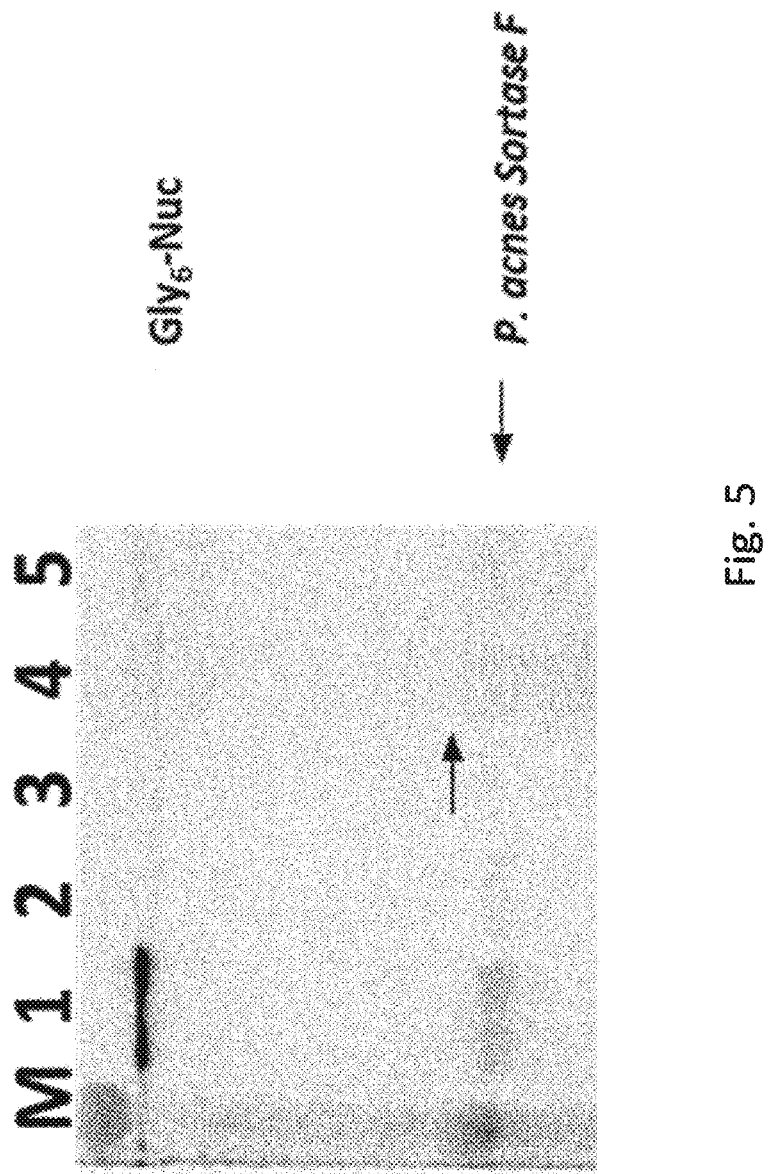

Note that WP_019632587.1 corresponds to SEQ ID NO 66,
WP_051214964.1 corresponds to SEQ ID NO 67,
WP_013161401.1 corresponds to SEQ ID NO 63,
WP_051542790.1 corresponds to SEQ ID NO 68,
WP_014846908.1 corresponds to SEQ ID NO 69,
>WP_022909756.1 corresponds to SEQ ID NO 70,
>WP_015070031.1 corresponds to SEQ ID NO 71,
>AAT82533.1 corresponds to SEQ ID NO 72, and
>KJF20116.1 corresponds to SEQ ID NO 73, FIG. 5. sortase activity assay: sortase F activity was evaluated relative to its conjugation of a 60 kDa protein (comprising an N-terminal Gly$_6$-motif) to the following FITC-labeled peptide substrates (from left to right): (1) LPxTGE (SEQ ID NO: 50; known to be a sortase A/C substrate), (2) DNPNTGDE (SEQ ID NO: 51; sortase B substrate), (3) ENPxTNAGT (SEQ ID NO: 52; sortase B substrate), (4) KLPxTASN (SEQ ID NO: 53; sortase D substrate), and (5) ALAxTGSE (SEQ ID NO: 54; sortase E substrate). Conjugation reaction products were loaded on an SDS-PAGE gel and visualized by FITC emission using the FLA-9000 Imager from Fujifilm. sortase F is most active relative to the LPxTGE peptide (SEQ ID NO: 50). (M) PageRuler Plus Prestained Protein Ladder.

Figure 6:
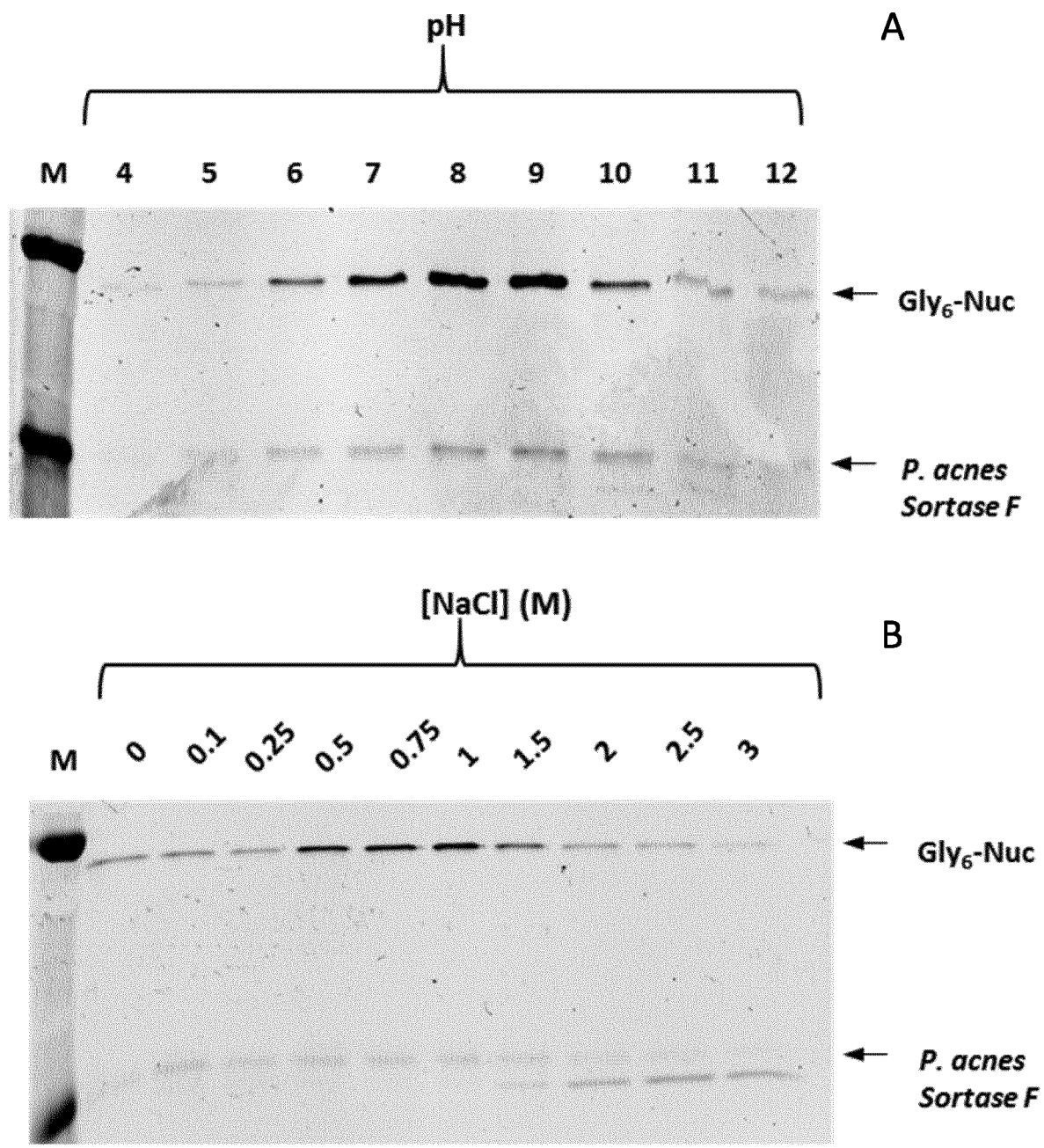

FIG. 6. (A) sortase F activity as a function of pH after 6 hours conjugation, with detection of conjugated product (products were loaded on an SDS-PAGE gel and visualized by FITC emission): pH was varied by 1 unit increments between 4 and 12, while maintaining other parameters (sortase F concentration, temperature, salt concentration, etc.) constant. pH was preferentially between 8 and 9; (B) sortase F activity as a function of ionic strength after 6 hours conjugation, with detection of conjugated product (FITC emission): NaCl concentration was varied between 0 and 3 M, while maintaining other parameters (sortase F concentration, temperature, pH, etc.) constant. Salt concentration was preferentially between 0.5 and 1.5 M.

Figure 7:
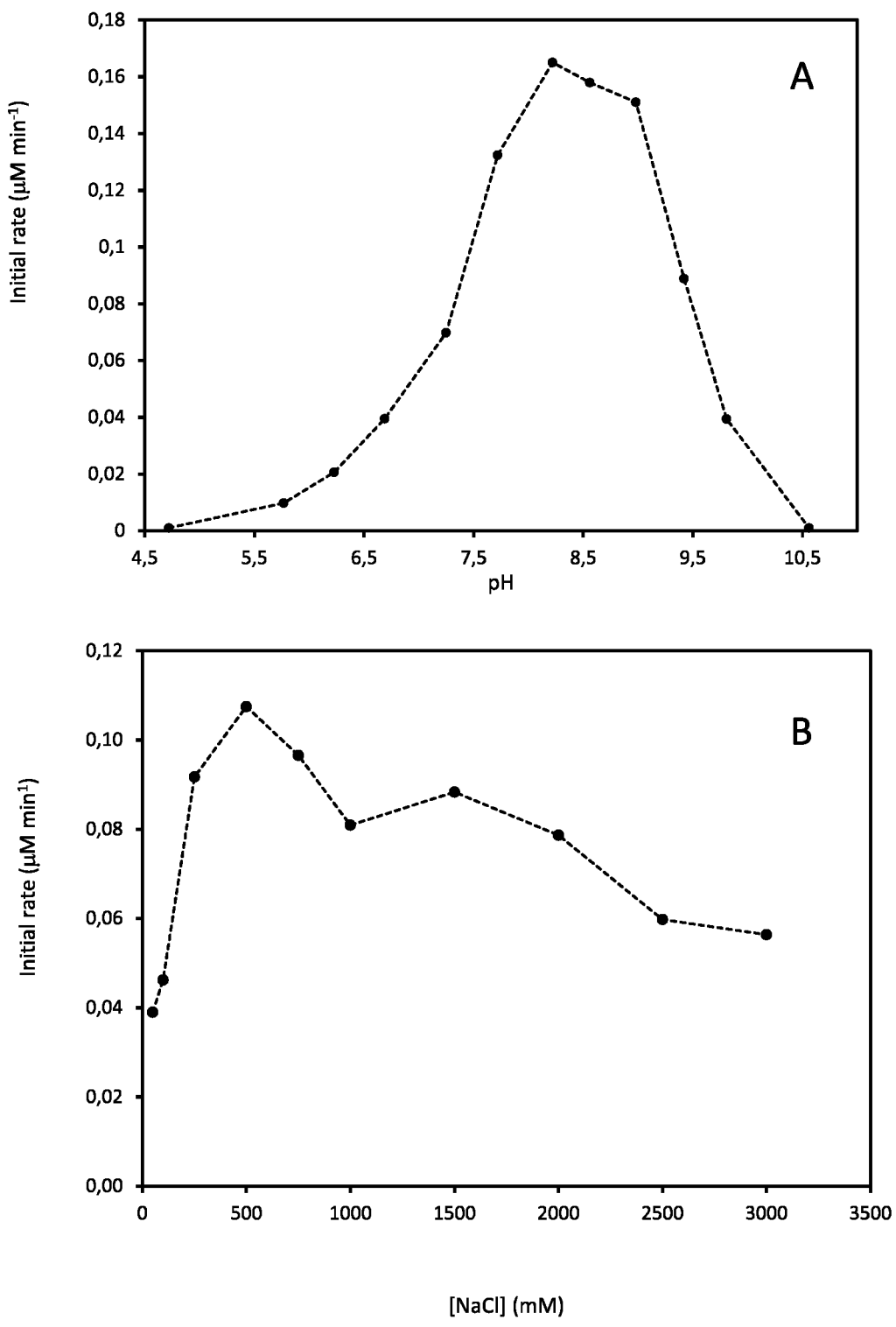

FIG. 7. (A) Initial sortase F activity rate as a function of pH, with detection of conjugated product (RP-HPLC): pH was varied between 4.5 to 10.5, while maintaining other parameters (sortase F concentration, temperature, salt concentration, etc.) constant. pH was preferentially between 8 and 9; (B) initial sortase F activity rate as a function of ionic strength, with detection of conjugated product (RP-HPLC): NaCl concentration was varied between 0 and 3 M, while maintaining other parameters (sortase F concentration, temperature, pH, etc.) constant. The salt concentration optimum was found to be above 250 mM of NaCl.

Figure 8:
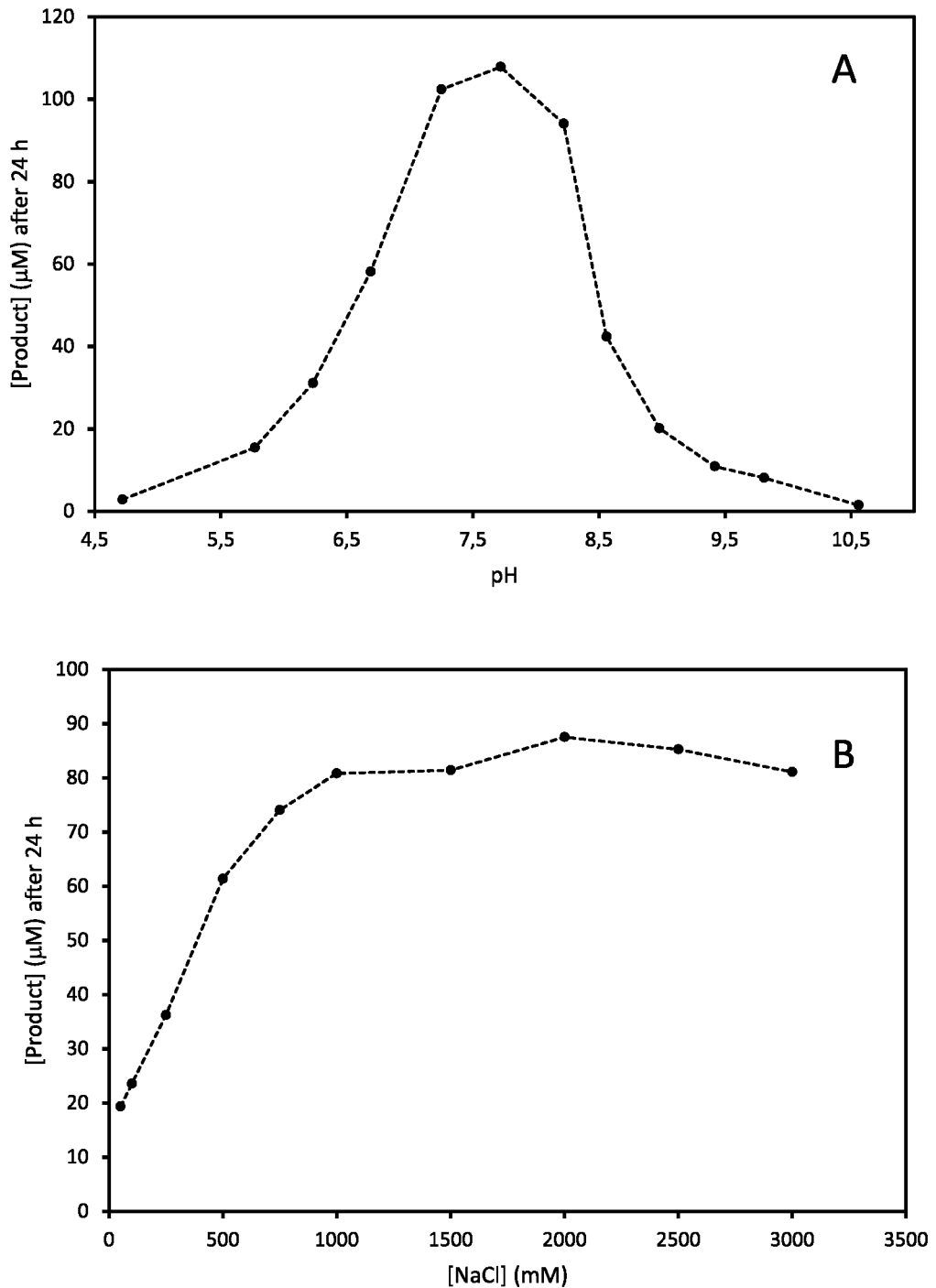

FIG. 8. (A) Resulting product amount from sortase F activity as a function of pH after 24 hours conjugation, with detection of conjugated product (RP-HPLC): pH was varied between 4.5 to 10.5, while maintaining other parameters (sortase F concentration, temperature, salt concentration, etc.) constant. pH was preferentially around 8; (B) Resulting product amount from sortase F activity as a function of ionic strength after 24 hours conjugation, with detection of conjugated product (RP-HPLC): NaCl concentration was varied between 0 and 3 M, while maintaining other parameters (sortase F concentration, temperature, pH, etc.) constant. Salt concentration was preferentially above 250 mM for maximal sortase F activity, and more preferential above 750 mM.

Figure 9:
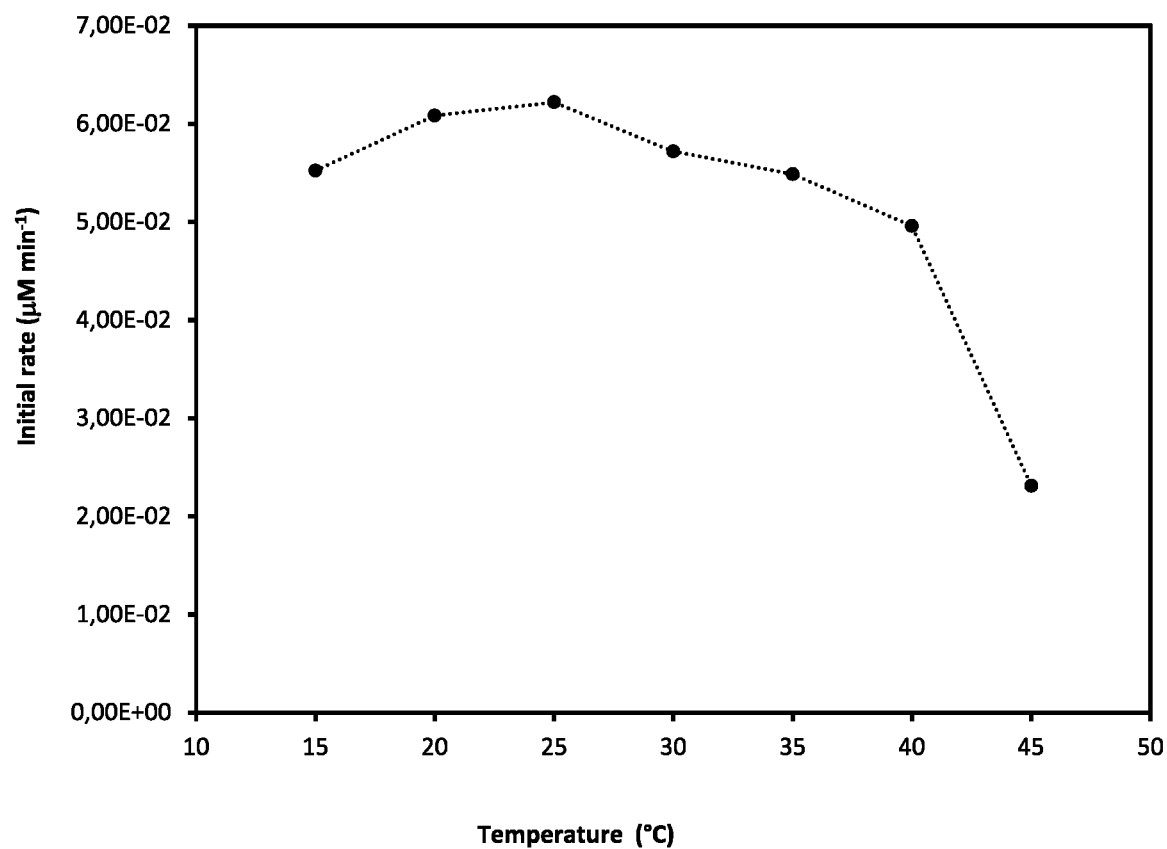

FIG. 9. Temperature dependence of sortase F activity rate in conjugating a quencher-fluorophore peptide (representing a sortase F recognition motif) and a triglycine, as measured with a fluorescence spectrometer. The temperature optimum was found to be about 25° C., and the reaction rate decreased at temperatures above 40° C.

Figure 10:
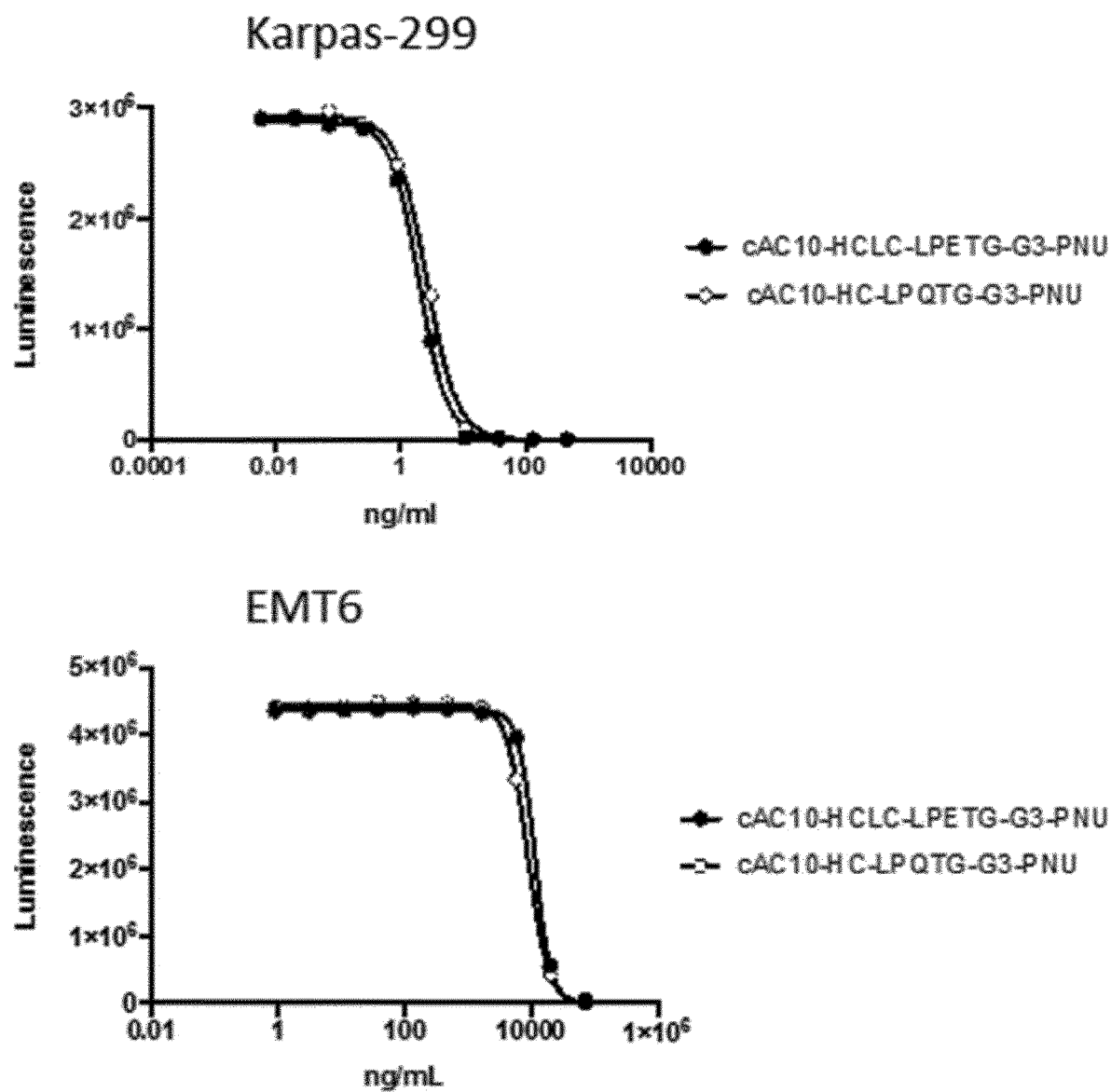

FIG. 10. Dose-response curve of the in vitro cell killing assays on the CD30-high Karpas-299 and CD30-negative EMT6 cell lines. The sortase F conjugated CD30-targeting ADCs provide effective in vitro cell killing in an antigen-dependent manner. Viable cells were quantified using a luminescent cell viability assay.

FIG. 11A-B, (A) Shows a screenshot from the conserved protein domain family, Sortase_F; and (B) a screenshot of the sequence alignment of the conserved protein domain family, Sortase F, all of which having Conserved Domain cd05829, demonstrating that within the scientific community, "sortase f" is a well accepted and well defined group of enzymes that are clearly discernible among other sortase classes.

Note that KJF20116.1 corresponds to SEQ ID NO 74,
WP_004601200.1 corresponds to SEQ ID NO 75,
KGL66019.1 corresponds to SEQ ID NO 76,
WP_009086632.1 corresponds to SEQ ID NO 77,
KJF23054.1 corresponds to SEQ ID NO 78,
ALG84807.1 corresponds to SEQ ID NO 79,
KNA93440.1 corresponds to SEQ ID NO 80,
WP_013126695.1 corresponds to SEQ ID NO 81,
WP_007241141.1 corresponds to SEQ ID NO 82,
WP_005511695.1 corresponds to SEQ ID NO 83, and
tr|C7EN57|C7EN57_STRSU corresponds to SEQ ID NO 84,
or SEQ ID NO: 85,

DETAILED DESCRIPTION OF THE INVENTION

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

All amino acid sequences disclosed herein are shown from N-terminus to C-terminus; all nucleic acid sequences disclosed herein are shown 5'->3'.

Unless defined otherwise herein, all technical and scientific terms used herein have the same meaning as commonly understood by those of ordinary skill in the art to which this invention pertains.

Preferred Embodiments Relative to the Substrates

The method of the invention comprises providing two substrates, each substrate being independently selected from the one or more of the groups consisting of:
  i. small molecules, and
  ii. proteins.

In one embodiment, one substrate is an antibody, an antibody-based binding protein or an antibody fragment, and the second substrate is a small molecule.

"Small molecules" as used herein refer to small molecules having a molecular weight not exceeding 2500 Daltons. This small molecule may particularly be a toxin or a label.

"Small molecule toxins", also referred to as toxins, as used herein refer to cytotoxic or cytostatic small molecules, preferably having a molecular weight not exceeding 2500 Daltons. Such small molecule toxins include, but are not limited to, a maytansinoid (e.g., maytansinol or DM1 maytansinoid), a taxane, a calicheamicin, a cemadotin, a monomethylauristatin (e.g., monomethylauristatin E or monomethylauristatin F), a pyrrolobenzodiazepine (PBD), a campothecin, an amanitin, a cryptophycin or an anthracycline. Small molecule toxins also include vincristine and prednisone. In various embodiments, the small molecule toxin can be an antimetabolite (e.g., an antifolate such as methotrexate, a fluoropyrimidine such as 5-fluorouracil, cytosine arabinoside, or an analogue of purine or adenosine); an intercalating agent (for example, an anthracycline such as doxorubicin, PNU-159682, daunomycin, epirabicin, idarubicin, mitomycin-C, dactinomycin, or mithramycin, or other intercalating agents such as pyrrolobenzodiazepine); a DNA-reactive agent such as calicheamicins, tiancimycins, and other enediynes; a platinum derivative (e.g., cisplatin or carboplatin); an alkylating agent (e.g., nitrogen mustard, melphalan, chlorambucil, busulphan, cyclophosphamide, ifosfamide nitrosoureas or thiotepa); an RNA polymerase inhibitor such as α-amanitin; an antimitotic agent (e.g., a vinca alkaloid such as vincristine, or a taxoid such as paclitaxel or docetaxel); a topoisomerase inhibitor (for example, etoposide, teniposide, amsacrine, topotecan); a cell cycle inhibitor (for example, a flavopyridol); or a microbtubule agent (e.g., an epothilone, a tubulysine, a pre-tubulysine, discodermolide analog, or eleutherobin analog). A small molecule toxin can be a proteosome inhibitor or a topoisomerase inhibitor such as bortezomib, amsacrine, etoposide, etoposide phosphate, teniposide, or doxorubicin. A small molecule toxin can include therapeutic radioisotopes such as iodine ($^{131}$I), yttrium ($^{90}$Y), lutetium ($^{177}$Lu), actinium ($^{225}$Ac), praseodymium, astatine (At), rhenium (Re), bismuth (Bi or Bi), and rhodium (Rh). Antiangiogenic agents that may be small molecule toxins include linomide, bevacuzimab, angiostatin, and razoxane.

In another embodiment, the small molecule is a toxin selected from the group consisting of: maytansinoids, auristatins, anthracyclins, calcheamicins, tubulysins, duocarmycins, taxanes, and pyrrolbenzodiazepines.

In another embodiment, the small molecule toxin is selected from PNU-159682 as described in Quintieri et al. (*Clin. Cancer Res.*, 11 (2005) 1608-1617) and derivatives thereof, maytansine, monomethyl auristatin MMAE, and monomethyl auristatin MMAF.

In another embodiment, the toxin has the following formula (i), formula (i)

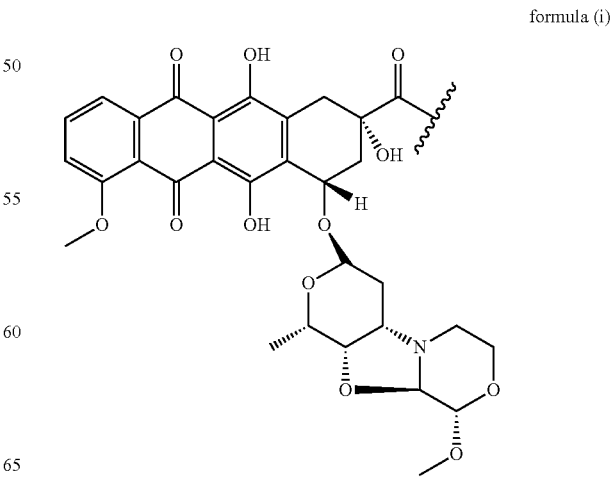

conjugated, directly or indirectly, to the other substrate via its wavy line.

"Small molecule labels", also referred to as labels, as used herein refer to a fluorescent label (including a fluorescent dye or a fluorescent protein), a near infrared dye, a chromophore label, a radioisotope label containing iodine (e.g., $^{125}$I), gallium ($^{67}$Ga), indium ($^{111}$I), technetium ($^{99m}$Tc), phosphorus ($^{32}$P), carbon ($^{14}$C), tritium ($^{3}$H), and/or other radioisotope (e.g., a radioactive ion).

"Proteins" refer to molecules made up of stretches of amino acid monomers linked by peptide bonds. In a preferred embodiment, proteins are selected from one or more of the following:
 i. oligopeptides,
 ii. antibodies,
 iii. antibody-based binding proteins containing at least one antibody-derived VH, VL, or CH immunoglobulin domain,
 iv. antibody fragments binding to a receptor, antigen, growth factor, cytokine and/or hormone,
 v. antibody mimetics, and
 vi. modified antibody formats.

In one embodiment, the protein is useful in a biochemical assay, such as avidin or streptavidin.

"Oligopeptides" as used herein refer to short, generally 2 to 20, stretches of amino acid monomers linked by peptide bonds. Some peptides may present inhibitory or toxic properties that make them useful as therapeutics.

"Antibodies", also synonymously called "immunoglobulins" (Ig), generally comprise four polypeptide chains, two heavy (H) chains and two light (L) chains, and are therefore multimeric proteins, or an equivalent Ig homologue thereof (e.g., a camelid nanobody, which comprises only a heavy chain, single domain antibodies (dAbs) which can be either derived from a heavy or light chain); including full length functional mutants, variants, or derivatives thereof (including, but not limited to, murine, chimeric, humanized and fully human antibodies, which retain the essential epitope binding features of an Ig molecule, and including dual specific, bispecific, multispecific, and dual variable domain immunoglobulins; Immunoglobulin molecules can be of any class (e.g., IgG, IgE, IgM, IgD, IgA, and IgY), or subclass (e.g., IgG1, IgG2, IgG3, IgG4, IgA1, and IgA2) and allotype.

An "antibody-based binding protein", as used herein, may represent any protein that contains at least one antibody-derived $V_H$, $V_L$, or $C_H$ immunoglobulin domain in the context of other non-immunoglobulin, or non-antibody derived components. Such antibody-based proteins include, but are not limited to (i) $F_c$-fusion proteins of binding proteins, including receptors or receptor components with all or parts of the immunoglobulin CH domains, (ii) binding proteins, in which $V_H$ and or $V_L$ domains are coupled to alternative molecular scaffolds, or (iii) molecules, in which immunoglobulin $V_H$, and/or $V_L$, and/or $C_H$ domains are combined and/or assembled in a fashion not normally found in naturally occurring antibodies or antibody fragments.

An "antibody fragment", as used herein, relates to a molecule comprising at least one polypeptide chain derived from an antibody that is not full length, including, but not limited to (i) a Fab fragment, which is a monovalent fragment consisting of the variable light ($V_L$), variable heavy ($V_H$), constant light ($C_L$) and constant heavy 1 ($C_H$1) domains; (ii) a F(ab')2 fragment, which is a bivalent fragment comprising two Fab fragments linked by a disulfide bridge at the hinge region; (iii) a heavy chain portion of a $F_{ab}$ ($F_d$) fragment, which consists of the $V_H$ and $C_H$1 domains; (iv) a variable fragment ($F_v$) fragment, which consists of the $V_L$ and $V_H$ domains of a single arm of an antibody, (v) a domain antibody (dAb) fragment, which comprises a single variable domain; (vi) an isolated complementarity determining region (CDR); (vii) a single chain $F_v$ Fragment (sc$F_v$); (viii) a diabody, which is a bivalent, bispecific antibody in which $V_H$ and $V_L$ domains are expressed on a single polypeptide chain, but using a linker that is too short to allow for pairing between the two domains on the same chain, thereby forcing the domains to pair with the complementarity domains of another chain and creating two antigen binding sites; and (ix) a linear antibody, which comprises a pair of tandem $F_v$ segments ($V_H$-$C_H$1-$V_H$-$C_H$1) which, together with complementarity light chain polypeptides, form a pair of antigen binding regions; and (x) other non-full length portions of immunoglobulin heavy and/or light chains, or mutants, variants, or derivatives thereof, alone or in any combination.

The term "antibody mimetic", as used herein, refers to proteins not belonging to the immunoglobulin family, and even non-proteins such as aptamers, or synthetic polymers. Some types have an antibody-like beta-sheet structure. Potential advantages of "antibody mimetics" or "alternative scaffolds" over antibodies are better solubility, higher tissue penetration, higher stability towards heat and enzymes, and comparatively low production costs.

The term "modified antibody format", as used herein, encompasses antibody-drug-conjugates, polyalkylene oxide-modified scFv, Monobodies, Diabodies, Camelid Antibodies, Domain Antibodies, bi- or trispecific antibodies, IgA, or two IgG structures joined by a J chain and a secretory component, shark antibodies, new world primate framework+non-new world primate CDR, IgG4 antibodies with hinge region removed, IgG with two additional binding sites engineered into the CH3 domains, antibodies with altered Fc region to enhance affinity for Fc gamma receptors, dimerised constructs comprising CH3+VL+VH, and the like.

In one embodiment, the antibody, antibody-based binding protein or antibody fragment binds to at least one of the mouse and/or cynomolgus and/or protein targets selected from the group consisting of: CD30, HER2, ROR1, ROR2, mesothelin, and/or or CS1.

In one embodiment, the antibody, antibody-based binding protein or antibody fragment binds to CD30.

One antibody that binds to CD30 is the antibody AC10. AC10 is disclosed in detail in US2008213289A1.

Preferably, the antibody, antibody-based binding protein or antibody fragment
is an antibody that
 a) comprises a set of heavy chain/light chain complementarity determining regions (CDR) comprised in the heavy chain/light variable domain sequence pair of SEQ ID NOs: 86 and 87
 b) comprises a set of heavy chain/light chain complementarity determining regions (CDR) comprising the following SEQ ID NOs, in the order (HCDR1; HCDR2; HCDR3; LCDR1; LCDR2 and LCDR3) 88, 89, 90, 91 92 and 93
 c) comprises the heavy chain/light chain complementarity determining regions (CDR) of b), with the proviso that at least one of the CDRs has up to 3 amino acid substitutions relative to the respective SEQ ID NOs, and/or
 d) comprises the heavy chain/light chain complementarity determining regions (CDR) of b) or c), with the proviso that at least one of the CDRs has a sequence identity of ≥66% to the respective SEQ ID NOs,
wherein the CDRs are embedded in a suitable protein framework so as to be capable to bind to ROR1 with sufficient binding affinity.

As used herein, the term "CDR" or "complementarity determining region" is intended to mean the non-contiguous antigen combining sites found within the variable region of both heavy and light chain polypeptides. These particular regions have been described by Kabat et al. (1977), Kabat et al. (1991), Chothia et al. (1987) and MacCallum et al., (1996) where the definitions include overlapping or subsets of amino acid residues when compared against each other. Nevertheless, application of either definition to refer to a CDR of an antibody or grafted antibodies or variants thereof is intended to be within the scope of the term as defined and used herein. The amino acid residues which encompass the CDRs as defined by each of the above cited references are set forth in the table below as a comparison. Note that this numbering may differ from the CDRs that are actually disclosed in the enclosed sequence listing, because CDR definitions vary from case to case.

| CDR definitions | | | |
|---|---|---|---|
| | Kabat | Chothia | MacCallum |
| VH CDR1 | 31-35 | 26-32 | 30-35 |
| VH CDR2 | 50-65 | 53-55 | 47-58 |
| VH CDR3 | 95-102 | 96-101 | 93-101 |
| VL CDR1 | 24-34 | 26-32 | 30-36 |
| VL CDR2 | 50-56 | 50-52 | 46-55 |
| VL CDR3 | 89-97 | 91-96 | 89-96 |

As used herein, the term "framework" when used in reference to an antibody variable region is entered to mean all amino acid residues outside the CDR regions within the variable region of an antibody. Therefore, a variable region framework is between about 100-120 amino acids in length but is intended to reference only those amino acids outside of the CDRs.

As used herein, the term "capable to bind to target X with sufficient binding affinity" has to be understood as meaning that respective binding domain binds the target with a $K_D$ of $10^{-4}$ or smaller. $K_D$ is the equilibrium dissociation constant, a ratio of $k_{off}/k_{on}$, between the protein binder and its antigen. $K_D$ and affinity are inversely related. The $K_D$ value relates to the concentration of protein binder (the amount of protein binder needed for a particular experiment) and so the lower the $K_D$ value (lower concentration) and thus the higher the affinity of the binding domain. The following table shows typical $K_D$ ranges of monoclonal antibodies

| $K_D$ and Molar Values | |
|---|---|
| $K_D$ value | Molar range |
| $10^{-4}$ to $10^{-6}$ | Micromolar (µM) |
| $10^{-7}$ to $10^{-9}$ | Nanomolar (nM) |
| $10^{-10}$ to $10^{-12}$ | Picomolar (pM) |
| $10^{-13}$ to $10^{-15}$ | Femtomolar (fM) |

Preferably, the protein binder has up to 2 amino acid substitutions, and more preferably up to 1 amino acid substitution.

Preferably, at least one of the CDRs has a sequence identity of ≥67%; ≥68%; ≥69%; ≥70%; ≥71%; ≥72%; ≥73%; ≥74%; ≥75%; ≥76%; ≥77%; ≥78%; ≥79%; ≥80%; ≥81%; ≥82%; ≥83%; ≥84%; ≥85%; ≥86%; ≥87%; ≥88%; ≥89%; ≥90%; ≥91%; ≥92%; ≥93%; ≥94%; ≥95%; ≥96%; ≥97%; ≥98%; ≥99%, and most preferably 100% to the respective SEQ ID NO.

"Percentage of sequence identity" as used herein, is determined by comparing two optimally aligned sequences over a comparison window, wherein the portion of the polynucleotide sequence in the comparison window may comprise additions or deletions (i.e., gaps) as compared to the reference sequence (e.g., a polypeptide), which does not comprise additions or deletions, for optimal alignment of the two sequences. The percentage is calculated by determining the number of positions at which the identical nucleic acid base or amino acid residue occurs in both sequences to yield the number of matched positions, dividing the number of matched positions by the total number of positions in the window of comparison and multiplying the result by 100 to yield the percentage of sequence identity.

The terms "identical" or percent "identity," in the context of two or more nucleic acids or polypeptide sequences, refer to two or more sequences or subsequences that are the same sequences. Two sequences are "substantially identical" if two sequences have a specified percentage of amino acid residues or nucleotides that are the same (i.e., at least 85%, 90%, 95%, 96%, 97%, 98% or 99% sequence identity over a specified region, or, when not specified, over the entire sequence of a reference sequence), when compared and aligned for maximum correspondence over a comparison window, or designated region as measured using one of the following sequence comparison algorithms or by manual alignment and visual inspection. The disclosure provides polypeptides or polynucleotides that are substantially identical to the polypeptides or polynucleotides, respectively, exemplified herein. Optionally, the identity exists over a region that is at least about 15, 25 or 50 nucleotides in length, or more preferably over a region that is 100 to 500 or 1000 or more nucleotides in length, or over the full length of the reference sequence. With respect to amino acid sequences, identity or substantial identity can exist over a region that is at least 5, 10, 15 or 20 amino acids in length, optionally at least about 25, 30, 35, 40, 50, 75 or 100 amino acids in length, optionally at least about 150, 200 or 250 amino acids in length, or over the full length of the reference sequence. With respect to shorter amino acid sequences, e.g., amino acid sequences of 20 or fewer amino acids, substantial identity exists when one or two amino acid residues are conservatively substituted, according to the conservative substitutions defined herein.

Preferably, at least one of the CDRs has been subject to CDR sequence modification, including
affinity maturation
reduction of immunogenicity Affinity maturation in the process by which the affinity of a given antibody is increased in vitro. Like the natural counterpart, in vitro affinity maturation is based on the principles of mutation and selection. It has successfully been used to optimize antibodies, antibody fragments or other peptide molecules like antibody mimetics. Random mutations inside the CDRs are introduced using radiation, chemical mutagens or error-prone PCR. In addition, the genetic diversity can be increased by chain shuffling. Two or three rounds of mutation and selection using display methods like phage display usually results in antibody fragments with affinities in the low nanomolar range. For principles see Eylenstein et al. (2016), the content of which is incorporated herein by reference.

Engineered antibodies contain murine-sequence derived CDR regions that have been engrafted, along with any necessary framework back-mutations, into sequence-derived V regions. Hence, the CDRs themselves can cause immunogenic reactions when the humanized antibody is administered to a patient. Methods of reducing immunogenicity caused by CDRs are disclosed in Harding et al. (2010), the content of which is incorporated herein by reference.

According to another embodiment of the invention, the binding protein comprised in the binding protein-toxin conjugate is an antibody that
a) the heavy chain/light chain variable domain (HCVD/LCVD) pairs set forth in SEQ ID NOs: 86 and 87
b) the heavy chain/light chain variable domains (HCVD/LCVD) pairs of a), with the proviso that
the HCVD has a sequence identity of ≥80% to the respective SEQ ID NO, and/or
the LCVD has a sequence identity of ≥80% to the respective SEQ ID NO,
c) the heavy chain/light chain variable domains (VD) pairs of a) or b), with the proviso that at least one of the HCVD or LCVD has up to 10 amino acid substitutions relative to the respective SEQ ID NO,
said protein binder still being capable to bind ROR1 with sufficient binding affinity.

A "variable domain" when used in reference to an antibody or a heavy or light chain thereof is intended to mean the portion of an antibody which confers antigen binding onto the molecule and which is not the constant region. The term is intended to include functional fragments thereof which maintain some of all of the binding function of the whole variable region. Variable region binding fragments include, for example, functional fragments such as Fab, F(ab)$_2$, Fv, single chain Fv (scfv) and the like. Such functional fragments are well known to those skilled in the art. Accordingly, the use of these terms in describing functional fragments of a heteromeric variable region is intended to correspond to the definitions well known to those skilled in the art. Such terms are described in, for example, Huston et al., (1993) or Plückthun and Skerra (1990).

Preferably, the HCVD and/or LCVD has a sequence identity of ≥81%; ≥82%; ≥83%; ≥84%; ≥85%; ≥86%; ≥87%; ≥88%; ≥89%; ≥90%; ≥91%; ≥92%; ≥93%; ≥94%; ≥95%; ≥96%; ≥97%; ≥98%; ≥99%; or most preferably 100% to the respective SEQ ID NO.

According to another embodiment of the invention, the binding protein comprises at least one amino acid substitution is a conservative amino acid substitution.

A "conservative amino acid substitution", as used herein, has a smaller effect on antibody function than a non-conservative substitution. Although there are many ways to classify amino acids, they are often sorted into six main groups on the basis of their structure and the general chemical characteristics of their R groups.

In some embodiments, a "conservative amino acid substitution" is one in which the amino acid residue is replaced with an amino acid residue having a similar side chain. For example, families of amino acid residues having similar side chains have been defined in the art. These families include amino acids with
basic side chains (e.g., lysine, arginine, histidine),
acidic side chains (e.g., aspartic acid, glutamic acid),
uncharged polar side chains (e.g., glycine, asparagine, glutamine, serine, threonine, tyrosine, cysteine),
nonpolar side chains (e.g., alanine, valine, leucine, isoleucine, proline, phenylalanine, methionine, tryptophan),
beta-branched side chains (e.g., threonine, valine, isoleucine) and
aromatic side chains (e.g., tyrosine, phenylalanine, tryptophan, histidine).

Other conserved amino acid substitutions can also occur across amino acid side chain families, such as when substituting an asparagine for aspartic acid in order to modify the charge of a peptide. Conservative changes can further include substitution of chemically homologous non-natural amino acids (i.e. a synthetic non-natural hydrophobic amino acid in place of leucine, a synthetic non-natural aromatic amino acid in place of tryptophan).

According to another embodiment of the invention, the binding protein has a target binding affinity to ROR1 of at least 50% compared to that of an antibody according to the above description.

As used herein the term "binding affinity" is intended to mean the strength of a binding interaction and therefore includes both the actual binding affinity as well as the apparent binding affinity. The actual binding affinity is a ratio of the association rate over the disassociation rate. Therefore, conferring or optimizing binding affinity includes altering either or both of these components to achieve the desired level of binding affinity. The apparent affinity can include, for example, the avidity of the interaction. For example, a bivalent heteromeric variable region binding fragment can exhibit altered or optimized binding affinity due to its valency.

A suitable method for measuring the affinity of a binding agent is through surface plasmon resonance (SPR). This method is based on the phenomenon which occurs when surface plasmon waves are excited at a metal/liquid interface. Light is directed at, and reflected from, the side of the surface not in contact with sample, and SPR causes a reduction in the reflected light intensity at a specific combination of angle and wavelength. Biomolecular binding events cause changes in the refractive index at the surface layer, which are detected as changes in the SPR signal. The binding event can be either binding association or disassociation between a receptor-ligand pair. The changes in refractive index can be measured essentially instantaneously and therefore allows for determination of the individual components of an affinity constant. More specifically, the method enables accurate measurements of association rates ($k_{on}$) and disassociation rates ($k_{off}$).

Measurements of $k_{on}$ and $k_{off}$ values can be advantageous because they can identify altered variable regions or optimized variable regions that are therapeutically more efficacious. For example, an altered variable region, or heteromeric binding fragment thereof, can be more efficacious because it has, for example, a higher $k_{on}$ valued compared to variable regions and heteromeric binding fragments that exhibit similar binding affinity. Increased efficacy is conferred because molecules with higher $k_{on}$ values can specifically bind and inhibit their target at a faster rate. Similarly, a molecule of the invention can be more efficacious because it exhibits a lower $k_{off}$ value compared to molecules having similar binding affinity. Increased efficacy observed with molecules having lower $k_{off}$ rates can be observed because, once bound, the molecules are slower to dissociate from their target. Although described with reference to the altered variable regions and optimized variable regions of the invention including, heteromeric variable region binding fragments thereof, the methods described above for measuring associating and disassociation rates are applicable to essentially any protein binder or fragment thereof for identifying more effective binders for therapeutic or diagnostic purposes.

Another suitable method for measuring the affinity of a binding agent is through surface is by FACS/scatchard analysis.

Methods for measuring the affinity, including association and disassociation rates using surface plasmon resonance are well known in the arts and can be found described in, for example, Jonsson and Malmquist, (1992) and Wu et al. (1998). Moreover, one apparatus well known in the art for measuring binding interactions is a BIAcore 2000 instrument which is commercially available through Pharmacia Biosensor, (Uppsala, Sweden).

Preferably said target binding affinity is ≥51%, ≥52%, ≥53%, ≥54%, ≥55%, ≥56%, ≥57%, ≥58%, ≥59%, ≥60%, ≥61%, ≥62%, ≥63%, ≥64%, ≥65%, ≥66%, ≥67%, ≥68%, ≥69%, ≥70%, ≥71%, ≥72%, ≥73%, ≥74%, ≥75%, ≥76%, ≥77%, ≥78%, ≥79%, ≥80%, ≥81%, ≥82%, ≥83%, ≥84%, ≥85%, ≥86%, ≥87%, ≥88%, ≥89%, ≥90%, ≥91%, ≥92%, ≥93%, ≥94%, ≥95%, ≥96%, ≥97%, ≥98%, and most preferably ≥99% compared to that of the reference binding agent.

According to another embodiment of the invention, the binding protein competes for binding ROR1 with an antibody according to the above description.

According to another embodiment of the invention, the binding protein binds to essentially the same, or the same, region on ROR1 as an antibody according to the above description.

As used herein, the term "competes for binding" is used in reference to one of the antibodies defined by the sequences as above, meaning that the actual protein binder as an activity which binds to the same target, or target epitope or domain or subdomain, as does said sequence defined protein binder, and is a variant of the latter. The efficiency (e.g., kinetics or thermodynamics) of binding may be the same as or greater than or less than the efficiency of the latter. For example, the equilibrium binding constant for binding to the substrate may be different for the two antibodies.

Such competition for binding can be suitably measured with a competitive binding assay. Such assays are disclosed in Finco et al. 2011, the content of which is incorporated herein by reference, and their meaning for interpretation of a patent claim is disclosed in Deng et al 2018, the content of which is incorporated herein by reference.

In order to test for this characteristic, suitable epitope mapping technologies are available, including, inter alia,
 X-ray co-crystallography and cryogenic electron microscopy (cryo-EM)
 Array-based oligo-peptide scanning
 Site-directed mutagenesis mapping
 High-throughput shotgun mutagenesis epitope mapping
 Hydrogen-deuterium exchange, and/or
 Cross-linking-coupled mass spectrometry These methods are, inter alia, disclosed and discussed in Banik et al (2010), and DeLisser (1999), the content of which is herein incorporated by reference.

Preferred Embodiments Relative to the Sortase F Recognition Motif

The method of the invention comprises providing two substrates, wherein one substrate comprises a sortase F recognition motif.

Figure 1:
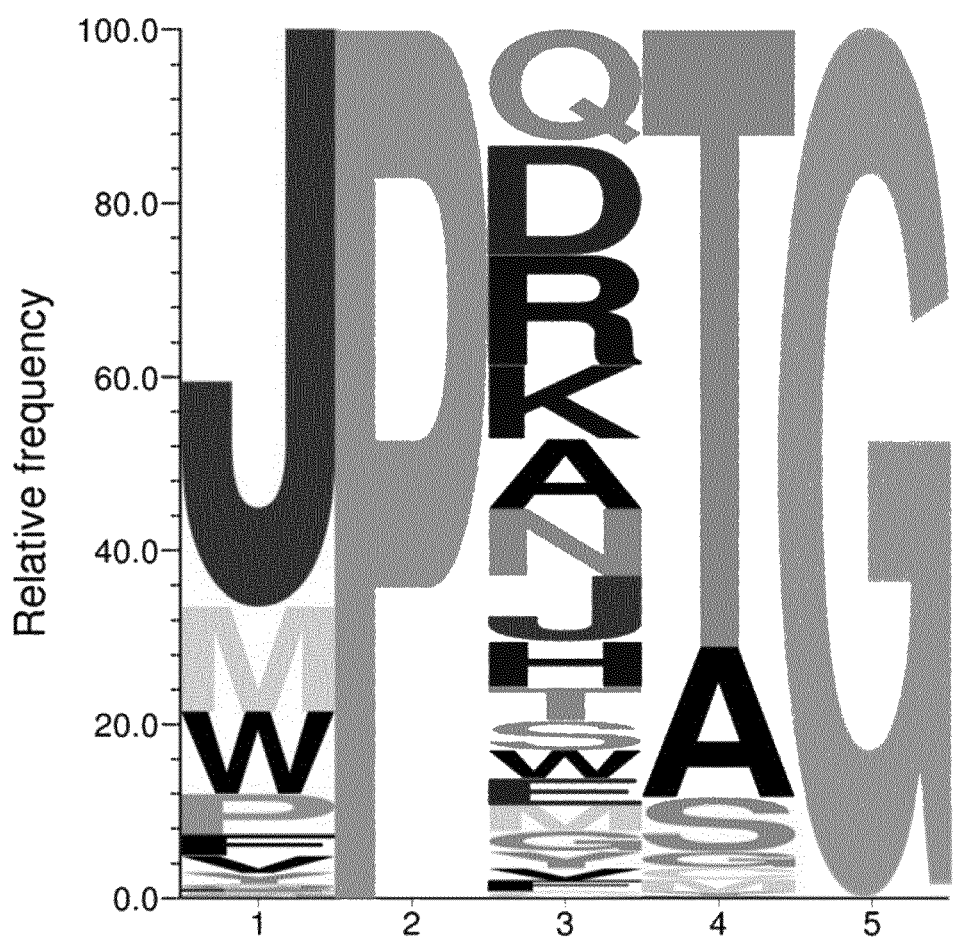
FIG. 1. Amino acid sequence of the sortase F recognition motif according to relative frequency of reaction of pentapeptide sequences varied over the naturally-occurring amino acids at individual positions. The letter J stands for the amino acid residue Leucine or Isoleucine.

In a preferred embodiment, the sortase F recognition motif corresponds to a recognition motif according to FIG. 1, preferably where the residue at each position is a residue having a relative frequency of at least 4%, and preferably of at least 8%, according to FIG. 1.

The data of FIG. 1, i.e., the approximate percentage preference of individual amino acids at different positions along the pentameric sortase F recognition motif, rounded to one decimal point, is given below in tabular form (Positions 1-5 of the pentamer are listed in N to C-terminal direction). The amino acid residue at each position having a relative frequency of at least 4% are given in bold:

TABLE 2

Amino acid composition of sortase F recognition motifs

| Residue (single letter code) | Position 1 | Position 2 | Position 3 | Position 4 | Position 5 |
|---|---|---|---|---|---|
| Alanine (A) | 0 | 0 | 8.1 | 17.3 | 0 |
| Arginine (R) | 0 | 0 | 12.6 | 0 | 0 |
| Asparagine (N) | 0.3 | 0 | 7.8 | 0 | 0 |
| Aspartate (D) | 0.1 | 0 | 12.7 | 0.3 | 0 |
| Cysteine (C) | 0 | 0 | 0.8 | 1.4 | 0 |
| Glutamine (Q) | 0.5 | 0 | 13.4 | 0 | 0 |
| Glutamate (E) | 0.4 | 0 | 3.1 | 0 | 0 |
| Glycine (G) | 0 | 0 | 2.3 | 1.8 | 100 |
| Histidine (H) | 0 | 0 | 5.2 | 0 | 0 |
| Leucine/Isoleucine (J) | 66.5 | 0 | 7.5 | 0 | 0 |
| Lysine (K) | 0 | 0 | 8.5 | 0 | 0 |
| Methionine (M) | 12.1 | 0 | 3.0 | 1.4 | 0 |
| Phenylalanine (F) | 2.4 | 0 | 1.3 | 0 | 0 |
| Proline (P) | 4.7 | 100 | 0 | 0 | 0 |
| Serine (S) | 0.3 | 0 | 3.5 | 6.2 | 0 |
| Threonine (T) | 0 | 0 | 3.8 | 71.1 | 0 |
| Tryptophan (W) | 9.5 | 0 | 3.2 | 0 | 0 |
| Tyrosine (Y) | 1.3 | 0 | 1.9 | 0.4 | 0 |
| Valine (V) | 2.0 | 0 | 1.4 | 0 | 0 |

In one embodiment, the sortase F recognition motif is LPXTG (SEQ ID NO: 44), where X is any amino acid with the exception of proline.

In a preferred embodiment, X is selected from amino acid residues having the following single letter codes: A, R, N, D, Q, I, L and K. In a preferred embodiment, the sortase F recognition motif is LPQTG (SEQ ID NO: 49; in N- to C-terminal orientation).

In a preferred embodiment, prior to sortase F-mediated conjugation, the sortase F recognition motif is linked, directly or indirectly, to one or more affinity purification and/or detection tags. Affinity purification tags, for example, may be such as to be removed as part of the transpeptidation reaction. Affinity resins can then be used to remove non-conjugated substrates and to enrich fully conjugated substrates. Affinity purification or detection tags include, but are not limited to, small peptide tags (e.g. histidine tags, streptag, twinstrep-tag, MYC-tag or HA-tag) or larger protein affinity purification tags (e.g. maltose-binding protein (MBP) tag, Glutathione-S-transferase (GST) tag, or Chitin-binding tag).

In the case where the substrate comprising the sortase F recognition motif is an oligopeptide, an antibody, an antibody-based binding protein containing at least one antibody-derived VH, VL, or CH immunoglobulin domain, an antibody fragment binding to a receptor, antigen, growth factor, cytokine and/or hormone, an antibody mimetic, or a modified antibody format (jointly referred to as "protein substrates"), the sortase F recognition motif is preferably located at one or more C-termini.

In the case of one substrate being an antibody, wherein the sortase F recognition motif is at the C-terminus, and the other substrate being a small molecule toxin, the average toxin ("drug") to antibody ratio can be determined by methods known to the skilled person, and is generally referred to as the DAR (Drug to Antibody Ratio). In a preferred embodiment, the DAR is any number between 1 and 4.

In case the other substrate is a small molecule toxin, the average toxin ("drug") to antibody ratio can be determined by methods known to the skilled person, and is generally referred to as the DAR (Drug to Antibody Ratio). In a preferred embodiment, the DAR is any number between 1 and 4.

In some cases (e.g. at the C-terminus of the Ig kappa light chains, see: Beerli et al., *PloS One* 10, (2015) e131177) it may be beneficial to add additional amino acids (hereafter "spacer amino acids") between the C-terminus of protein substrates and the sortase recognition motif. In the case of sortase A, this has been shown to improve sortase enzyme conjugation efficiencies of payloads to a binding protein. In the case of Ig kappa light chains, it was observed that by adding 5 amino acids between the last C-terminal cysteine amino acid of the Ig kappa light chain and the sortase recognition motif improved the kinetic of conjugation, so that the C-termini of Ig kappa light chains and Ig heavy chains could be conjugated with similar kinetics (see: Beerli et al., *PloS One* 10, (2015) e131177). Therefore, it is another preferred embodiment that optionally ≥1 and ≤11 amino acids are added in between the last C-terminal amino acid of a protein substrate and the sortase F recognition motif. In a preferred embodiment, a $G_nS$ peptide (wherein n is an integer is from 1 to 10, preferably from 1 to 5) is added between the last C-terminal amino acid of a protein substrate and the sortase F recognition motif. Finally, in another preferred embodiment, additional amino acids between the C-terminus of a protein substrate and the sortase F recognition motif may beneficially be included that comprise a sequence and/or linker that is cleavable by hydrolysis, by a pH change or by a change in redox potential, or that is cleavable by a non-sortase enzyme, e.g., by proteases.

In the case where the substrate comprising the sortase F recognition motif is a small molecule, this motif may be joined directly thereto, or indirectly via a chemical or peptidic linker. Such chemical or peptidic linkers are further discussed herebelow.

Preferred Embodiments Relative to the $Gly_n$ or $Ala_n$ Motif

The method of the invention comprises providing two substrates, wherein one substrate comprises a $Gly_n$ motif, an $Ala_n$ motif or a motif consisting of a mixture of Ala and Gly residues totaling n residues, where n is any integer from 1 to 21.

Preferably, the substrate being a small molecule comprises the $Gly_n$ motif, the $Ala_n$ motif, or the motif consisting of a mixture of Ala and Gly residues.

Preferably, the substrate being a small molecule comprises the $Gly_n$ motif. Preferably, n is an integer from ≥1 to ≤5

In the case where the substrate comprising a $Gly_n$ motif, an $Ala_n$ motif or a motif consisting of a mixture of Ala and Gly residues (jointly referred to as "Gly/Ala motif") is a protein substrate, the Gly/Ala motif is preferably located at one or more N-termini. Preferential embodiments described hereabove with regards to spacer amino acids apply in this context as well.

In the case where the substrate comprising the Gly/Ala motif is a small molecule, this motif may be joined directly thereto, or indirectly via a chemical or peptidic linker. Such linkers include, but are not limited to, one or more of: an oligopeptide linker (including cleavable and non-cleavable oligopeptide linkers), a hydrazine linker, a thiourea linker, a self-immolative linker, a succinimidyl trans-4-(maleimidyl-methyl)cyclohexane-1-carboxylate (SMCC) linker, a disulfide linker, a thioether linker and a maleimide linker. The skilled person understands that further linkers may be suitable. Such linkers may be non-cleavable or may be cleaved by changes in pH, redox potential or specific intracellular or extracellular enzymes. Cleavable oligopeptide linkers include protease-cleavable linkers. It is understood that the linker may comprise combinations of the above. For example, the linker may be a valine-citrulline PAB linker.

In the embodiment where the small molecule toxin is of formula (i), it is preferred that the linker comprise an alkyldiamino group of the form $NH_2-(CH_2)_m-NH_2$, where m≥1 and ≤11, preferably m=2, such that one amino group is directly linked at the wavy line of formula (i) to form an amide bond. It is moreover preferred that the second amino group is linked to the Gly/Ala motif. A preferred embodiment of the small molecule toxin comprising a Gly/Ala motif is depicted in

FIG. 2

Preferred Embodiments Relative to Sortase F or a Catalytic Domain Thereof

The present invention refers to a method for producing a conjugate of two substrates, the method comprising enzymatically-conjugating the two substrates using sortase F, or a catalytic domain thereof.

In a one embodiment, sortase F, or a catalytic domain thereof, is capable of binding and acting upon a sortase F recognition motif as defined herein.

In one embodiment, sortase F, or a catalytic domain thereof, comprises conserved domain cd05829 according to the NCBI Conserved Domain Database (CDD). The CDD is a protein annotation resource that consists of a collection of well-annotated multiple sequence alignment models for ancient domains and full-length proteins. Sequences can be searched for conserved domains at the CDD database. See, Marchler-Bauer et al. (2015) Nuclic Acids Res. 43 (D) 222-226.

Figure 11:
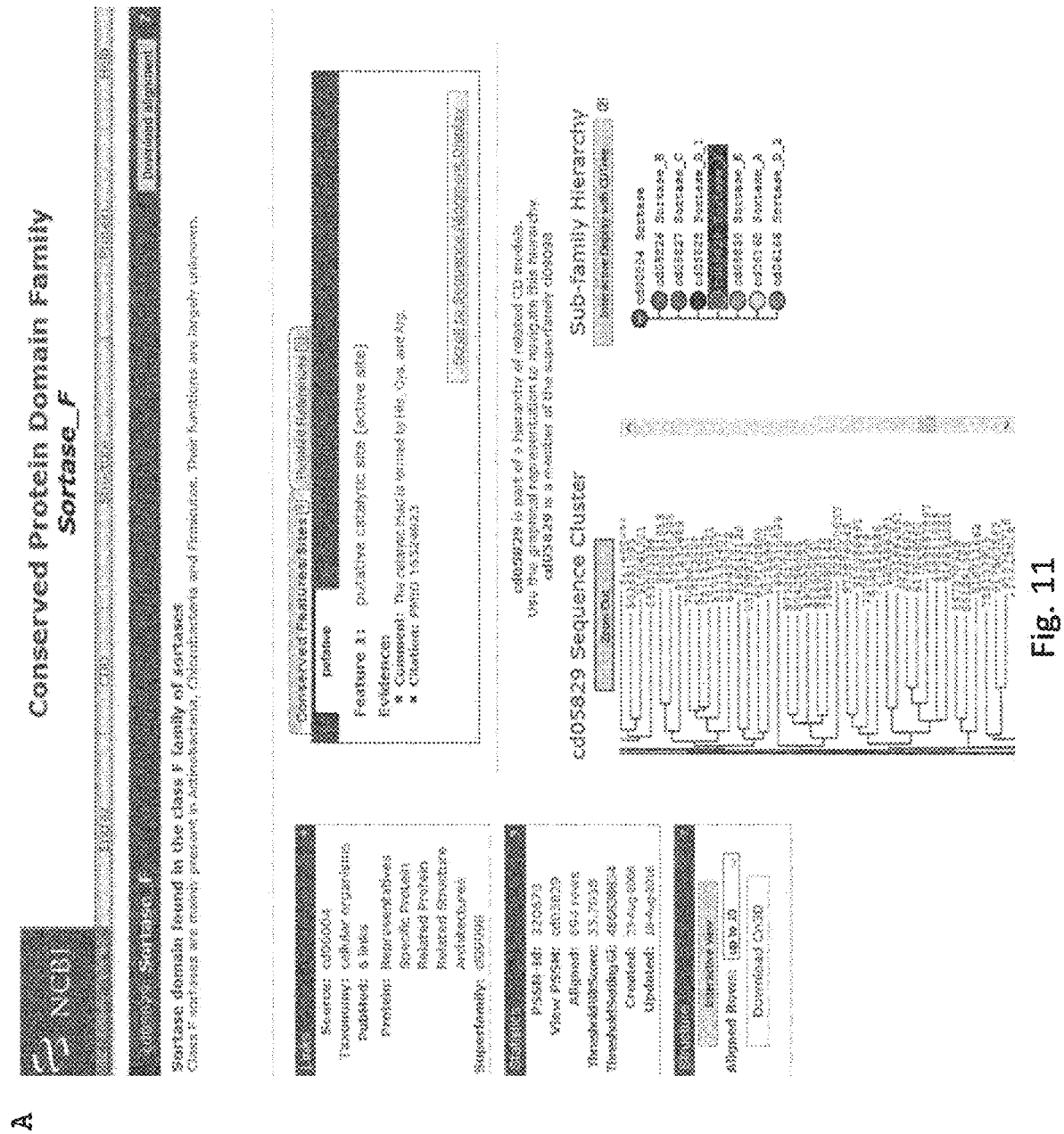
Figure 11:
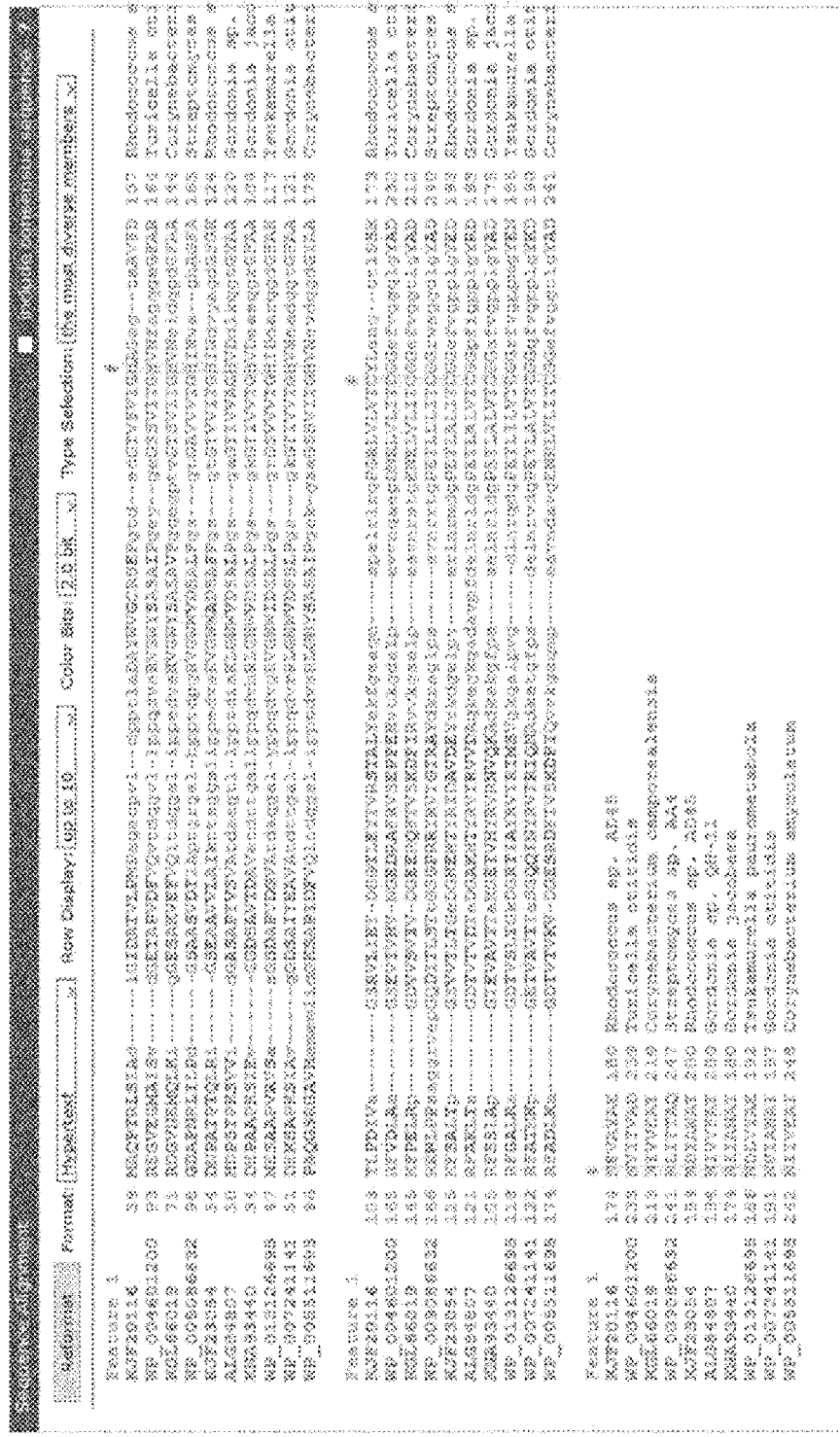

Reference to conserved domain cd05829 is made in FIG. 3 and FIG. 11.

FIG. 3 shows a multiple sequence alignment of sortase F representatives having Conserved Domain cd05829 in the CDD. The species name is given in the first column of the first block (e.g., *Propionibacterium acnes*), and the database accession number in the first column of the subsequent blocks. The catalytic triad formed of histidine (H), cysteine (C) and arginine (R) residues are outlined. Signal peptides are underlined in the first block. Variable length spacer residues are given in lower case.

In one embodiment, sortase F, or a catalytic domain thereof, originates from the class of Actinomycetales. In a preferred embodiment, sortase F, or a catalytic domain thereof, originates from the order of Propionibacterinaea. In a preferred embodiment, sortase F, or a catalytic domain thereof, originates from the family of Propionibacteriaceae. In a preferred embodiment, sortase F, or a catalytic domain thereof, originates from the genus of *Propionibacterium*. In particular, it is preferred that sortase F, or a catalytic domain thereof, originates from *Propionibacterium acnes* (*P. acnes*).

FIG. 4 shows a phylogenetic tree representing distances between example sortases, with sortase classes indicated, built with a Neighborhood Joining algorithm using the programs VAST (Gilbrat, J. F., *Current Opinion in Structural Biology*, 6 (1996), 377-385) and MAFFT (Kuraku, Zmasek, Nishimura, Katoh 2013 (*Nucleic Acids Research*

41: W22-W28). In a preferred embodiment, the class of sortase F is defined, as depicted here, as comprising sortases having a distance of up to and including 3, preferably up to an including 2.5 from sortase F of *P. acnes.*

In one embodiment, sortase F, or a catalytic domain thereof, comprises the sequence of sortase F of *P. acnes* (SEQ ID NO: 1 with signal peptide, SEQ ID NO: 59 without signal peptide), or a functionally active subsequence thereof.

In further embodiments, sortase F, or a catalytic domain thereof, comprises a sequence selected from the group consisting of SEQ ID NO: 60; SEQ ID NO: 61; SEQ ID NO: 62; SEQ ID NO: 63; SEQ ID NO: 64; SEQ ID NO: 65; SEQ ID NO: 66; SEQ ID NO: 67; SEQ ID NO: 68; SEQ ID NO: 69; SEQ ID NO: 70; SEQ ID NO: 71; SEQ ID NO: 72; SEQ ID NO: 73; SEQ ID NO: 74; SEQ ID NO: 75; SEQ ID NO: 76; SEQ ID NO: 77; SEQ ID NO: 78; SEQ ID NO: 79; SEQ ID NO: 80; SEQ ID NO: 81; SEQ ID NO: 82; SEQ ID NO: 83; SEQ ID NO: 84, or SEQ ID NO: 85, or a functionally active subsequence of any of these sequences.

In one embodiment, one or more predicted non-essential amino acid residues in SEQ ID NO: 1, SEQ ID NO: 59; SEQ ID NO: 60; SEQ ID NO: 61; SEQ ID NO: 62; SEQ ID NO: 63; SEQ ID NO: 64; SEQ ID NO: 65; SEQ ID NO: 66; SEQ ID NO: 67; SEQ ID NO: 68; SEQ ID NO: 69; SEQ ID NO: 70; SEQ ID NO: 71; SEQ ID NO: 72; SEQ ID NO: 73; SEQ ID NO: 74; SEQ ID NO: 75; SEQ ID NO: 76; SEQ ID NO: 77; SEQ ID NO: 78; SEQ ID NO: 79; SEQ ID NO: 80; SEQ ID NO: 81; SEQ ID NO: 82; SEQ ID NO: 83; SEQ ID NO: 84 or SEQ ID NO: 85, are removed or replaced with another amino acid residue. A "non-essential" amino acid residue is a residue that can be altered from SEQ ID NO: 1 without abolishing or substantially altering its sortase activity (also referred to as "biological activity"). Suitably, its sortase activity is at least 20%, 40%, 60%, 70% or 80% 100%, 500%, 1000% or more of the activity of the sortase F enzyme of SEQ ID NO. 1.

An "essential" amino acid residue is a residue that, when altered from the wild-type sequence of a reference polypeptide, results in abolition of an activity of the parent molecule such that less than 20% of the wild-type activity is present. For example, such essential amino acid residues may include those that are conserved in reference polypeptides across different species, including those sequences that are conserved in the enzymatic sites of reference polypeptides from various sources. In one embodiment, sortase F, or a catalytic domain thereof, comprises a catalytic triad of residues essential for enzymatic activity. In a preferred embodiment, the catalytic triad consists of a histidine residue, a cysteine residue and an arginine residue.

In one embodiment, sortase F, or a catalytic domain thereof, is a biologically active variant (i.e., having a sortase activity of at least 20%, 40%, 60%, 70% or 80% 100%, 500%, 1000% or more of the activity of the sortase F enzyme of SEQ ID NO. 1) of the sortase F enzyme of SEQ ID NO: 1 that has a sequence comprising at least 30%, 40%, 50%, 60%, 70%, generally at least 75%, 80%, 85%, usually about 90% to 95% or more, and typically about 97% or 98% or more sequence identity to SEQ ID NO: 1, SEQ ID NO: 59; SEQ ID NO: 60; SEQ ID NO: 61; SEQ ID NO: 62; SEQ ID NO: 63; SEQ ID NO: 64; SEQ ID NO: 65; SEQ ID NO: 66; SEQ ID NO: 67; SEQ ID NO: 68; SEQ ID NO: 69; SEQ ID NO: 70; SEQ ID NO: 71; SEQ ID NO: 72; SEQ ID NO: 73; SEQ ID NO: 74; SEQ ID NO: 75; SEQ ID NO: 76; SEQ ID NO: 77; SEQ ID NO: 78; SEQ ID NO: 79; SEQ ID NO: 80; SEQ ID NO: 81; SEQ ID NO: 82; SEQ ID NO: 83; SEQ ID NO: 84, or SEQ ID NO: 85, as determined by sequence alignment programs described elsewhere herein, particularly using default parameters.

A biologically active variant of SEQ ID NO: 1, SEQ ID NO: 59; SEQ ID NO: 60; SEQ ID NO: 61; SEQ ID NO: 62; SEQ ID NO: 63; SEQ ID NO: 64; SEQ ID NO: 65; SEQ ID NO: 66; SEQ ID NO: 67; SEQ ID NO: 68; SEQ ID NO: 69; SEQ ID NO: 70; SEQ ID NO: 71; SEQ ID NO: 72; SEQ ID NO: 73; SEQ ID NO: 74; SEQ ID NO: 75; SEQ ID NO: 76; SEQ ID NO: 77; SEQ ID NO: 78; SEQ ID NO: 79; SEQ ID NO: 80; SEQ ID NO: 81; SEQ ID NO: 82; SEQ ID NO: 83; SEQ ID NO: 84 or SEQ ID NO: 85, may differ from SEQ ID NO: 1 generally by as much 100, 50 or 20 amino acid residues or suitably by as few as 1-15 amino acid residues, as few as 1-10, such as 6-10 amino acid residues, including about 20, 19, 18, 17, 16, 15, 14, 13, 12, 11, 10, 9, 8, 7, 6, 5, 4, 3, 2, or even 1 amino acid residues. In some embodiments, a biologically active variant differs from SEQ ID NO: 1 by at least one but by less than 15, 10 or 5 amino acid residues. In other embodiments, it differs from SEQ ID NO: 1 by at least one residue but less than 20%, 15%, 10% or 5% of the residues.

The percent identity between two sequences is a function of the number of identical positions shared by two aligned sequences, considering the number of gaps, and the length of each gap, which need to be introduced for optimal alignment. To determine the percent identity of two amino acid sequences, sequences are aligned for optimal comparison purposes (e.g., gaps can be introduced in one or both of a first and a second amino acid sequence for optimal alignment). The comparison of sequences and determination of percent identity between two sequences can be accomplished using mathematical algorithms known to the skilled person in the art. In comparing two sequences, it may be advantageous to first remove any signal peptide sequences known to the skilled person.

In one embodiment, polypeptides can be aligned to all or part of SEQ ID NO: 1 using BLAST alignment tool. A local alignment consists of a pair of sequence segments, one from each of the sequences being compared. A modification of Smith-Waterman or Sellers algorithms will find all segment pairs whose scores cannot be improved by extension or trimming, called high-scoring segment pairs (HSPs). The results of the BLAST alignments include statistical measures to indicate the likelihood that the BLAST score can be expected from chance alone. In a preferred embodiment, a BLAST alignment is used with the BLOSUM62 matrix, a gap existence penalty of 11, and a gap extension penalty of 1. The BLOSUM62 matrix assigns a probability score for each position in an alignment that is based on the frequency with which that substitution is known to occur among consensus blocks within related proteins. In a preferred embodiment, the algorithm of Needleman and Wunsch (J Mol Biol. 48:443-453, 1970) is used to find the alignment of two complete sequences that maximizes the number of matches and minimizes the number of gaps.

The sequence similarity score, S, may be calculated from the number of gaps and substitutions associated with the aligned sequence; higher similarity scores indicate a more significant alignment. Substitution scores are given by a look-up table. Gap scores are typically calculated as the sum of G, the gap opening penalty and L, the gap extension penalty. For a gap of length n, the gap cost would be G+Ln. The choice of gap costs, G and L is empirical, but it is customary to choose a high value for G (10-15), e.g., 11, and a low value for L (1-2) e.g., 1.

The program GAP uses either a BLOSUM62 or a PAM250 matrix, and a gap weight of 16, 14, 12, 10, 8, 6, or 4 and a length weight of 1, 2, 3, 4, 5, or 6. A particularly preferred set of parameters are a BLOSUM62 scoring matrix with a gap penalty of 12, a gap extend penalty of 4, and a frameshift gap penalty of 5. The percent identity between two amino acid sequences can also be determined using the algorithm of E. Meyers and W. Miller (Cabios. 4:11-17, 1989) which has been incorporated into the ALIGN program (version 2.0), using a PAM120 weight residue table, a gap length penalty of 12 and a gap penalty of 4. In one embodiment, GAP Version 10 (GCG, Accelrys, San Diego, Calif.) is used with the following parameters: GAP Weight of 8 and Length Weight of 2, and the BLOSUM62 scoring matrix (Henikoff and Henikoff, PNAS USA. 89:10915-10919, 1992).

In one embodiment, sortase F, or a catalytic domain thereof, comprises an amino acid sequence that can be optimally aligned with all or part of SEQ ID NO: 1 to generate a sequence similarity (or bit) score of at least about 50, 60, 70, 80, 90, 100, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, 1000, or more, including all integers and ranges in between.

In a further aspect, the case by case analysis may be performed using PSI-BLAST (Position-Specific iterative Basic Local Alignment Search Tool). PSI-BLAST derives a position-specific scoring matrix (PSSM) or profile from the multiple sequence alignment of sequences detected above a given score threshold using protein-protein BLAST. This PSSM is used to further search the database for new matches, and is updated for subsequent iterations with these newly detected sequences. Thus, PSI-BLAST provides a means of detecting distant relationships between proteins.

In another aspect, the case by case analysis is performed using HHpred, a method for sequence database searching and structure prediction that is more sensitive than BLAST or PSI-BLAST in finding remote homologs. HHpred is based on the pairwise comparison of profile hidden Markov models (HMMs). HHpred accepts a single query sequence or a multiple alignment as input. Search options include local or global alignment and scoring secondary structure similarity. HHpred can produce pairwise query-template sequence alignments, merged query-template multiple alignments (e.g. for transitive searches), as well as 3D structural models calculated by the MODELLER software from HHpred alignments.

All or part of the sequence of SEQ ID NO: 1 can be used as a "query sequence" to perform a search against public databases to, for example, identify other family members or related sequences that may be sortase F. Such databases include, but are not limited to, UniProtKB, SwissProt, PIR, PRF and PDB. BLAST protein searches can be performed with, e.g., the BLASTX program, score=50, wordlength=3 to obtain amino acid sequences homologous to SEQ ID NO. 1. To obtain gapped alignments for comparison purposes, Gapped BLAST can be utilized as described in Altschul et al., (Nucleic Acids Res. 25:3389-3402, 1997). When utilizing BLAST and Gapped BLAST programs, the default parameters of the respective programs (e.g., BLASTX) can be used.

In certain embodiments, the length of SEQ ID NO: 1 aligned for comparison purposes is at least 30%, preferably at least 40%, more preferably at least 50%, 60%, and even more preferably at least 70%, 80%, 90%, 100%. The amino acid residues at corresponding positions are then compared. When a position in the first sequence is occupied by the same amino acid residue as the corresponding position in the second sequence, then the molecules are identical at that position.

sortase F may be a biologically active variant which has, for example, 10, 11, 12, 13, 14, 15, 16, 17, 18, 19, 20, 21, 22, 23, 24, 25, 26, 27, 28, 29, 30, 40, 50, 60, 70, 80, 90, 100, 110, 120, 130, 140, 150, 160, 170, 180 or more contiguous amino acids, including all integers in between, relative to SEQ ID NO. 1.

The expectation value (E) threshold is a statistical measure of the number of expected matches in a random database. The lower the e-value, the more likely the match is to be significant. The smaller the E-Value, the more significant the alignment. For example, an alignment having an E value of e<−117> means that a sequence with a similar score is very unlikely to occur simply by chance. In one embodiment, sortase F, or a catalytic domain thereof, is a biologically active variant having an alignment to all or part of SEQ ID NO: 1 with an E value of less than −0.1, −0.01, −0.001, −0.0001, or a lower value.

In one embodiment, sortase F, or a catalytic domain thereof, may correspond to SEQ ID NO: 1 that is altered by various ways including by amino acid substitutions, deletions, truncations, and/or insertions. Methods for such manipulations are generally known in the art. For example, amino acid sequence variants can be prepared by mutations in the DNA. Methods for mutagenesis and nucleotide sequence alterations are well known in the art. See, for example, Kunkel (PNAS USA. 82:488-492, 1985); Kunkel et al., (Methods in Enzymol. 154: 367-382, 1987), U.S. Pat. No. 4,873,192, Watson, J. D. et al., ("Molecular Biology of the Gene," Fourth Edition, Benjamin/Cummings, Menlo Park, Calif., 1987) and the references cited therein. Guidance as to appropriate amino acid substitutions that do not affect biological activity of the protein of interest may be found in the model of Dayhoff et al., (1978) Atlas of Protein Sequence and Structure (Natl. Biomed. Res. Found., Washington, D.C.).

Such variants may result from, for example, genetic polymorphism and/or from human manipulation. In one embodiment, mutations are introduced randomly along all or part of the nucleotide sequence encoding the peptide sequence of SEQ ID NO. 1, such as by saturation mutagenesis, and the resultant mutants are screened for sortase activity to identify mutants which retain that activity. Following mutagenesis of the coding sequences, the encoded peptide can be expressed recombinantly and the activity of the peptide can be determined. In one embodiment, sortase F, or the catalytic domain thereof, is the result of mutation of a wild type sortase F, and preferably is the result of mutation of SEQ ID NO. 1, to maintain or improve its conjugation efficiency.

Methods for screening gene products of combinatorial libraries made by point mutations or truncation, and for screening cDNA libraries for gene products having a selected property are known in the art. Such methods are adaptable for rapid screening of the gene libraries generated by combinatorial mutagenesis of reference polypeptides. Recursive ensemble mutagenesis (REM), a technique which enhances the frequency of functional mutants in the libraries, can be used in combination with the screening assays to identify polypeptide variants (Arkin and Yourvan, PNAS USA 89:7811-7815, 1992; Delgrave et al., Protein Engineering. 6:327-331, 1993). Conservative substitutions, such as exchanging one amino acid with another having similar properties, may be desirable as discussed in more detail below.

sortase F may be a polypeptide variant that contains conservative amino acid substitutions at various locations along the sequence of all or part of SEQ ID NO. 1. A "conservative amino acid substitution" is one in which the amino acid residue is replaced with an amino acid residue having a similar side chain. Families of amino acid residues having similar side chains have been defined in the art, which can be generally sub-classified as follows:

Acidic: The residue has a negative charge due to loss of H ion at physiological pH and the residue is attracted by aqueous solution so as to seek the surface positions in the conformation of a peptide in which it is contained when the peptide is in aqueous medium at physiological pH. Amino acids having an acidic side chain include glutamic acid and aspartic acid.

Basic: The residue has a positive charge due to association with H ion at physiological pH or within one or two pH units thereof (e.g., histidine) and the residue is attracted by aqueous solution so as to seek the surface positions in the conformation of a peptide in which it is contained when the peptide is in aqueous medium at physiological pH. Amino acids having a basic side chain include arginine, lysine and histidine.

Charged: The residues are charged at physiological pH and, therefore, include amino acids having acidic or basic side chains (i.e., glutamic acid, aspartic acid, arginine, lysine and histidine).

Hydrophobic: The residues are not charged at physiological pH and the residue is repelled by aqueous solution so as to seek the inner positions in the conformation of a peptide in which it is contained when the peptide is in aqueous medium. Amino acids having a hydrophobic side chain include tyrosine, valine, isoleucine, leucine, methionine, phenylalanine and tryptophan.

Neutral/polar: The residues are not charged at physiological pH, but the residue is not sufficiently repelled by aqueous solutions so that it would seek inner positions in the conformation of a peptide in which it is contained when the peptide is in aqueous medium. Amino acids having a neutral/polar side chain include asparagine, glutamine, cysteine, histidine, serine and threonine.

This description also characterizes certain amino acids as "small" since their side chains are not sufficiently large, even if polar groups are lacking, to confer hydrophobicity. With the exception of proline, "small" amino acids are those with four carbons or less when at least one polar group is on the side chain and three carbons or less when not. Amino acids having a small side chain include glycine, serine, alanine and threonine. The gene-encoded secondary amino acid proline is a special case due to its known effects on the secondary conformation of peptide chains. The structure of proline differs from all the other naturally-occurring amino acids in that its side chain is bonded to the nitrogen of the α-amino group, as well as the α-carbon. Several amino acid similarity matrices (e.g., PAM120 matrix and PAM250 matrix as disclosed for example by Dayhoff et al., (1978), A model of evolutionary change in proteins. Matrices for determining distance relationships In M. O. Dayhoff, (ed.), Atlas of protein sequence and structure, Vol. 5, pp. 345-358, National Biomedical Research Foundation, Washington D.C.; and by Gonnet et al., (Science. 256:14430-1445, 1992), however, include proline in the same group as glycine, serine, alanine and threonine. Accordingly, for the purposes of the present invention, proline is classified as a "small" amino acid.

Amino acid residues can be further sub-classified as cyclic or non-cyclic, and aromatic or non-aromatic, self-explanatory classifications with respect to the side-chain substituent groups of the residues, and as small or large. The residue is considered small if it contains a total of four carbon atoms or less, inclusive of the carboxyl carbon, provided an additional polar substituent is present; three or less if not. Small residues are, of course, always non-aromatic. Dependent on their structural properties, amino acid residues may fall in two or more classes.

Preferred Embodiments Relative to the Salt Concentration

The present invention refers to a method for producing a conjugate of two substrates wherein the reaction takes place in an aqueous environment comprising a salt concentration of from ≥0.5 to ≤3 M.

In one embodiment, the salt concentration is adjusted to a range from ≥0.5 to ≤1.5 M.

This embodiment is particularly preferred in case the antibody, antibody-based binding protein or antibody fragment comprises at least
- one antibody-derived VH, VL, or CH immunoglobulin domain,
- an antibody fragment binding to a receptor, antigen, growth factor, cytokine and/or hormone, an antibody mimetic, or
- a modified antibody format, and wherein the second substrate is a small molecule, In one embodiment, the salt is a chloride salt. In another embodiment, the salt is a sodium, lithium or potassium salt. In a preferred embodiment, the salt is sodium chloride.

FURTHER PREFERRED EMBODIMENTS

In one embodiment, the reaction medium is essentially free of Zn, Rb, Mg, Ni, Ca and/or Mn cations.

Indeed, it is surprising that the reaction does not require any of these cations, as such cations are required by some sortases of classes outside of sortase F.

As used herein, the term "essentially free of" means that the aqueous solution comprises ≤10 mM, preferably ≤5 mM, ≤1 mM, ≤0.5 mM, ≤0.1 mM, ≤0.05 mM, ≤10 µM, ≤5 µM, ≤1 µM, ≤0.5 µM, ≤0.1 µM, ≤0.05 µM, ≤10 nM, ≤5 nM, ≤1 nM, ≤0.5 nM, ≤0.1 nM, ≤0.05 nM, most preferably 0.01 nM.

In one embodiment, the temperature in the aqueous reaction medium is adjusted, at least for a given time period, to a range from ≥3 to ≤45° C., preferably from ≥15 to ≤40° C., more preferably from ≥20 to ≤30° C., and most preferably at around 25° C.

In one embodiment, the pH in the aqueous reaction medium is adjusted, at least for a given time period, to a range from ≥4.5 to ≤10.5, more preferably from >6.5 to ≤8.5, and even more preferably of from ≥7.0 to ≤8.0.

In one embodiment, the reaction takes place over a time period of 1 h to 10 days, and preferably 3 days.

In one embodiment, one or more reducing agents are added to the aqueous environment before, during and/or after the conjugation reaction.

Preferred reducing agents include, but are not limited to, 1,4-dithiothreitol (DTT) and tris-2-carboxyethylphosphine hydrochloride (TCEP-HCl). Such reducing agents may be added during purification of the conjugated product.

In one embodiment, one or more of the following are added to the aqueous environment of the conjugation reaction:
glycerol
organic solvents such as, but not limited to, dimethylacetamide (DMA) or dimethyl sulfoxide (DMSO).

Such organic solvents are selected by the skilled person to be compatible with the substrates.

In one embodiment wherein:
one substrate is a protein substrate comprising at least one sortase recognition motif,
the second substrate is a small molecule comprising a Gly/Ala motif,
it is preferred that the small molecule be added to the reaction in an amount corresponding to:
a. 2 to 50, preferably 5 to 20, and more preferably around 10 molar equivalents per molar equivalent of sortase F recognition motif; and/or
b. 10 molar equivalents per molar equivalent of sortase F.

EXAMPLES

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

All amino acid sequences disclosed herein are shown from N-terminus to C-terminus; all nucleic acid sequences disclosed herein are shown 5'->3'.

Example 1: Cloning and Expression of Recombinant Sortase F Enzyme from *P. acnes*

The ORF of sortase F from *P. acnes* KPA171202 is found in GenBank or Uniprot under: AAT82533.1 or Q6A9N3, respectively, and has SEQ ID NO: 1 herein

TABLE 3

| Sequence of sortase F enzyme from P. acnes |
|---|
| SEQ ID NO. 1  TTTSSTSGIPAASAAKKGPVPAGCMKTPKPIV |
| PVKYSIDGMKASAKVLSRGVDETGAAGAPPKN |
| DPSSMAWFNQGPKIGSDKGNAVLTAHTYHKGG |
| ALGNRLYDKNNGIKKGDIIRLTDKTGQTVCYR |
| YDHDTKVMVKDYNPNSNILYDNNGPAQAAIVI |
| CWDYVKKTGEFDSRVIFYTYPVA |

The coding region for sortase F fragment of *P. acnes*, as provided in SEQ ID NO: 1 (but with an N-terminal MS peptide and a C-terminal TwinStrep-comprising tag: AGSWSHPQFEKGGGSGGGSGGSAWSHPQFEK; SEQ ID NO: 58), was custom synthesized in a proprietary bacterial expression vector at GenScript, and introduced into the p7X expression vector backbone (see: Geertsma E., James C. Samuelson (ed.), *Enzyme Engineering: Methods and Protocols*, Methods in Molecular Biology, vol. 978, DOI 10.1007/978-1-62703-293-3_10, @ Springer Science+Business Media New York 2013). *E. coli* BL21 (DE3), transformed with the p7X vector comprising the sortase F sequence, was cultured overnight at 37° C. in lysogeny broth (LB) medium with 50 µg/mL kanamycin until an $OD_{600}$=0.6 was reached. IPTG was then added to a final concentration of 0.5 mM and protein expression was induced for 24 hours at 16° C. Cells were then harvested by centrifugation and washed (100 mM Tris/HCl, pH 8.0, 300 mM NaCl, 1 mM EDTA), prior to a second centrifugation and then resuspension in lysis buffer (100 mM Tris/HCl, pH 8.0, 300 mM NaCl, 1 mM EDTA, 0.1% Triton X 100, 1 mg/mL lysozyme). Cells were incubated on ice 30 min., and then lysed by sonication. Clarified supernatant was purified by StrepTactin affinity chromatography (IBA GmbH) following the manufacturer's instructions, adjusting the buffer to 500 mM NaCl and 5 mM DTT.

Fractions of ≥90% purity, as judged by SDS-PAGE, were then consolidated and diluted 10-fold with 10 mM sodium phosphate, pH 7.0, and purified on a column using HiTrap SP XL with a linear gradient in 10 mM sodium phosphate, pH 7.0, 1 M NaCl. sortase F-containing fractions were pooled and dialyzed against 50 mM sodium phosphate, pH 8.5, 500 mM NaCl, 1 mM EDTA and 10% glycerol. Optionally, cooling was undertaken and/or protease inhibitors were added to limit degradation.

Example 2: Sortase Activity Assay sortase F, in a concentration range from 2.5 to 20 µM, was incubated with FITC-labelled LPXTGE (SEQ ID NO: 50), DNPNTGDE (SEQ ID NO: 51), ENPXTNAGT (SEQ ID NO: 52), KLPXTASN (SEQ ID NO: 53) and ALAXTGSE (SEQ ID NO: 54) peptides (where X was varied over the natural amino acids), and 10 µM of a 60 kDa protein comprising an N-terminal $Gly_6$-motif. The reaction was performed at 25° C. for 6 to 24 hours, and stopped by addition of reducing SDS-PAGE loading buffer, followed by 5 min. incubation at 95° C. Reaction products were loaded on a 12% SDS-PAGE gel and run according to standard protocols. Labelled reaction products were visualized by FITC emission using the FLA-9000 Imager from Fujifilm, and quantified using ImageJ software. As per FIG. 5, sortase F is principally active on the LPXTGE (SEQ ID NO: 50) peptide.

Example 3: Determination of Preferential Sortase F Recognition Motif sortase F sequence specificity analysis was conducted in accordance with Puorger C., et al. (*Biochemistry*, 56 (2017), 2641-2650). Briefly, 250 µM of fluorescein-labelled peptide mixture (with each position being independently varied over the 20 naturally-occurring amino acids), and 250 µM biotin-labelled nucleophile (GGGK-biotin) were incubated with 5 µM of sortase F in 50 mM of sodium phosphate, pH 8.5, and 500 mM NaCl at 25° C. Conjugated products were isolated using magnetic streptavidin beads, separated by reverse phase HPLC and identified by MS. Ion intensities of the products were normalized based on initial abundance of the corresponding fluorescein-labelled peptide. FIG. 1 presents the relative normalized abundance of the different amino acids within the sortase recognition motifs of the conjugated products.

Example 4: Optimization of Sortase Conjugation Reaction Conditions Using a Gel-Based Assay sortase F, at concentration of 2.5 µM, was incubated with 10 µM of FITC-labelled LPQTGE peptide (SEQ ID NO: 55), 10 µM of a 60 kDa protein comprising an N-terminal $Gly_6$-motif, and 5 mM DTT. The reaction was performed at 25° C. over a period of 6 hours, independently varying the following parameters:
  pH over a range of 4 to 12 by increments of 1 (using a mixture of boric and citric acid, along with phosphate buffer to achieved the desired pH), while maintaining the concentration of NaCl at 0.5 M;
  NaCl concentration over a range of 0 to 3 M, while maintaining the pH at 8.5 (using 50 mM of sodium phosphate to establish the pH).

The reaction was stopped by addition of reducing SDS-PAGE loading buffer followed by 5 min. incubation at 95° C. Reaction products were loaded on a 12% SDS-PAGE gel and run according to standard protocols. Labelled reaction products were visualized by FITC emission using the FLA-9000 Imager from Fujifilm, and quantified using ImageJ software.

FIG. 6 shows (A) sortase F activity as a function of pH after 6 hours conjugation, with detection of conjugated product (products were loaded on an SDS-PAGE gel and visualized by FITC emission): pH was varied by 1 unit increments between 4 and 12, while maintaining other parameters (sortase F concentration, temperature, salt concentration, etc.) constant. pH was preferentially between 8 and 9; (B) sortase F activity as a function of ionic strength after 6 hours conjugation, with detection of conjugated product (FITC emission): NaCl concentration was varied between 0 and 3 M, while maintaining other parameters (sortase F concentration, temperature, pH, etc.) constant. Salt concentration was preferentially between 0.5 and 1.5 M.

Example 5: Optimization of Sortase Conjugation Reaction Conditions Using HPLC-Based Assay sortase F, at concentration of 5 µM, was incubated with 250 UM of FITC-labelled LPQTGE peptide (SEQ ID NO: 55), 1 mM of GGGK-biotin, and 5 mM DTT. The reaction was performed at 25° C. over a period of 24 hours (with 6 samplings in the period up to 3 hours), independently varying the following parameters:
  pH over a range of 4 to 11 (using a mixture of boric and citric acid, along with phosphate buffer to achieved the desired pH), while the concentration of NaCl at 500 mM;
  NaCl concentration over a range of 0 to 3 M, while maintaining the pH at 8.5 (using 50 mM of sodium phosphate to establish the desired pH).

The reaction was stopped by adding 95 µL of 0.05 M HCl per 5 µL of reaction mixture. Reaction products were loaded into XBridge C18 HPLC columns equilibrated in 0.1% $NH_4OH$ in 5% methanol. Elution was performed with a linear gradient from 0 to 100% of 0.1% $NH_4OH$ in 95% methanol over 10 mL at flow rate of 0.5 mL/min and a temperature of 30° C. Eluted peptides were detected by absorbance at 497 nm and fluorescence at 522 nm (excitation at 497 nm) and peak areas were quantified.

Initial rate of sortase F-mediated ligation under different pH and salt conditions was evaluated based on regression of the product concentrations over time within samples collected up to 3 hours reaction time. FIG. 7 shows (A) initial sortase F activity as a function of pH, with detection of conjugated product (RP-HPLC): pH was varied between 4.5 to 10.5, while maintaining other parameters (sortase F concentration, temperature, salt concentration, etc.) constant. pH was preferentially between 8 and 9; (B) initial sortase F activity as a function of ionic strength, with detection of conjugated product (RP-HPLC): NaCl concentration was varied between 0 and 3 M, while maintaining other parameters (sortase F concentration, temperature, pH, etc.) constant. The salt concentration optimum was found to be above 250 mM of NaCl.

Product yields after 24 hours of sortase F-mediated ligation under different pH and salt conditions revealed that ligation was most efficient at slightly lower pH, i.e., from 7 to 8. FIG. 8 shows (A) Resulting product amount from sortase F activity as a function of pH after 24 hours conjugation, with detection of conjugated product (RP-HPLC): pH was varied between 4.5 to 10.5, while maintaining other parameters (sortase F concentration, temperature, salt concentration, etc.) constant. pH was preferentially around 8; (B) Resulting product amount from sortase F activity as a function of ionic strength after 24 hours conjugation, with detection of conjugated product (RP-HPLC): NaCl concentration was varied between 0 and 3 M, while maintaining other parameters (sortase F concentration, temperature, pH, etc.) constant. Salt concentration was preferentially above 250 mM for maximal sortase F activity, and more preferential above 750 mM.

Example 6: Optimization of Sortase Conjugation Reaction Conditions Using a Fluorescence Assay sortase F, at concentration of 5 µM, was incubated with 250 µM of self-quenching peptide Dabcyl-QALPQTGET-Edans (SEQ ID NO: 56), 2 mM of triglycine in the following buffer: 50 mM Tris-HCl, 500 mM NaCl, 5 mM DTT, pH 8.5. Reactions were performed over a period of 1 hour, varying the reaction temperature between 15 and 45° C. and measuring fluorescence over time (using a plate reader or fluorescence spectrometer, with excitation at 350 nm and emission at 495 nm).

Initial rate of sortase F-mediated ligation at different temperatures was evaluated based on regression of the fluorescence over time. FIG. 9 shows the temperature dependence of sortase F activity in conjugating a quencher-fluorophore peptide (representing a sortase F recognition motif) and a triglycine, as measured with a fluorescence spectrometer. The temperature optimum was found to be about 25° C., and the reaction rate decreased at temperatures above 40° C.

Example 7: Antibody Expression and Purification

The anti-CD30 antibody Ac10, with its sequence as described in US2008213289A1, the content of which is incorporated by reference herein, but modified to include the following N-terminal sequence on its heavy chain (HC): LPQTGG-TwinStrep (SEQ ID NO: 57), was transiently expressed in HEK293T cells and purified as per Waldmeier et al. 2016.

Example 8: Sortase-Mediated Antibody Conjugation

Figure 2:
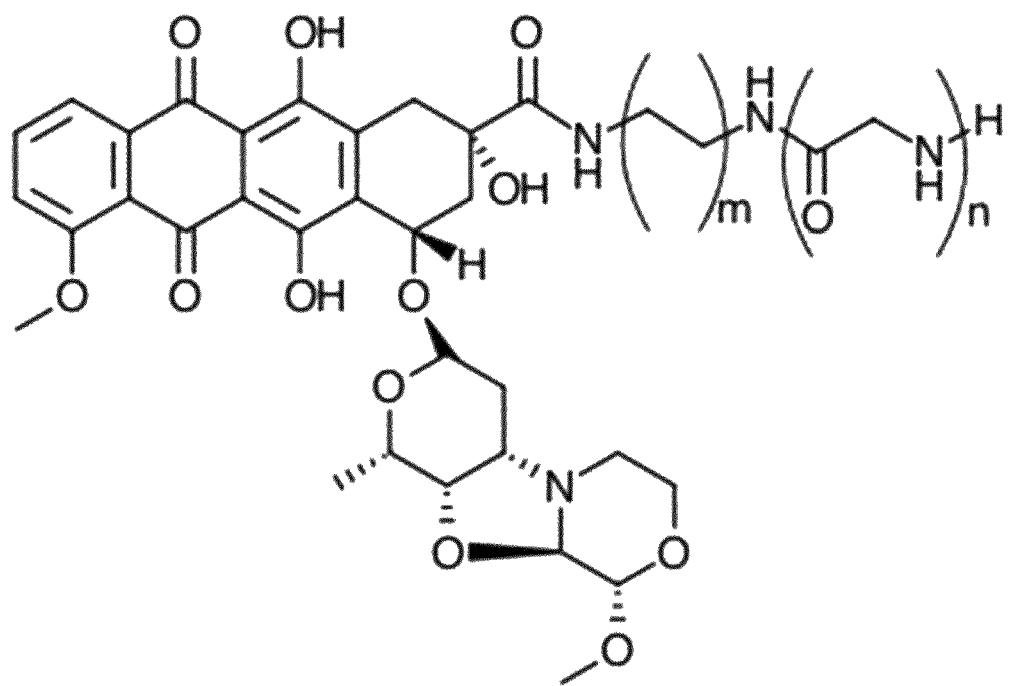
FIG. 2. A preferred embodiment of the small molecule toxin of formula (i), comprising a linker with an alkyl-diamino group of the form NH$_2$—(CH$_2$)$_m$—NH$_2$, where m≥1 and ≤11, preferably m=2, linked to an oligoglycine motif (n is from 1 to 21, preferably from 1 to 5).

The above-mentioned toxin was conjugated to the heavy chain (HC) of Ac10 by incubating 10 µM of antibody with 200 µM glycine-modified toxin (glycine-modified anthracycline toxin as per FIG. 2 with m=2 and n=3, obtained from Levena) and 18 µM sortase F in conjugation buffer (50 mM HEPES, pH 8.5, 1 mM $CaCl_2$), 500 mM NaCl, 10% by vol. glycerol) for 3 days at 16° C. The reaction was stopped by passing it through a Protein A column (rProtein A Gravitrap column, GE Healthcare). Bound conjugate was eluted with 5 column volumes of elution buffer (0.1 M glycine pH 2.7, 50 nM NaCl, 10% by vol. glycerol), with 0.5 column volume fractions collected into tubes containing up to 5% v/v 1M HEPES (pH 8) base to neutralize the acid. Protein containing fractions were pooled and formulated in PBS without calcium or magnesium.

ADC Analytics.

DAR was assessed by Reverse Phase Chromatography performed on a Polymer Labs PLRP 2.1 mm×5 cm, 5 μm column run at 1 mL/min/70° C. with a 25-min. linear gradient between 0.05% TFA/$H_2O$ and 0.05% TFA/$CH_3CN$. Samples were first treated by FabRICATOR at pH 8.0 at 37° C. for 15 min. The DAR determined by Reverse Phase Chromatography was 1.93.

Example 9: ADC Cytotoxicity

Cytotoxicity of the CD30-targeting ADC above was investigated using the CD30-expressing human cell line Karpas-299; CD30-negative EMT6 cells were used as control. For this, 5000 Karpas-299 cells and 1000 EMT6 cells, per well, were each plated on 96-well plates (excluding edge wells, which contained water) in 75 μL RPMI or DMEM, respectively, supplemented with 10% by vol. FCS, 100 IU/mL Pen-Strep-Fungizone and 2 mM L-Glutamine at a density of $6.66\times10^4$ or $1.33\times10^4$ cells per well, respectively. Cells were grown at 37° C. in a humidified incubator at 5% $CO_2$ atmosphere. After a 1-day incubation, ADC was added to respective wells in an amount of 25 μL of 3.5-fold serial dilutions in growth medium (starting ADC concentration of 280 μg/mL or 1.9 μg/mL for negative and positive cells, respectively). After 4 additional days, plates were removed from the incubator and equilibrated to room temperature. After approximately 30 min, 50 μL of CellTiter-Glo® 2.0 Luminescent Solution (Promega, G9243) was added to each well. After shaking the plates at 450 rpm for 5 min. followed by 10 min. incubation in the dark without shaking, luminescence was measured on a Spark 10M plate reader with an integration time of 1 second per well. Curves of luminescence versus ADC concentration (ng/mL) were fitted with Graphpad Prism Software.

FIG. 10 shows the dose-response curve of the in vitro cell killing assays on the CD30-high Karpas-299 and CD30-negative EMT6 cell lines. The sortase F conjugated CD30-targeting ADC provides effective in vitro cell killing in an antigen dependent manner, as compared to an isotype control ADC. Viable cells were quantified using a luminescent cell viability assay.

REFERENCES

Ton-That H. et al., J. Biol. Chem., 275 (2000) 9876-9881
Frankel B. A. et al., Biochemistry, 44 (2005) 11188-11200
Popp M. W. et al., Nat. Chem. Biol., 3 (2007) 707-708).
Spirig T. et al., Mol. Microbiol., 82 (2011) 1044-1059
Chen I. et al., PNAS USA, 108 (2011) 11399-11404; Dorr B. M. et al., PNAS USA, 111 (2014) 13343-13348
Bradshaw W. J. et al., FEBS J., 282 (2015) 2097-2114
Gilbrat, J. F., Current Opinion in Structural Biology, 6 (1996), 377-385
Katoh, Standley 2013 (Molecular Biology and Evolution 30:772-780)
Kuraku, Zmasek, Nishimura, Katoh 2013 (Nucleic Acids Research 41: W22-W28).
Quintieri et al. (Clin. Cancer Res., 11 (2005) 1608-1617)
Beerli et al., PloS One 10, (2015) e131177
Marchler-Bauer et al. (2015) Nuclic Acids Res. 43 (D) 222-226.
Gilbrat, J. F., Current Opinion in Structural Biology, 6 (1996), 377-385)
Katoh, Standley 2013 (Molecular Biology and Evolution 30:772-780).
Needleman and Wunsch (J Mol Biol. 48:443-453, 1970
E. Meyers and W. Miller (Cabios. 4:11-17, 1989
Henikoff and Henikoff, PNAS USA. 89:10915-10919, 1992
Kunkel (PNAS USA. 82:488-492, 1985)
Kunkel et al., (Methods in Enzymol. 154:367-382, 1987), U.S. Pat. No. 4,873,192
Watson, J. D. et al., ("Molecular Biology of the Gene," Fourth Edition, Benjamin/Cummings, Menlo Park, Calif., 1987)
Dayhoff et al., (1978) Atlas of Protein Sequence and Structure (Natl. Biomed. Res. Found., Washington, D.C.
Arkin and Yourvan, PNAS USA 89:7811-7815, 1992
Delgrave et al., Protein Engineering. 6:327-331, 1993
Dayhoff et al., (1978), A model of evolutionary change in proteins. Matrices for determining distance relationships In M. O. Dayhoff, (ed.), Atlas of protein sequence and structure, Vol. 5, pp. 345-358, National Biomedical Research Foundation, Washington D.C.
Gonnet et al., (Science. 256:14430-1445, 1992
WO 2014/140317
WO 2016/102679
US2008213289A1
U. Jonsson and M. Malmquist, Adv. Biosens., 1992, 2, 291
Wu et al. Proc. Natl. Acad. Sci. USA, 95:6037-6042 (1998)
Banik, S S R; Doranz, B J (2010). "Mapping complex antibody epitopes". Genetic Engineering & Biotechnology News. 3 (2): 25-8
DeLisser, H M (1999). Epitope mapping. Methods Mol Biol. 96. pp. 11-20
Finco et al, Comparison of competitive ligand-binding assay and bioassay formats for the measurement of neutralizing antibodies to protein therapeutics. J
Pharm Biomed Anal. 2011 Jan. 25; 54 (2): 351-8.
Deng et al., Enhancing antibody patent protection using epitope mapping information MAbs. 2018 February-March; 10 (2): 204-209
Huston et al., Cell Biophysics, 22:189-224 (1993);
Plückthun and Skerra, Meth. Enzymol., 178:497-515 (1989) and in Day, E. D., Advanced Immunochemistry, Second Ed., Wiley-Liss, Inc., New York, N.Y. (1990)
Harding, The immunogenicity of humanized and fully human antibodies. MAbs. 2010 May-June; 2 (3): 256-265.
Eylenstein, et al, Molecular basis of in vitro affinity maturation and functional evolution of a neutralizing anti-human GM-CSF antibody, mAbs, 8:1, 176-186 (2016)
Kabat et al., J. Biol. Chem. 252, 6609-6616 (1977) and Kabat et al., Sequences of protein of immunological interest. (1991)
Chothia et al., J. Mol. Biol. 196:901-917 (1987)
MacCallum et al., J. Mol. Biol. 262:732-745 (1996)

Sequences

The following sequences shown herein form part of the disclosure of the present application. A WIPO ST 25 compatible electronic sequence listing is provided with this application, too, which discloses further sequences. For the avoidance of doubt, if discrepancies exist between the sequences in disclosure herein and the electronic sequence listing, the sequences in the present text shall be deemed to be the correct ones.

| SEQ ID NO | qualifier | length | remark |
|---|---|---|---|
| 1 | WP_002530979.1 class F sortase [*Propionibacterium acnes*] | | w/o signal peptide |
| 59 | WP_002530979.1 class F sortase [*Propionibacterium acnes*] | 217 | w signal peptide |
| 60 | >WP_014846908.1 class F sortase [*Pseudopropionibacterium propionicum*] | 236 | w signal peptide |
| 61 | >WP_015070031.1 class F sortase [*Acidipropionibacterium acidipropionici*] | 241 | w signal peptide |
| 62 | >WP_051214998.1 class F sortase [*Granulicoccus phenolivorans*] | 247 | w signal peptide |
| 63 | >WP_013161401.1 class F sortase [*Propionibacterium freudenreichii*] | 237 | w signal peptide |
| 64 | >WP_028821542.1 class F sortase [*Propionimicrobium lymphophilum*] | 214 | w signal peptide |
| 65 | >WP_023645940.1 class F sortase [*actinobacterium* LLX17] | 223 | w signal peptide |
| 66 | >WP_019632587.1 class F sortase [*Actinomadura atramentaria*] | 229 | w signal peptide |
| 67 | >WP_051214964.1 sortase [Granulicoccus phenolivorans] | 309 | w signal peptide |
| 68 | >WP_051542790.1 class F sortase [Propionibacteriaceae bacterium P6A17] | 250 | w signal peptide |
| 69 | >WP_014846908.1 class F sortase [*Pseudopropionibacterium propionicum*] | 236 | w signal peptide |
| 70 | >WP_022909756.1 hypothetical protein [*Aestuariimicrobium kwangyangense*] | 269 | w signal peptide |
| 71 | >WP_015070031.1 class F sortase [*Acidipropionibacterium acidipropionici*] | 241 | w signal peptide |
| 72 | >AAT82533.1 conserved protein [*Cutibacterium acnes* KPA171202] | 258 | w signal peptide |
| 73 | >KJF20116.1 Sortase (surface protein transpeptidase) [*Rhodococcus* sp. AD45] | 187 | w signal peptide |
| 74 | >KJF20116.1 Sortase (surface protein transpeptidase) [*Rhodococcus* sp. AD45] | 187 | w signal peptide |
| 75 | >WP_004601200.1 class F sortase [*Corynebacterium otitidis*] | 241 | w signal peptide |
| 76 | >KGL66019.1 hypothetical protein NG00_00100 [*Corynebacterium camporealensis*] | 221 | w signal peptide |
| 77 | >WP_009086632.1 MULTISPECIES: class F sortase [*Actinobacteria*] | 249 | w signal peptide |
| 78 | >KJF23054.1 Sortase family protein [*Rhodococcus* sp. AD45] | 206 | w signal peptide |
| 79 | >ALG84807.1 peptidase C60 [*Gordonia phthalatica*] | 202 | w signal peptide |
| 80 | >KNA93440.1 peptidase C60 [*Gordonia jacobaea*] | 182 | w signal peptide |
| 81 | >WP_013126695.1 class F sortase [*Tsukamurella paurometabola*] | 194 | w signal peptide |
| 82 | >WP_007241141.1 class F sortase [*Gordonia otitidis*] | 199 | w signal peptide |
| 83 | >WP_005511695.1 MULTISPECIES: sortase [*Corynebacterium*] | 251 | w signal peptide |
| 84 | >tr | C7EN57 | C7EN57_STRSU Sortase OS = *Streptococcus suis* OX = 1307 GN = srtF PE = 4 SV = 1 | 289 | w signal peptide |
| 84 | >WP_009678215.1 class F sortase [*Gordonia neofelifaecis*] | 200 | w signal peptide |

What is claimed is:

1. A method for producing a conjugate of two substrates, the method comprising the steps of:
   a. providing two substrates, each substrate being independently selected from the one or more of the groups consisting of:
      i. small molecules, and
      ii. proteins,
   and
   b. enzymatically conjugating the two substrates using sortase F enzyme of *Propionibacterium acnes*, which comprises an amino acid sequence according to SEQ ID NO. 1, wherein
   one substrate comprises a sortase F recognition motif, while
   the other substrate comprises at least one motif selected from
      a $Gly_n$ motif,
      an $Ala_n$ motif, or
      a motif consisting of a mixture of Ala and Gly residues
   the motif totaling n residues, where n is an integer from $\geq 1$ to $\leq 21$,
wherein the sortase F recognition motif is LPXTG (SEQ ID NO: 44) or LPXTGE (SEQ ID NO: 50), where X is any amino acid with the exception of proline,
wherein further the reaction takes place in an aqueous reaction medium comprising a salt concentration of from about $\geq 0.05$ to $\leq 3$ M,
wherein the pH in the aqueous reaction medium is adjusted to a range from $\geq 6.5$ to $\leq 8.5$,
wherein the temperature in the aqueous reaction medium is adjusted to a range from $\geq 15$ to $\leq 40°$ C., and wherein the aqueous reaction medium comprises $\leq 10$ mM of Zn, Rb, Mg, Ni, and/or Mn cations, and comprises $>0$ mM and $\leq 10$ mM of Ca, thereby producing a conjugated product of the two substrates.

2. The method according to claim 1, wherein one substrate is an antibody, an antibody-based binding protein or an antibody fragment, and the second substrate is a small molecule.

3. The method according to claim 1, wherein the small molecule is a toxin selected from the group consisting of: maytansinoids, auristatins, anthracyclins, calcheamicins, tubulysins, duocarmycins, taxanes, and pyrrolbenzodiazepines.

4. The method according to claim 3, wherein the toxin has the following formula (i),

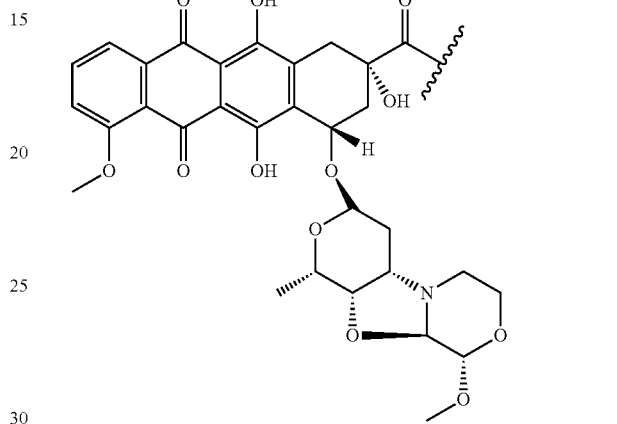

formula (i)

conjugated, directly or indirectly, to the other substrate via its wavy line.

5. The method according to claim 2, wherein the antibody, antibody-based binding protein or antibody fragment binds to at least one of the mouse and/or cynomolgus and/or protein targets selected from the group consisting of: CD30, HER2, ROR1, ROR2, mesothelin, and/or or CS1.

6. The method according to claim 5, wherein the antibody, antibody-based binding protein or antibody fragment binds to CD30.

7. The method according to claim 1, wherein, in the sortase F recognition motif, X is selected from the amino acid residues having the following single letter codes: A, R, N, D, Q, I, L and K.

8. The method according to claim 1, wherein, in a substrate being an antibody, an antibody-based binding protein or an antibody fragment, the sortase F recognition motif is at the N- and/or C-terminus thereof.

9. The method according to claim 1, wherein the substrate being a small molecule comprises the $Gly_n$ motif, the $Ala_n$ motif, or the motif consisting of a mixture of Ala and Gly residues.

10. The method according to claim 1, wherein
    a) the salt concentration is adjusted to a range from $\geq 0.5$ to $\leq 1.5$ M, and/or
    b) the salt is a chloride salt, and/or
    c) the salt is a sodium, lithium or potassium salt.

11. The method according to claim 1, wherein
    one or more reducing agents are added to the aqueous environment before, during and/or after the conjugation reaction.

12. The method according to claim 1, wherein one or more of the following agents are added to the aqueous environment:
  glycerol
  organic solvents.

13. The method according to claim 1, wherein:
  one substrate is a protein substrate comprising at least one sortase F recognition motif,
  the second substrate is a small molecule comprising a $Gly_n$ motif, an $Ala_n$ motif, or a motif consisting of a mixture of Ala and Gly residues
and wherein further the small molecule is added to the reaction in an amount corresponding to:
  a. $\geq 2$ to $\leq 50$ molar equivalents per molar equivalent of sortase F recognition motif; and/or
  b. 10 molar equivalents per molar equivalent of sortase F.

\* \* \* \* \*